(12) United States Patent
LeMay et al.

(10) Patent No.: US 7,931,533 B2
(45) Date of Patent: Apr. 26, 2011

(54) GAME DEVELOPMENT ARCHITECTURE THAT DECOUPLES THE GAME LOGIC FROM THE GRAPHICS LOGICS

(75) Inventors: Steven G. LeMay, Reno, NV (US); Dwayne R. Nelson, Las Vegas, NV (US); Robert E. Breckner, Sparks, NV (US); Greg A. Schlottmann, Reno, NV (US); Nicole M. Beaulieu, Reno, NV (US); Johnny Palchetti, Las Vegas, NV (US); Jamal Benbrahim, Reno, NV (US)

(73) Assignee: IGT, Reno, NV (US)

( * ) Notice: Subject to any disclaimer, the term of this patent is extended or adjusted under 35 U.S.C. 154(b) by 1049 days.

(21) Appl. No.: 10/040,239

(22) Filed: Jan. 3, 2002

(65) Prior Publication Data

US 2003/0078103 A1     Apr. 24, 2003

Related U.S. Application Data

(60) Provisional application No. 60/325,965, filed on Sep. 28, 2001.

(51) Int. Cl.
*A63F 9/24* (2006.01)

(52) U.S. Cl. ........................... 463/29; 463/30

(58) Field of Classification Search .................... 463/20, 463/42, 43, 16, 21, 25–30
See application file for complete search history.

(56) References Cited

U.S. PATENT DOCUMENTS

| | | | |
|---|---|---|---|
| 2,235,642 A | 3/1941 | Lintern et al. | |
| 3,825,905 A | 7/1974 | Allen, Jr. | |
| 3,838,264 A | 9/1974 | Maker | |
| 3,931,504 A | 1/1976 | Jacoby | ............................ 235/153 |
| 4,072,930 A | 2/1978 | Lucero et al. | |
| 4,099,722 A | 7/1978 | Rodesch et al. | |

(Continued)

FOREIGN PATENT DOCUMENTS

AU     2001-255294     11/2001

(Continued)

OTHER PUBLICATIONS

Levinthal, Adam and Barnett, Michael, "The Silicon Gaming Odyssey Slot Machine," Feb. 1997, COMPCON '97 Proceedings, IEEE San Jose, CA; *IEEE Comput. Soc.*, pp. 296-301.

(Continued)

*Primary Examiner* — David L Lewis
*Assistant Examiner* — Omkar Deodhar
(74) *Attorney, Agent, or Firm* — Weaver Austin Villeneuve and Sampson LLP

(57) ABSTRACT

A disclosed gaming machine is designed to execute a modular gaming software architecture. A plurality of gaming software modules may be loaded into RAM on the gaming machine and executed to play a game of chance. Many of the gaming software modules are designed to communicate via application program interfaces so that the logic in many of the gaming software modules may be designed independently of each other. In particular, the modular gaming software architecture allows a game flow software module used to generate a game of chance on the gaming machine to be decoupled from a game presentation software module used to present the game chance. Thus, a group of games may be designed where the games share a common game flow software module but use different game presentation software modules to change the look and feel of the game.

32 Claims, 17 Drawing Sheets

U.S. PATENT DOCUMENTS

| | | | |
|---|---|---|---|
| 4,193,131 A | 3/1980 | Lennon et al. | |
| 4,200,770 A | 4/1980 | Hellman et al. | |
| 4,218,582 A | 8/1980 | Hellman et al. | |
| 4,238,127 A | 12/1980 | Lucero et al. | |
| 4,250,563 A | 2/1981 | Struger | |
| 4,293,928 A | 10/1981 | Baun | |
| 4,335,809 A | 6/1982 | Wain | |
| 4,354,251 A | 10/1982 | Hellwig et al. | |
| 4,355,390 A | 10/1982 | Hellwig et al. | |
| 4,378,940 A | 4/1983 | Gluz et al. | |
| 4,405,829 A | 9/1983 | Rivest et al. | |
| 4,430,728 A | 2/1984 | Beitel et al. | 364/900 |
| 4,454,594 A | 6/1984 | Heffron et al. | 364/900 |
| 4,458,315 A | 7/1984 | Uchenick | |
| 4,462,076 A | 7/1984 | Smith, III | |
| 4,467,424 A | 8/1984 | Hedges et al. | |
| 4,485,457 A | 11/1984 | Balaska et al. | |
| 4,494,114 A | 1/1985 | Kaish et al. | |
| 4,500,933 A | 2/1985 | Chan | |
| 4,519,077 A | 5/1985 | Amin | |
| 4,525,599 A | 6/1985 | Curran et al. | |
| 4,527,798 A | 7/1985 | Siekierski et al. | |
| 4,582,324 A | 4/1986 | Koza et al. | |
| 4,607,844 A | 8/1986 | Fullerton | |
| 4,652,998 A | 3/1987 | Koza et al. | |
| 4,658,093 A | 4/1987 | Hellman | |
| 4,683,550 A | 7/1987 | Jindrick et al. | |
| 4,727,544 A | 2/1988 | Brunner et al. | |
| 4,752,068 A | 6/1988 | Endo | |
| 4,757,505 A | 7/1988 | Marrington et al. | |
| 4,759,064 A | 7/1988 | Chaum | |
| 4,817,140 A | 3/1989 | Chandra et al. | |
| 4,837,728 A | 6/1989 | Barrie et al. | |
| 4,845,715 A | 7/1989 | Francisco | |
| 4,848,744 A | 7/1989 | Steininger et al. | |
| 4,856,787 A | 8/1989 | Itkis | |
| 4,862,355 A | 8/1989 | Newman et al. | |
| 4,865,321 A | 9/1989 | Nakagawa et al. | |
| 4,911,449 A | 3/1990 | Dickinson et al. | |
| 4,930,073 A | 5/1990 | Cina, Jr. | |
| 4,944,008 A | 7/1990 | Piosenka et al. | |
| 4,951,149 A | 8/1990 | Faroudja | |
| 4,972,470 A | 11/1990 | Farago | |
| 5,004,232 A | 4/1991 | Wong et al. | |
| 5,021,772 A | 6/1991 | King et al. | |
| 5,050,212 A | 9/1991 | Dyson | |
| 5,054,787 A | 10/1991 | Richardson et al. | |
| 5,103,081 A | 4/1992 | Fisher et al. | |
| 5,109,152 A | 4/1992 | Takagi et al. | |
| 5,136,644 A | 8/1992 | Audebert et al. | |
| 5,146,575 A | 9/1992 | Nolan | |
| 5,155,680 A | 10/1992 | Wiedemer | |
| 5,155,768 A | 10/1992 | Matsuhara | |
| 5,155,837 A | 10/1992 | Liu et al. | |
| 5,155,856 A | 10/1992 | Bock et al. | |
| 5,161,193 A | 11/1992 | Lampson et al. | |
| 5,173,876 A | 12/1992 | Wu et al. | |
| 5,179,517 A | 1/1993 | Sarbin | |
| 5,224,160 A | 6/1993 | Paulini et al. | |
| 5,224,707 A | 7/1993 | Martin | |
| 5,235,642 A | 8/1993 | Wobber et al. | |
| 5,259,613 A | 11/1993 | Marnell | |
| 5,264,958 A | 11/1993 | Johnson | |
| 5,283,734 A | 2/1994 | Yon Kohorn | |
| 5,288,978 A | 2/1994 | Iijima | |
| 5,291,585 A | 3/1994 | Sato et al. | |
| 5,297,205 A | 3/1994 | Audebert et al. | |
| 5,326,104 A | 7/1994 | Pease et al. | |
| 5,342,047 A | 8/1994 | Heidel et al. | |
| 5,343,527 A | 8/1994 | Moore | |
| 5,353,411 A | 10/1994 | Nakaosa et al. | |
| 5,357,604 A | 10/1994 | San et al. | |
| 5,375,241 A | 12/1994 | Walsh | |
| 5,379,431 A | 1/1995 | Lemon et al. | |
| 5,388,841 A | 2/1995 | San et al. | |
| 5,394,547 A | 2/1995 | Correnti et al. | |
| 5,398,799 A | 3/1995 | Ranon et al. | |
| 5,398,932 A | 3/1995 | Eberhardt et al. | |
| 5,400,246 A | 3/1995 | Wilson et al. | |
| 5,410,703 A | 4/1995 | Nilsson et al. | |
| 5,421,006 A | 5/1995 | Jablon et al. | |
| 5,421,009 A | 5/1995 | Platt | |
| 5,421,017 A | 5/1995 | Scholz et al. | |
| 5,428,525 A | 6/1995 | Cappelaere et al. | |
| 5,429,361 A | 7/1995 | Raven et al. | |
| 5,442,568 A | 8/1995 | Ostendorf et al. | |
| 5,444,642 A | 8/1995 | Montgomery et al. | |
| 5,465,364 A | 11/1995 | Lathrop et al. | |
| 5,469,571 A | 11/1995 | Bunnell | |
| 5,473,765 A | 12/1995 | Gibbons et al. | |
| 5,473,772 A | 12/1995 | Halliwell et al. | |
| 5,473,785 A | 12/1995 | Gibbons et al. | |
| 5,488,702 A | 1/1996 | Byers et al. | |
| 5,489,095 A | 2/1996 | Goudard et al. | |
| 5,497,490 A | 3/1996 | Harada et al. | |
| 5,498,003 A | 3/1996 | Gechter | |
| 5,507,489 A | 4/1996 | Reibel et al. | |
| 5,508,689 A | 4/1996 | Rado et al. | |
| 5,531,309 A | 7/1996 | Kloss et al. | |
| 5,542,669 A | 8/1996 | Charron et al. | |
| 5,548,782 A | 8/1996 | Michael et al. | |
| 5,553,290 A | 9/1996 | Calvert et al. | |
| 5,555,418 A | 9/1996 | Nilsson et al. | |
| 5,559,794 A | 9/1996 | Willis et al. | |
| 5,568,602 A | 10/1996 | Callahan et al. | |
| 5,575,717 A | 11/1996 | Houriet, Jr. et al. | |
| 5,586,766 A | 12/1996 | Forte et al. | |
| 5,586,937 A | 12/1996 | Menashe | |
| 5,594,903 A | 1/1997 | Bunnell et al. | |
| 5,604,801 A | 2/1997 | Dolan et al. | |
| 5,611,730 A | 3/1997 | Weiss | |
| 5,634,058 A | 5/1997 | Allen et al. | |
| 5,640,343 A | 6/1997 | Gallagher et al. | |
| 5,643,086 A | 7/1997 | Alcorn et al. | 463/29 |
| 5,644,704 A | 7/1997 | Pease et al. | |
| 5,654,746 A | 8/1997 | McMullan, Jr. et al. | |
| 5,655,961 A | 8/1997 | Acres et al. | |
| 5,655,965 A | 8/1997 | Takemoto et al. | |
| 5,664,187 A | 9/1997 | Burkes et al. | |
| 5,668,945 A | 9/1997 | Ohba et al. | |
| 5,671,351 A | 9/1997 | Wild et al. | |
| 5,682,533 A | 10/1997 | Siljestroemer | |
| 5,688,174 A | 11/1997 | Kennedy | |
| 5,702,303 A | 12/1997 | Takemoto et al. | |
| 5,702,304 A | 12/1997 | Acres et al. | |
| 5,704,835 A | 1/1998 | Dietz, II | |
| 5,707,286 A | 1/1998 | Carlson | |
| 5,715,462 A | 2/1998 | Iwamoto et al. | |
| 5,725,428 A | 3/1998 | Achmuller | |
| 5,737,418 A | 4/1998 | Saffari et al. | |
| 5,738,583 A | 4/1998 | Comas et al. | |
| 5,741,183 A | 4/1998 | Acres et al. | |
| 5,742,616 A | 4/1998 | Torreiter et al. | |
| 5,742,825 A | 4/1998 | Mathur et al. | |
| 5,752,882 A | 5/1998 | Acres et al. | |
| 5,758,875 A | 6/1998 | Giacalone, Jr. | |
| 5,759,102 A | 6/1998 | Pease et al. | |
| 5,761,647 A | 6/1998 | Boushy | 705/10 |
| 5,762,552 A | 6/1998 | Vuong et al. | |
| 5,768,382 A | 6/1998 | Schneier et al. | |
| 5,770,533 A | 6/1998 | Franchi | |
| 5,778,226 A | 7/1998 | Adams et al. | |
| 5,778,228 A | 7/1998 | Adams et al. | |
| 5,800,268 A | 9/1998 | Molnick | |
| 5,809,329 A | 9/1998 | Lichtman et al. | |
| 5,820,459 A | 10/1998 | Acres et al. | |
| 5,823,874 A | 10/1998 | Adams | |
| 5,833,540 A | 11/1998 | Miodunski et al. | |
| 5,836,817 A | 11/1998 | Acres et al. | |
| 5,845,077 A | 12/1998 | Fawcett | |
| 5,845,090 A | 12/1998 | Theodore | |
| 5,848,064 A | 12/1998 | Cowan | |
| 5,848,250 A | 12/1998 | Smith et al. | |
| 5,848,932 A | 12/1998 | Adams | |
| 5,851,149 A | 12/1998 | Xidos et al. | 463/42 |
| 5,863,041 A | 1/1999 | Boylan et al. | |
| 5,870,587 A | 2/1999 | Danforth et al. | |

| Patent | Date | Inventor |
|---|---|---|
| 5,870,723 A | 2/1999 | Pare, Jr. et al. |
| 5,871,400 A | 2/1999 | Yfantis |
| 5,872,973 A | 2/1999 | Mitchell et al. |
| 5,879,234 A | 3/1999 | Mengual |
| 5,885,158 A | 3/1999 | Torango et al. |
| 5,889,933 A | 3/1999 | Smith |
| 5,889,990 A | 3/1999 | Coleman et al. |
| 5,893,121 A | 4/1999 | Ebrahim et al. |
| 5,896,566 A | 4/1999 | Averbuch et al. |
| 5,901,319 A | 5/1999 | Hirst |
| 5,905,523 A | 5/1999 | Woodfield et al. |
| 5,934,672 A | 8/1999 | Sines et al. |
| 5,935,224 A | 8/1999 | Svancarek et al. |
| 5,944,821 A | 8/1999 | Angelo |
| 5,946,227 A | 8/1999 | Naji |
| 5,954,583 A | 9/1999 | Green |
| 5,970,143 A | 10/1999 | Schneier et al. |
| 5,971,849 A | 10/1999 | Falciglia |
| 5,971,851 A | 10/1999 | Pascal et al. ............... 463/24 |
| 5,980,384 A | 11/1999 | Barrie |
| 5,984,786 A | 11/1999 | Ehrman |
| 5,989,234 A | 11/1999 | Valerio et al. |
| 5,991,399 A | 11/1999 | Graunke et al. |
| 5,991,546 A | 11/1999 | Chan et al. |
| 5,995,745 A | 11/1999 | Yodaiken |
| 5,999,990 A | 12/1999 | Sharrit et al. |
| 6,003,038 A | 12/1999 | Chen |
| 6,006,034 A | 12/1999 | Heath et al. |
| 6,006,279 A | 12/1999 | Hayes |
| 6,008,279 A | 12/1999 | Shimizu et al. |
| 6,014,714 A | 1/2000 | Plyler et al. |
| 6,015,344 A | 1/2000 | Kelly et al. |
| 6,021,414 A | 2/2000 | Fuller |
| 6,022,274 A | 2/2000 | Takeda et al. |
| 6,026,238 A | 2/2000 | Bond et al. |
| 6,029,046 A | 2/2000 | Khan et al. |
| 6,035,321 A | 3/2000 | Mays |
| 6,039,645 A | 3/2000 | Mazur |
| 6,039,648 A * | 3/2000 | Guinn et al. ............... 463/16 |
| 6,044,428 A | 3/2000 | Rayabhari |
| 6,044,471 A | 3/2000 | Colvin |
| 6,047,128 A | 4/2000 | Zander |
| 6,052,778 A | 4/2000 | Hagy et al. |
| 6,071,190 A | 6/2000 | Weiss et al. |
| 6,073,124 A | 6/2000 | Krishnan et al. |
| 6,075,939 A | 6/2000 | Bunnell et al. |
| 6,089,975 A | 7/2000 | Dunn |
| 6,091,930 A | 7/2000 | Mortimer et al. |
| 6,099,408 A | 8/2000 | Schneier et al. ............... 463/29 |
| 6,102,796 A | 8/2000 | Pajitnov et al. |
| 6,104,815 A | 8/2000 | Alcorn et al. ............... 380/251 |
| 6,104,859 A | 8/2000 | Yoshida et al. |
| 6,106,396 A | 8/2000 | Alcorn et al. ............... 463/29 |
| 6,115,601 A | 9/2000 | Ferreira |
| 6,117,010 A | 9/2000 | Canterbury et al. |
| 6,126,548 A | 10/2000 | Jacobs et al. |
| 6,134,677 A | 10/2000 | Lindsay |
| 6,135,884 A | 10/2000 | Hedrick et al. |
| 6,135,887 A | 10/2000 | Pease |
| 6,139,433 A | 10/2000 | Miyamoto |
| 6,142,873 A | 11/2000 | Weiss et al. |
| 6,149,522 A | 11/2000 | Alcorn et al. ............... 463/29 |
| 6,154,878 A | 11/2000 | Saboff |
| 6,162,122 A | 12/2000 | Acres et al. |
| 6,165,072 A | 12/2000 | Davis et al. |
| 6,181,336 B1 * | 1/2001 | Chiu et al. ............... 715/736 |
| 6,185,678 B1 | 2/2001 | Arbaugh et al. |
| 6,190,257 B1 | 2/2001 | Takeda et al. |
| 6,193,606 B1 | 2/2001 | Walker et al. |
| 6,195,587 B1 | 2/2001 | Hruska et al. |
| 6,203,010 B1 | 3/2001 | Jorasch et al. |
| 6,203,427 B1 | 3/2001 | Walker et al. |
| 6,210,274 B1 | 4/2001 | Carlson |
| 6,214,495 B1 | 4/2001 | Segawa et al. |
| 6,215,495 B1 | 4/2001 | Grantham et al. |
| 6,219,836 B1 | 4/2001 | Wells et al. |
| 6,222,448 B1 | 4/2001 | Beck et al. |
| 6,222,529 B1 | 4/2001 | Outu-Lascar et al. |
| 6,224,482 B1 | 5/2001 | Bennett |
| 6,243,692 B1 | 6/2001 | Floyd et al. |
| 6,251,014 B1 | 6/2001 | Stockdale et al. |
| 6,253,374 B1 | 6/2001 | Dresevic et al. ............... 717/11 |
| 6,263,392 B1 | 7/2001 | McCauley |
| 6,264,557 B1 | 7/2001 | Schneier et al. |
| 6,264,561 B1 | 7/2001 | Saffari et al. |
| 6,269,474 B1 | 7/2001 | Price |
| 6,279,124 B1 | 8/2001 | Brouwer et al. |
| 6,290,602 B1 | 9/2001 | Kawano |
| 6,315,666 B1 | 11/2001 | Mastera et al. |
| 6,317,827 B1 | 11/2001 | Cooper |
| 6,319,125 B1 | 11/2001 | Acres |
| 6,322,445 B1 | 11/2001 | Miller |
| 6,324,605 B1 | 11/2001 | Rafferty et al. |
| 6,327,605 B2 | 12/2001 | Arakawa et al. |
| 6,331,146 B1 | 12/2001 | Miyamoto et al. |
| 6,364,768 B1 | 4/2002 | Acres et al. |
| 6,364,769 B1 | 4/2002 | Weiss et al. |
| 6,368,219 B1 | 4/2002 | Szrek et al. |
| 6,379,246 B1 | 4/2002 | Dabrowski |
| 6,394,907 B1 | 5/2002 | Rowe |
| 6,401,198 B1 | 6/2002 | Harmer et al. |
| 6,401,208 B2 | 6/2002 | Davis et al. |
| 6,409,602 B1 | 6/2002 | Wiltshire et al. |
| 6,446,211 B1 | 9/2002 | Colvin |
| 6,446,257 B1 | 9/2002 | Pradhan et al. ............... 717/154 |
| 6,449,687 B1 * | 9/2002 | Moriya ............... 711/112 |
| 6,453,319 B1 | 9/2002 | Mattis et al. ............... 707/100 |
| 6,454,648 B1 | 9/2002 | Kelly et al. ............... 463/16 |
| 6,460,142 B1 | 10/2002 | Colvin |
| 6,462,983 B2 | 10/2002 | Katti et al. |
| 6,484,264 B1 | 11/2002 | Colvin |
| 6,496,808 B1 | 12/2002 | Aiello et al. |
| 6,502,195 B1 | 12/2002 | Colvin |
| 6,503,147 B1 | 1/2003 | Stockdale et al. |
| 6,505,087 B1 | 1/2003 | Lucas et al. |
| 6,510,521 B1 | 1/2003 | Albrecht et al. |
| 6,511,377 B1 | 1/2003 | Weiss |
| 6,527,638 B1 | 3/2003 | Walker et al. |
| 6,575,833 B1 | 6/2003 | Stockdale et al. |
| 6,577,733 B1 | 6/2003 | Charrin |
| 6,595,856 B1 | 7/2003 | Ginsburg et al. |
| 6,620,047 B1 | 9/2003 | Alcorn et al. |
| 6,625,730 B1 | 9/2003 | Angelo et al. |
| 6,645,077 B2 | 11/2003 | Rowe |
| 6,646,948 B1 | 11/2003 | Stence et al. |
| 6,671,745 B1 | 12/2003 | Mathur et al. |
| 6,682,423 B2 | 1/2004 | Brosnan |
| 6,734,862 B1 | 5/2004 | Chapple et al. |
| 6,744,662 B2 | 6/2004 | Freitag |
| 6,775,778 B1 | 8/2004 | Laczko et al. |
| 6,785,825 B2 | 8/2004 | Colvin |
| 6,792,548 B2 | 9/2004 | Colvin |
| 6,792,549 B2 | 9/2004 | Colvin |
| 6,795,925 B2 | 9/2004 | Colvin |
| 6,795,928 B2 | 9/2004 | Bradley et al. |
| 6,798,599 B2 | 9/2004 | Dykes et al. |
| 6,799,277 B2 | 9/2004 | Colvin |
| 6,804,763 B1 | 10/2004 | Stockdale et al. |
| 6,805,634 B1 | 10/2004 | Wells et al. |
| 6,813,717 B2 | 11/2004 | Colvin |
| 6,813,718 B2 | 11/2004 | Colvin |
| 6,851,607 B2 | 2/2005 | Orus et al. |
| 6,857,078 B2 | 2/2005 | Colvin et al. |
| 6,866,581 B2 | 3/2005 | Martinek et al. |
| 6,890,259 B2 | 5/2005 | Breckner et al. |
| 6,902,481 B2 | 6/2005 | Breckner et al. |
| 6,907,522 B2 | 6/2005 | Morais et al. |
| 6,908,391 B2 | 6/2005 | Gatto et al. |
| 6,935,946 B2 | 8/2005 | Yoseloff et al. |
| 6,962,530 B2 | 11/2005 | Jackson |
| 6,978,465 B2 | 12/2005 | Williams |
| 6,988,267 B2 | 1/2006 | Harris et al. |
| 7,043,641 B1 | 5/2006 | Martinek et al. |
| 7,063,615 B2 | 6/2006 | Alcorn et al. |
| 7,107,378 B1 | 9/2006 | Brewer et al. |
| 7,116,782 B2 | 10/2006 | Jackson et al. |
| 7,131,909 B2 | 11/2006 | Rowe |
| 7,155,590 B2 | 12/2006 | Mathis |

| | | |
|---|---|---|
| 7,203,841 B2 | 4/2007 | Jackson et al. |
| 7,269,685 B2 | 9/2007 | Swanson |
| 7,278,068 B1 | 10/2007 | Crowder |
| 7,338,372 B2 | 3/2008 | Morrow et al. |
| 6,722,986 B1 | 4/2008 | Lyons et al. |
| 7,363,443 B2 | 4/2008 | Rubin |
| 7,367,889 B2 | 5/2008 | Canterbury |
| 7,399,229 B2 | 7/2008 | Rowe et al. |
| 7,470,182 B2 | 12/2008 | Martinek et al. |
| 7,491,122 B2 | 2/2009 | Ryan |
| 7,516,291 B2 | 4/2009 | van Riel et al. |
| 7,618,317 B2 | 11/2009 | Jackson |
| RE41,092 E | 1/2010 | Chu |
| 7,676,840 B2 | 3/2010 | Morais et al. |
| 2001/0000118 A1 | 4/2001 | Sines et al. |
| 2001/0003709 A1 | 6/2001 | Adams |
| 2001/0006195 A1 | 7/2001 | Sukeda et al. |
| 2001/0010046 A1 | 7/2001 | Muyres et al. |
| 2001/0044339 A1 | 11/2001 | Cordero et al. |
| 2001/0053712 A1 | 12/2001 | Yoseloff et al. |
| 2002/0032051 A1 | 3/2002 | Stockdale |
| 2002/0049909 A1 | 4/2002 | Jackson et al. |
| 2002/0052230 A1 | 5/2002 | Martinek et al. |
| 2002/0071557 A1 | 6/2002 | Nguyen et al. |
| 2002/0078142 A1 | 6/2002 | Moore et al. |
| 2002/0082084 A1 | 6/2002 | Snow et al. |
| 2002/0107067 A1 | 8/2002 | McGlone |
| 2002/0116284 A1* | 8/2002 | Steelman et al. ............ 705/26 |
| 2002/0137217 A1 | 9/2002 | Rowe |
| 2002/0151363 A1 | 10/2002 | Letovsky et al. |
| 2002/0155887 A1 | 10/2002 | Criss-Puszkiewicz et al. |
| 2002/0187826 A1 | 12/2002 | Seymour et al. |
| 2003/0014639 A1 | 1/2003 | Jackson et al. |
| 2003/0064771 A1 | 4/2003 | Morrow et al. |
| 2003/0064801 A1 | 4/2003 | Breckner et al. |
| 2003/0069074 A1* | 4/2003 | Jackson ......................... 463/43 |
| 2003/0078103 A1 | 4/2003 | LeMay et al. |
| 2003/0100373 A1 | 5/2003 | Fujimoto et al. |
| 2003/0229777 A1 | 6/2003 | Morais et al. |
| 2003/0148807 A1 | 8/2003 | Acres |
| 2003/0181242 A1 | 9/2003 | Lee et al. |
| 2003/0188306 A1 | 10/2003 | Harris et al. |
| 2003/0195033 A1 | 10/2003 | Gazdic et al. |
| 2003/0203755 A1 | 10/2003 | Jackson |
| 2003/0203756 A1 | 10/2003 | Jackson |
| 2003/0224858 A1* | 12/2003 | Yoseloff et al. ................ 463/43 |
| 2004/0002381 A1 | 1/2004 | Alcorn et al. |
| 2004/0038740 A1 | 2/2004 | Muir |
| 2004/0042112 A1 | 3/2004 | Stence et al. |
| 2004/0043814 A1 | 3/2004 | Angell et al. |
| 2004/0044849 A1 | 3/2004 | Stence et al. |
| 2004/0048667 A1 | 3/2004 | Rowe |
| 2004/0064647 A1 | 4/2004 | DeWhitt et al. |
| 2004/0072611 A1 | 4/2004 | Wolf et al. |
| 2004/0106452 A1 | 6/2004 | Nguyen et al. |
| 2004/0111332 A1 | 6/2004 | Baar et al. |
| 2004/0198479 A1 | 10/2004 | Martinek et al. |
| 2004/0198494 A1 | 10/2004 | Nguyen et al. |
| 2005/0010738 A1 | 1/2005 | Stockdale et al. |
| 2005/0192092 A1 | 9/2005 | Breckner et al. |
| 2006/0123391 A1 | 6/2006 | Lai |
| 2006/0142977 A1 | 6/2006 | Oh et al. |
| 2006/0171196 A1 | 8/2006 | Freitag et al. |
| 2006/0205515 A1 | 9/2006 | Cockerille et al. |
| 2006/0287098 A1 | 12/2006 | Morrow et al. |
| 2007/0015590 A1 | 1/2007 | Martinek et al. |
| 2007/0026938 A1 | 2/2007 | Rowe |
| 2007/0270212 A1 | 11/2007 | Cockerille et al. |
| 2008/0058055 A1 | 3/2008 | LeMay et al. |
| 2008/0058097 A1 | 3/2008 | Martinek et al. |
| 2008/0076576 A1 | 3/2008 | Graham et al. |
| 2008/0077871 A1 | 3/2008 | Baar et al. |
| 2008/0085772 A1 | 4/2008 | Iddings et al. |
| 2008/0096656 A1 | 4/2008 | LeMay et al. |
| 2008/0102919 A1 | 5/2008 | Rowe et al. |
| 2008/0248880 A1 | 10/2008 | Rowe et al. |

FOREIGN PATENT DOCUMENTS

| | | |
|---|---|---|
| AU | 2001255294 | 11/2001 |
| DE | 37 00 861 | 7/1988 |
| DE | 40 14 477 | 7/1991 |
| EP | 0 317 477 A2 | 5/1989 |
| EP | 317 477 | 5/1989 |
| EP | 0 689 325 | 6/1995 |
| EP | 0 685 246 A1 | 12/1995 |
| EP | 0 706 275 | 4/1996 |
| EP | 0 762 302 A1 | 3/1997 |
| EP | 762 302 | 3/1997 |
| EP | 0798634 A1 | 10/1997 |
| EP | 0841 615 | 5/1998 |
| EP | 0 996 058 A1 | 10/1998 |
| EP | 996 058 | 10/1998 |
| EP | 0996 058 A1 | 10/1998 |
| EP | 0 905 614 | 3/1999 |
| EP | 0 950 998 A2 | 10/1999 |
| EP | 0 953 930 A2 | 11/1999 |
| EP | 953 930 | 11/1999 |
| EP | 1 004 971 | 5/2000 |
| EP | 1255234 A2 | 6/2002 |
| EP | 1 255 234 A3 | 1/2004 |
| GB | 2 072 395 | 9/1981 |
| GB | 2 072 395 A | 9/1981 |
| GB | 2 121 569 | 12/1983 |
| GB | 2 134 297 | 8/1984 |
| GB | 2 147 773 | 5/1985 |
| GB | 2 151 054 | 7/1985 |
| GB | 2 201 821 | 9/1988 |
| GB | 2 202 984 | 10/1988 |
| GB | 2 253 325 A | 9/1992 |
| WO | WO94/19784 | 9/1994 |
| WO | WO 94/19784 | 9/1994 |
| WO | WO 96/00939 | 1/1996 |
| WO | WO96/00950 | 1/1996 |
| WO | WO 96/00950 | 1/1996 |
| WO | WO 96/14614 | 5/1996 |
| WO | 98/00207 | 1/1998 |
| WO | WO98-20417 | 5/1998 |
| WO | WO 98/20417 | 5/1998 |
| WO | WO 99/09474 | 2/1999 |
| WO | WO 99/49394 | 9/1999 |
| WO | WO 99/65579 | 12/1999 |
| WO | WO 00/33196 | 6/2000 |
| WO | 01/20424 | 3/2001 |
| WO | 01/22267 | 3/2001 |
| WO | WO01-22267 | 3/2001 |
| WO | 01/72064 | 9/2001 |
| WO | 02/05229 | 1/2002 |
| WO | WO 02/32526 A1 | 4/2002 |
| WO | 02/45808 | 6/2002 |
| WO | WO02-45808 | 6/2002 |
| WO | WO 02/45808 | 6/2002 |
| WO | 02/053245 | 7/2002 |
| WO | WO 02/073501 | 9/2002 |
| WO | WO03-013677 | 2/2003 |
| WO | 03/019486 | 3/2003 |
| WO | WO03-023647 | 3/2003 |
| WO | 03/028827 | 4/2003 |
| WO | 03/028828 | 4/2003 |
| WO | 2004/004280 | 1/2004 |
| WO | 2004/025497 | 3/2004 |
| WO | 2004/025595 | 3/2004 |
| WO | WO2004-051588 | 6/2004 |
| WO | WO 2006/002084 A1 | 1/2006 |
| WO | 2006/098932 | 9/2006 |
| WO | 2009/086183 | 7/2009 |

OTHER PUBLICATIONS

European Office Action dated Dec. 8, 2005 from a Corresponding EP Application No. 02768907.4 (4 pages).
Game Programming Gems, Mark DeLourna, Charles River Media, ISBN: 1-58450-049-2, 2000 (12 pages).
DirectX Media: Multimedia services for Microsoft Internet Explorer and Microsoft Windows, MSDN Library, http://msdn.microsoft.com, Oct. 1998 (10 pages).

Retro Fitting a Low-Boy Arcade Machine with a Pentium-Powered M.A.M.E. Setup. Oct. 1996, www.cygnus.uwa.edu.au/-jaycole/jaw/arcade/html (5 pages).
Object-Oriented Programming Concepts, Sun Microsystems, Inc. (2002) (16 pages).
Terry Monlick, What is Object-Oriented Software, Software Design Consultants, LLC (1999), (5 pages).
OnCore Systems, http://www.oncoresystems.com (1999) (8 pages).
Encyclopedia, http://www.eetnetwork.com/encyclopedia (2002) (7 pages).
Michael Tiemann, "Why Embedded Linux", http://www.linuxdevices.com/articles/AT8926600504, Oct. 28, 1999 (6 pages).
Rick Lehrbaum, "Why Linux", http://www.linuxdevices.com/articles/AT9663974466, Jan. 31, 2000 (pp. 1-2).
Rick Lehrbaum, "Why Linux", http://www.linuxdevices.com/articles/AT3611822672, Feb. 19, 2000 (pp. 1-5).
David A. Rusling, The Linux Kernel, http://tidp.org/LDP/tlk/tlk-title.htm, 1999 (168 pages).
"Linux Kernel Glossary", entry for ZFOD (zero-fill-on-demand), http://kernelnewbies.org/KernelGlossary, downloaded Jul. 7, 2007 (14 pages).
International Search Reports for applications PCT/US01/07447 and PCT/US01/07381 (5 pages).
International Search Report for application PCT/US02/30286 (5 pages).
Office Action dated Jun. 17, 2005 from U.S. Appl. No. 10/241,804 (23 pages).
Final Office Action dated Mar. 9, 2006 from U.S. Appl. No. 10/241,804 (26 pages).
Office Action Dated May 31, 2007 from U.S. Appl. No. 10/241,804 (13 pages).
Australian Office Action dated Dec. 12, 2005, from related Australian Application No. 2001245518 (2 pages).
Davida, G. et al., "Defending Systems Against Viruses through Cryptographic Authentication," Proceedings of the Symposium on Security and Privacy, *IEEE Comp. Soc. Press*, pp. 312-318 (May 1, 1989).
Document entitled: "Fact Sheet on Digital Signature Standard" dated May 1994, 6 pages.
Federal Information Processing Standards (FIPS) Publication 180-1 entitled: "Secure Hash Standard" dated Apr. 17, 1995, 2 title pages, abstract page and pp. 1-21.
Federal Information Processing Standards (FIPS) Publication 180 entitled: "Secure Hash Standard" May 11, 1993, title page, abstract page and pp. 1-20.
Federal Information Processing Standards (FIPS) Publication 186 entitled: "Digital Signature Standard (DSS)" dated May 19, 1994, 17 pages.
Hellman, Martin E., "The Mathematics of Public-Key Cryptography," Scientific American, vol. 241, No. 8, Aug. 1979, pp. 146-152 and 154-157.
Rivest, et al., "A Method for Obtaining Digital Signatures and Public-Key Cryptosystems," Communications of the ACM, vol. 21, No. 2, Feb. 1978, pp. 120-126.
Bauspiess, et al., "Requirements For Cryptographic Hash Functions," *Computers and Security*, 5:427-437 (Sep. 11, 1992).
Complaint for patent infringement filed by Aristocrat Technologies, et al., dated Jan. 22, 2002, Civil Action No. CV-S-02-0091.
Bakhtiari et al., Cryptographic Hash Functions: A Survey, 1995, Centre for Computer Security Research, pp. 1-26.
Schneier B.: "Applied Cryptography, Second Edition. Protocols, Algorithms, and Source Code in C" 1996, John Wiley & Sons, Inc. USA, XP002344241, pp. 446-449; pp. 458-459.
Menezes, A., Van Oorschot P., Vanstone S.: "Handbook of Applied Cryptography" 1996, CRC Press, USA, XP002344242, pp. 365-366.
European Office Action dated Dec. 8, 2005 from a related EP Application No. 02768907.4 4 pages.
Bernardi, Fabrice et al., "Model Design Using Hierarchical Web-Based Libraries", Jun. 10-14, 2002, Annual ACM IEEE Design Automation Conference, New Orleans, Louisiana, pp. 14-17.
WinSystems, http//www.webarchive.org/web/19881212034126/http://winsystems.com/ (Dec. 12, 1998), downloaded from the internet on Oct. 27, 2003, all pages.

RTD USA, http://www.webarchive.org.web/1990422091026/-http://rtdusa.com/ (Apr. 22, 1999), downloaded from the internet on Oct. 27, 2003, all pages.
Mardsen, et al. Development of a PC-Windows Based Universal Control System, 5th Intl. Conf. On FACTORY 2000, Apr. 2-4, 1997, Conf. Pub. No. 435, pp. 284-287.
RTD USA, www.rtdusa.com (1998), downloaded from the Internet on Mar. 20, 2003, pp. 1-49.
Paul Virgo, Embedded PC's for the Industrial Marketplace: An Analysis of the STD Bus, WESCON/'93. Conference Record, Sep. 28-30, 1993, pp. 621-623.
Jahn Luke et al., A commercial off-the-shelf based replacement strategy for aging avionics computers, Aerospace and Electronics Conference, 1998. NAECON 1998, Proceedings of the IEEE 1998 National, Jul. 13-17, 1998, pp. 177-181.
Get Control, Inc.; PC-104 DIG-10-48 Plus, http://www.getcontrol.com downloaded from the internet on Mar. 20, 2003, p. 1.
D. Powell et al., GUARDS: a generic upgradeable architecture for real-time dependable systems, Parallel and Distributed Systems, IEEE Transactions on, vol. 10, Issue: 6, Jun. 1999, pp. 580-599.
Robert A. Burckle, PC/104 Embedded Modules: The New Systems Components, http://www.winsystems.com/papers/sys_components.pdf downloaded from the internet on Mar. 20, 2003, pp. 1-3.
WinSystems, www.winsystems.com downloaded from the internet on Apr. 2, 2003, pp. 1-25.
Jim Blazer, PC/104 Intelligent Data Acquisition, PC Embedded Solutions (Spring 1998), pp. 1-2.
Robert A. Burckle, STD Bus: Performance without Complexity, http://www.winsystems.com/papers/stdperformance.pdf (Aug. 1, 2001), pp. 1-3.
Craig Matasumoto, Intel starts preaching about security, EE Times http://eetimes.com/story/OEG1990121S0014 (Jan. 21, 1999), pp. 1-4.
"Linux Kernel Glossary", entry for ZFOD (zero-fill-on-demand), http://kernelnewbies.org/KernelGlossary, downloaded Feb. 22, 2006 (14 pages).
Final Office Action dated Mar. 9, 2006 from U.S. Appl. No. 10/241,804.
Office Action dated Feb. 25, 2008 from U.S. Appl. No. 10/241,804.
International Search Report dated Jun. 12, 2007 from International Patent Application No. PCT/US01/07447 (5 pages).
International Search Report dated May 31, 2001 from International Patent Application No. PCT/US01/07381 (1 page).
International Search Report dated Feb. 6, 2006 from International Patent Application No. PCT/US02/30286 (5 pages).
Supplementary European Search Report dated Oct. 13, 2006 from European Patent Application No. 02775968.7 (3 pages).
European Office Action dated Aug. 23, 2007 from European Patent Application No. 02775968.7 (6 pages).
Bovet, et al., "Understanding the Linux Kernel," XP002332389, Jan. 2001 (pp. 1-34).
Answer and Counterclaims to Second Amended Complaint filed in connection with Civil Action No. CV-S-01-1498, Dec. 12, 2002 (pp. 1-26 and certificate of service page).
Defendants Supplemental Response to Plaintiffs' First Set of Interrogatories filed in connection with Civil Action No. CV-S-01-1498, Dec. 2002 (pp. 1-3, 50-68 and 85-86).
Game Programming Gems, Mark DeLourna, Charles River Media, ISBN: 1-58450-049-2, Aug. 2000 (12 pages).
European Search Report dated Sep. 28, 2005 from corresponding EP Application No. 01918440.7, 3 pages.
Linux Kernel Glossary, entry for ZFOD (zero-fill-on-demand), http://www.kernelnewbies.org/glossary, downloaded Feb. 22, 2006.
PCT Search Report mailed Jun. 12, 2001 from PCT/US02/07447, 5 pgs.
International Preliminary Examination Report dated Dec. 23, 2004 for PCT/US01/07447.
U.S. Office Action dated Jun. 15, 2004 from related U.S. Appl. No. 10/134,657 11 pages.
U.S. Final Office Action dated Jan. 30, 2007 from related U.S. Appl. No. 10/134,657, 11 pages.
U.S. Office Action dated Jul. 31, 2007 from related U.S. Appl. No. 10/134,657, 10 pages.

U.S. Office Action dated Feb. 25, 2008 from related U.S. Appl. No. 10/241,804.
U.S. Office Action dated Dec. 23, 2005 from U.S. Appl. No. 10/308,845.
U.S. Final Office Action dated Jun. 2, 2006 from related U.S. Appl. No. 10/308,845.
U.S. Office Action dated Dec. 13, 2006 from U.S. Appl. No. 10/308,845.
U.S. Final Office Action dated Aug. 13, 2008 from related U.S. Appl. No. 10/134,657, 9 pgs.
History of GSA, Web page [online]. Gaming Standards Association, 1997 [retrieved on Aug. 7, 2007] Retrieved from the Internet: <URL: http://www.gamingstandards.com/index.php?page=what_is_gsa/history_of_gsa>, 1 pg.
Value Proposition, Web page [online]. Gaming Standards Association, 1997 [retrieved on Aug. 7, 2007] Retrieved from the Internet: <URL:http://www.gamingstandards.com/index.php?page=what_is_gsa/value_proposition>, 2 pgs.
U.S. Office Action dated Nov. 22, 2005 from related U.S. Appl. No. 10/182,469.
U.S. Final Office Action dated Feb. 7, 2007 from related U.S. Appl. No. 10/182,469.
U.S. Office Action dated Aug. 14, 2007 from related U.S. Appl. No. 10/182,469.
U.S. Final Office Action dated Aug. 13, 2008 from related U.S. Appl. No. 10/182,469.
Australian Office Action dated Sep. 10, 2007 from Australian Application No. 2002331912, 3 pgs.
Office Action dated Jan. 24, 2008 from U.S. Appl. No. 11/933,057.
Notice of Allowance dated Aug. 1, 2008 from U.S. Appl. No. 11/933,057.
Office Action dated Jul. 2, 2004 from related U.S. Appl. No. 10/041,212, 12 pgs.
Notice of Allowance dated Jan. 26, 2005 from U.S. Appl. No. 10/041,212.
ISR dated Jun. 10, 2003 from PCT Application No. PCT/US02/30610, 7 pgs.
PCT Written Opinion dated Jul. 15, 2003 from PCT Application No. PCT/US02/30610, 2 pgs.
Examiner's First Report dated Sep. 7, 2007 from AU Application No. 2002327737.
EPO Official Letter dated Nov. 19, 2007 from related EP Application No. 02763743.8.
Supplementary Partial EP Search Report dated Apr. 17, 2007 from EP Application No. 01918453.0-2221.
Australian Examination Report dated Jul. 10, 2007 from AU Application No. 2001245529.
U.S. Office Action mailed Dec. 4, 2000 from U.S. Appl. No. 09/405,921.
U.S. Office Action mailed Apr. 20, 2001 from U.S. Appl. No. 09/405,921.
U.S. Office Action mailed Sep. 24, 2001 from U.S. Appl. No. 09/405,921.
U.S. Office Action mailed Jun. 14, 2002 from U.S. Appl. No. 09/405,921.
U.S. Office Action mailed Apr. 2, 2003 from U.S. Appl. No. 09/405,921.
U.S. Office Action mailed Oct. 3, 2003 from U.S. Appl. No. 09/405,921.
U.S. Office Action mailed Jun. 10, 2004 from U.S. Appl. No. 09/405,921.
Notice of Allowance mailed Dec. 3, 2004 from U.S. Appl. No. 09/405,921.
U.S. Office Action mailed Apr. 14, 2003 from U.S. Appl. No. 09/847,051.
U.S. Office Action mailed Nov. 4, 2003 from U.S. Appl. No. 09/847,051.
U.S. Office Action mailed May 6, 2004 from U.S. Appl. No. 09/847,051.
Notice of Allowance mailed Nov. 4, 2004 from U.S. Appl. No. 09/847,051.
U.S. Office Action mailed Aug. 29, 2001 from U.S. Appl. No. 09/520,405.
U.S. Office Action mailed Aug. 2, 2002 from U.S. Appl. No. 09/520,405.
U.S. Office Action mailed Mar. 20, 2003 from U.S. Appl. No. 09/520,405.
U.S. Office Action mailed Sep. 8, 2003 from U.S. Appl. No. 09/520,405.
U.S. Office Action mailed Sep. 3, 2004 from U.S. Appl. No. 09/520,405.
U.S. Office Action mailed Dec. 20, 2005 from U.S. Appl. No. 09/520,405.
U.S. Office Action mailed Jul. 14, 2006 from U.S. Appl. No. 09/520,405.
U.S. Office Action mailed Mar. 7, 2007 from U.S. Appl. No. 09/520,405.
U.S. Office Action mailed Sep. 13, 2007 from U.S. Appl. No. 09/520,405.
U.S. Office Action mailed Jul. 8, 2008 from U.S. Appl. No. 09/520,405.
U.S. Office Action mailed Nov. 10, 2004 from U.S. Appl. No. 10/827,042.
U.S. Office Action mailed Jan. 19, 2006 from U.S. Appl. No. 10/827,042.
U.S. Office Action mailed Feb. 12, 2007 from U.S. Appl. No. 10/827,042.
Notice of Allowance mailed Aug. 23, 2007 form U.S. Appl. No. 10/827,042.
Supplemental Notice of Allowance mailed May 5, 2008 from U.S. Appl. No. 10/827,042.
Statement of Grounds and Particulars dated Apr. 30, 2009 from Australian Patent Application No. 2002331912.
U.S. Office Action mailed Mar. 18, 2009 from U.S. Appl. No. 09/520,405.
U.S. Office Action dated Jan. 22, 2009 from related U.S. Appl. No. 10/134,657, 19 pgs.
U.S. Office Action mailed Dec. 22, 2008 from U.S. Appl. No. 10/241,804.
"Architecture for a Video Arcade Game Network," IBM Technical Disclosure Bulletin, Apr. 1, 1991, vol. 33, No. 11, pp. 138-141, NN9104138.
Oral Proceedings Mailed Sep. 15, 2008 In European Application No. 01918453.0.
Office Action mailed Dec. 30, 2008 in Canadian Application No. 2,402,389.
Office Action mailed Dec. 1, 2008 In Australian Application No. 2008200148.
Office Action mailed Nov. 6, 2008 in Canadian Application No. 2,402,351.
Notification of Transmittal of the International Search Report and the Written Opinion dated Feb. 24, 2009 from PCT/US2008/087809.
Chatley, Robert et al., "MagicBeans: a Platform for Deploying Plugin Components," Component Deployment, Lecture Notes in Computer Science LNCS, Springer Verlag, Berlin/Heidelberg vol. 3083, May 1, 2004, pp. 97-112. Retreived form the Internet, URL: http://pubs.doc.ic.ac.uk/MagicBeans/MagicBeans.pdf.
Notice of Allowance dated Jan. 9, 2009 from U.S. Appl. No. 11/933,057.
U.S. Office Action dated Apr. 28, 2009 from related U.S. Appl. No. 10/182,469.
Defendant's Supplemental Response to Plaintiff's First Set of Interrogations filed in connection with Civil Action No. CV-S-01-1498, (pp. 1-3, 50-68 and 85-86).
WinSystems, http://www.webarchive.org/web/19881212034126/http://winsystems.com (Dec. 12, 1998), downloaded from the internet on Oct. 27, 2003, all pages.
Brown, Brian, Hardware Systems, Part 2a: Buses and Interfaces, 2000, pp. 2,4, and 6.
Intel Corporation, Pentium III Processors for Applied Computing, 2001, Intel Corporation, Product Brief, pp. 1-2.
Freescale Semiconductor, Inc., 256K x 16 Bit 3.3-V Asynchronous Magnetoresistive RAM, Jul. 2004, Freescale Semiconductor, Inc., MR@A16A Rev. 0.1, pp. 3, 7-14.
Hiroaki Higaki, 8 page document entitled "Group Communication Algorithmfor Dynamically Updating in Distributed Systems" Copyright 1994 IEEE International Conference On Parallel and Distributed Systems (pp. 56-62) 08-8186-655-6/94, higakisdesun.slab.ntt.in.

Steffen Hauptmarm, et al., 12 page document entitled "On-line Maintenance With On-The-Fly Software Replacement" Copyright 1996 IEEE Proceedings, Third International Conference On Configurable Distributed Systems, (pp. 70-80) 0-8186-7395-8/96.

Hiroaki Higaki, 9 page document entitled "Extended Group Communication Algorithm For Updating Distributed Programs" Copyright 1996, IEEE, International Conference ON Parallel and Distributed Systems, 0-8186-7267 6/96, higQtakilab.k.dendai.as.ip.

U.S. Notice of Allowance dated Oct. 9, 2009 from U.S. Appl. No. 11/933,057.

U.S. Office Action dated Apr. 27, 2009 for U.S. Appl. No. 11/120,908.

U.S. Notice of Allowance dated Nov. 18, 2009 for U.S. Appl. No. 11/120,908.

Office Action from U.S. Appl. No. 11/077,526 dated Oct. 15, 2007.

Office Action from U.S. Appl. No. 11/077,526 dated May 22, 2008.

Final Office Action from U.S. Appl. No. 11/077,526 dated Nov. 25, 2008.

Examiner Interview Summary from U.S. Appl. No. 11/077,526 dated Sep. 24, 2009.

Notice of Allowance from U.S. Appl. No. 11/077,526 dated Sep. 24, 2009.

US Office Action from U.S. Appl. No. 10/241,398 dated Nov. 24, 2003.

US Final Office Action from U.S. Appl. No. 10/241,398 dated May 27, 2004.

US Final Office Action from U.S. Appl. No. 10/241,398 dated Dec. 13, 2004.

US Office Action from U.S. Appl. No. 10/241,398 dated Aug. 2, 2005.

Notice of Allowance from U.S. Appl. No. 10/241,398 dated Jun. 28, 2006.

US Office Action from U.S. Appl. No. 11/542,361 dated Sep. 26, 2007.

Notice of Allowance from U.S. Appl. No. 11/542,361 dated Nov. 8, 2007.

Notice of Allowance from U.S. Appl. No. 11/542,361 dated Mar. 11, 2008.

International Search Report for PCT Application No. PCT/US02/30782 dated Jun. 5, 2003.

Written Opinion for PCT Application No. PCT/US02/30782 dated Jul. 15, 2003.

International Preliminary Examination Report dated Sep. 9, 2003 for PCT/US02/30610.

CN Office Action dated Mar. 27, 2009 for Patent Application No. 200680015915.3.

EP Communication dated Apr. 15, 2008 from EP Application No. 06 721 157.3.

PCT International Search Report and Written Opinion from International Application No. PCT/US2006/007951, Jul. 10, 2006, 10 pages.

Notification Concerning Transmittal of International Preliminary Report on Patentability dated Sep. 20, 2007 from PCT Application No. PCT/US2006/007951, 7 Pages.

Australian Office Action, dated Jan. 28, 2009, from corresponding AU Application No. 2003262957.

Supplementary European Search Report dated Jan. 7, 2008 from corresponding European Patent Application No. 03795637.2.

European Office Action, dated Jan. 9, 2009, from corresponding EP Application No. 03795637.2.

International Search Report dated Jan. 14, 2004 for PCT Application No. PCT/US2003/026984.

EP Search Report dated Dec. 12, 2003 from EP Application No. 02253034.9, 3 pgs.

U.S. Notice of Allowance dated Apr. 13, 2010 issued in U.S. Appl. No. 11/933,057.

U.S. Notice of Allowance dated Apr. 13, 2010 issued in U.S. Appl. No. 11/120,908.

U.S. Office Action dated Sep. 26, 2007 issued in U.S. Appl. No. 11/542,361.

U.S. Notice of Allowance dated Nov. 8, 2007 issued in U.S. Appl. No. 11/542,361.

U.S. Notice of Allowance dated Mar. 11, 2008 issued in U.S. Appl. No. 11/542,361.

Australian Notice of Withdrawal of Opposition dated Aug. 13, 2009 issued in AU2002331912.

U.S. Notice of Allowance dated Aug. 18, 2010 issued in U.S. Appl. No. 11/120,908.

U.S. Advisory Action dated Oct. 12, 2006 issued in U.S. Appl. No. 10/308,845.

U.S. Notice of Allowance dated Jan. 13, 2010 issued in U.S. Appl. No. 11/077,526.

U.S. Notice of Allowance dated Mar. 29, 2010 issued in U.S. Appl. No. 11/077,526.

Australian Statement of Grounds and Particulars dated Apr. 3, 2009 in Support of Notice of Opposition filed in AU2002327737.

Australian Notice of Withdrawal of Opposition dated Aug. 20, 2009 filed in AU2002327737.

Australian Office Action dated May 6, 2010, issued in AU2009200160.

Australian Office Action No. 1 dated Feb. 20, 2009, issued in AU2003293029.

Chinese Office Action ($2^{nd}$) dated Nov. 6, 2009 issued in CN200680015915.3.

PCT International Search Report dated Apr. 23, 2004 issued in WO2004-051588.

Russian Office Action dated May 19, 2008, issued in RU2005118989.

* cited by examiner

GAME DEVELOPMENT ARCHITECTURE THAT DECOUPLES THE GAME LOGIC FROM THE GRAPHICS LOGICS

CROSS-REFERENCE TO RELATED APPLICATIONS

This application claims priority under 35 U.S.C. §119(e) from now abandoned U.S. Provisional Patent Application No. 60/325,965, filed Sep. 28, 2001, naming LeMay, et al. as inventors, and titled "Game Development Architecture That Decouples The Game Logic From The Graphics Logic."

BACKGROUND OF THE INVENTION

This invention relates to gaming software architectures for gaming machines such as slot machines and video poker machines. More particularly, the present invention relates to methods of decoupling the game logic from the graphics logic in the gaming software development process.

Typically, utilizing a master gaming controller, a gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including touch screens and button pads, to determine the wager amount and initiate game play. After game play has been initiated, the gaming machine determines a game outcome, presents the game outcome to the player and may dispense an award of some type depending on the outcome of the game.

As technology in the gaming industry progresses, the traditional mechanically driven reel slot machines are being replaced with electronic counterparts having CRT, LCD video displays or the like and gaming machines such as video slot machines and video poker machines are becoming increasingly popular. Part of the reason for their increased popularity is the nearly endless variety of games that can be implemented on gaming machines utilizing advanced electronic technology. In some cases, newer gaming machines are utilizing computing architectures developed for personal computers. These video/electronic gaming advancements enable the operation of more complex games, which would not otherwise be possible on mechanical-driven gaming machines and allow the capabilities of the gaming machine to evolve with advances in the personal computing industry.

To implement the gaming features described above on a gaming machine using computing architectures utilized in the personal computer industry, a number of requirements unique to the gaming industry must be considered. For instance, the gaming machine on the casino floor is a highly regulated device. It is licensed, monitored, taxed and serviced. Typically, within a geographic area allowing gaming, i.e. a gaming jurisdiction, a governing entity is chartered with regulating the games played in the gaming jurisdiction to insure fairness and to prevent cheating. For instance, in many gaming jurisdictions, there are stringent regulatory restrictions for gaming machines requiring a time consuming approval process of 1) new gaming hardware, 2) new gaming software and 3) any software modifications to gaming software used on gaming machines.

As an example of the software regulation and approval process, in many jurisdictions, to regulate gaming software on a gaming machine, a gaming software executable is developed and then burnt onto an EPROM. The EPROM is then submitted to various gaming jurisdictions for approval. After the gaming software is approved, a unique signature is determined for the gaming software stored on the EPROM using a method such as a CRC. Then, when a gaming machine is shipped to a local jurisdiction, the gaming software signature on the EPROM can be compared with an approved gaming software signature prior to installation of the EPROM on the gaming machine. The comparison process is used to ensure that approved gaming software has been installed on the gaming machine. After installation, an access point to the EPROM may be secured with evidence tape as a means of determining whether illegal tampering has occurred with the EPROM.

To generate a game of chance on the gaming machine, the approved gaming software is executed from the EPROM. The requirement to execute the gaming software from an EPROM has strongly influenced gaming software design for gaming machines. For instance to execute from an EPROM, monolithic software architectures, where a single gaming software executable is developed, have been used in the gaming industry. Object oriented software architectures used in the personal computer industry where different software objects may be dynamically linked together prior execution to create many different combinations of executables that perform different functions have not been used in the gaming industry. Further, in most gaming jurisdictions, to load and to unload software objects into RAM connected to a microprocessor and then execute the objects to play a game of chance, there are many regulations, imposed by the gaming jurisdictions, that must be satisfied. Because of these regulations, in the gaming industry, operating systems that allow software objects to be loaded into a RAM connected to a microprocessor have not been used.

Security is another factor that must be considered in the gaming industry. A gaming machine can be capable of accepting, storing and dispensing large sums of money. Thus, gaming machines are often the targets of theft attempts. Gaming software and gaming hardware are designed to resist theft attempts and include many security features not present in personal computers or other gaming platforms. For example, gaming software and hardware are designed to make it extremely difficult to secretly alter the gaming software to trigger an illegal jackpot.

The preservation of critical game information is another factor unique to the design of gaming machines and gaming machine software. Critical game information may include credits deposited into the gaming machine, credits dispensed from the gaming machine, records of games played on the gaming machine and records of access to the gaming machine (e.g., records of doors opened and gaming devices accessed on the gaming machine). For instance, it is not acceptable to lose information regarding money deposited into the gaming machine by a game player or an award presented to a player as a result of a power failure.

Gaming software executed on gaming machines is designed such that critical game information is not lost or corrupted. Therefore, gaming software is designed to prevent critical data loss in the event of software bugs, hardware failures, power failures, electrostatic discharges or tampering with the gaming machine. The implementation of the software design in the gaming software to meet critical data storage requirements may be quite complex and may require extensive of use the non-volatile memory storage hardware.

Traditionally, in the gaming industry, game design and the game platform design have been performed by single entities. Given the complex and unique requirements in the gaming industry, such as the regulatory environment and the security requirements, a vertically integrated design approach has been employed. Thus, a single gaming machine manufacturer will usually design a plurality of games for a game platform, design and manufacture a gaming machine allowing play of the games and submit the gaming software and gaming hardware for regulatory approval in various gaming jurisdictions.

The approach of the gaming industry may be contrasted with the video game industry. In the video game industry, games for a particular video game platform are typically developed by many companies different from the company that manufactures the video game platform. One trend in the gaming industry is a desire to create a game development environment similar to the video gaming industry where outside vendors may provide games to a gaming machine. It is believed that allowing outside vendors to develop games of chance for gaming machines will increase the games available for gaming machines and lower the costs and risks associated with game development. However, many outside software vendors are reluctant to enter the gaming software market because of the unique requirements of the gaming industry, such as the regulatory which typically increase gaming software development costs.

In view of the above, gaming software developments methods and gaming software architectures are needed that simplify the game development process.

SUMMARY OF THE INVENTION

This invention addresses the needs indicated above by providing a gaming machine that is designed to execute a modular gaming software architecture. A plurality of gaming software modules may be loaded into RAM on the gaming machine and executed to play a game of chance. Many of the gaming software modules are designed to communicate via application program interfaces so that the logic in many of the gaming software modules may be designed independently of each other. In particular, the modular gaming software architecture allows a game flow software module used to generate a game of chance on the gaming machine to be decoupled from a game presentation software module used to present the game chance. Thus, a group of games may be designed where the games share a common game flow software module but use different game presentation software modules to change the look and feel of the game.

One aspect of the present invention provides a gaming machine with a gaming system designed to utilize modular gaming software. The gaming machine may be generally characterized as including: 1) a master gaming controller designed to generate a game of chance played on the gaming machine by executing a plurality of gaming software modules; 2) a memory device storing the plurality of gaming software modules; 3) a gaming operating system comprising logic to load and unload gaming software modules into a RAM from the memory device and control the play of the game of chance; 4) a game flow software module comprising logic to generate a game flow for the game of chance; and 5) a game presentation software module comprising logic to present the game of chance on a display screen. At least the gaming operating system, the game flow software module and the game presentation software module are configured to communicate with each other via one or more application program interfaces. In one embodiment of the present invention, the game software module further comprises a game manager logical unit used to communicate with the game flow software module and the game presentation software module via the one or more application program interfaces and designed to control the play of the game of chance. The game of chance may be selected from group consisting of slot games, poker games, pachinko games, multiple hand poker games, pai-gow poker games, black jack games, keno games, bingo games, roulette games, craps games and card games.

In particular embodiments, the one or more application program interfaces may be selected from the group consisting of a game flow interface, a presentation interface, a bank interface and a configuration interface. The one or more application program interfaces maybe used to communicate game information where the game information is selected from the group consisting of game state information, presentation state information, configuration information, betting information, game outcome information, critical event data, I/O information and metering information. In particular, the one or more of the application program interfaces may be used to communicate sequence events used to control the play of the game of chance where the sequence events are selected from the group consisting game start, game end, stage start, stage end, process award, update display, check status of an item, synchronize presentation, state change, bet change, system meters changes, context status, game flow state, presentation substate, presentation substate complete, previous game flow state, previous presentation substate, synchronize bet, synchronize panel, synchronize play, synchronize player amount, synchronize all, money in, money out, device used to enter money and device used to pay out money.

In other embodiments, the game of chance may comprise a sequence of stages where at least one stage in the sequence of stages is a game stage. In addition, one or more stages in the sequence of stages may a bonus game stage. A number of stages in the sequence of stages may vary depending on an outcome of the game of chance.

The gaming machine may also comprise a plurality of game presentation modules used to present games of chance with different themes. In one example, a first game of chance with a first theme is played on the gaming machine using a first game presentation module and a second game of chance with a second theme is played on the gaming machine. In one embodiment of the present invention, the first game of chance and the second game of chance are played using the same gaming operating system, the same game flow software module and one or more of the same application program interfaces. The gaming operating system may load the first game presentation module to play the first game of chance and the gaming operating system may load the second game presentation module to play the second game of chance.

In other embodiments, the gaming machine may include a plurality of game flow software modules and game presentation modules used to present different types of games where the types of games are selected from card games, slot games, keno games, bingo games, dice games and pachinko games. With gaming software modules, a first type of game of chance may be played on the gaming machine and a second type of game of chance may played on the gaming machine using the same gaming operating system software module. Further, the first type of game of chance may be played on the gaming machine and the second type of game of chance may be played on the gaming machine using one or more of the same application program interfaces. The gaming operating system may load a first game flow software module and a first game presentation module to play the first type of game of chance and the gaming operating system may load a second game flow software module and a second game presentation module to play the second type of game of chance.

In particular embodiments, the gaming machine may also comprise a non-volatile memory device. The game flow software module may further comprise logic for storing game data generated by the game flow software module to the non-volatile memory device. In addition, the game flow software module may further comprise logic for a) generating a plurality of game states in the game flow and b) configuring parameters on the gaming machine used to play the game chance associated with the game flow software module. The game presentation software module may further comprise logic for displaying graphics and projecting sounds for each game state in the plurality of game states. The graphics and sounds generated by the game presentation software module for each game state may be generated without information about the next game state following each game state.

Another aspect of the present invention a method of playing a game of chance on a gaming machine. The method may be generally characterized as including: 1) receiving a plurality of gaming software modules for playing a game of chance on a gaming machine where the gaming software modules may communicate with one another via one or more application program interfaces; 2) loading a set of gaming software modules selected from the plurality of gaming software modules into a RAM on the gaming machine where the set of gaming software modules comprise at least: a) a gaming operating system that loads and unloads gaming software modules into the RAM from a memory device and controls the play of the game of chance, b) a game flow software module that generates the game flow for the game of chance; and c) a game presentation software module that presents the game of chance on a display screen on the gaming machine; and 3) executing the first set of gaming software modules to play a game of chance on the gaming machine.

In particular embodiments, the method may include one or more of the following: a) communicating game information via the one or more application program interfaces, b) communicating sequence events used to control the play of the game of chance via the one or more application program interfaces, c) starting one or more stages in a sequence of stages used to play the game of chance where the one or more stages in the sequence of stages may be selected from game stages and bonus game stages, d) loading a first game presentation software module, e) presenting a first game of chance using the first game presentation software module, loading a second game presentation software module, and presenting a second game of chance using the second game presentation software where the same gaming operating system and the same game flow software module may be used to present the first game of chance and the second game of chance, f) loading a first game presentation software module and a first game flow software module, presenting a first game of chance using the first game presentation software module and the first game flow software module, loading a second game presentation software module and a second game flow software module; and presenting a second game of chance using the second game presentation software module and the second game flow software module where the same gaming operating system and one or more of the same application flow interfaces may be used to present the first game of chance and the second game of chance, g) generating a plurality of game states in the game flow using the game flow software module, h) displaying graphics and projecting sounds for each game state in the plurality of game states in the game flow using the game presentation software module, i) storing critical game data to a non-volatile memory device using the game flow software module and j) configuring the gaming machine using the game flow software module.

Another aspect of the present invention a method of generating a game flow for the play of a game of chance in a game flow software module executed from a RAM on a gaming machine. The method may be generally characterized as including: 1) receiving a request to start a game flow; 2) generating a plurality of game states in the game flow used to play the game of chance, and 3) communicating with one or more gaming software modules via one or more application program interfaces. In particular embodiments, the gaming software module may be a gaming operating system software module that loads and unloads gaming software modules into the RAM from a memory device and controls the play of the game of chance or may be a game presentation software module a game presentation software module that presents the game of chance on a display screen on the gaming machine.

In other embodiments, the method may comprise one of more of the following: a) loading the game flow software module into the RAM, b) generating a game outcome and sending the game outcome to one or more gaming software modules via the one or more application program interfaces, c) receiving a command to end the game and entering an idle state, d) receiving a command to process an award and processing an award, e) communicating game state information to gaming software modules via one or more application program interfaces, and f) storing critical game data in a non-volatile memory device.

Another aspect of the present invention provides a method of generating a game presentation for the play of a game of chance in a game presentation software module executed from a RAM on a gaming machine. The method may be generally characterized as including: 1) receiving a request to start a game presentation; 2) receiving game state information for a game state on the gaming machine; 3) displaying graphics and sounds for the game state on a display screen and on audio output devices on the gaming machine; and 4) communicating with gaming software modules via one or more application program interfaces. In particular embodiments, the gaming software module may be a gaming operating system software module that loads and unloads gaming software modules into the RAM from a memory device and controls the play of the game of chance or may be a game flow software module that generates the game flow for the game of chance.

In particular embodiments, the method may include one or more of the following: a) reading critical game information from a non-volatile storage device, b) updating metering displays on the gaming machine, c) synchronizing the display of graphics with the output of sounds on the gaming machine, d) sending a message acknowledge the completion of a presentation for a game state and e) communicating presentation state information via one or more application program interfaces.

Another aspect of the present invention provides a method of generating a game of chance played on a gaming machine using a gaming operating system executed from a RAM on the gaming machine, the method comprising: 1) receiving a request to start the game of chance from an input device located on the gaming machine; 2) sending a command, via a game flow application program interface, to start the game of chance to a game flow software module that generates the game flow for the game of chance; 3) sending a plurality of commands to control the play of the game of chance; and 4) communicating with gaming software modules via one or more application program interfaces. The gaming software modules may include: a) a game presentation software module that presents the game of chance on a display screen on the gaming machine and b) a gaming device driver that communicates with a gaming device located on the gaming machine where gaming device may be selected from the group consisting of lights, printers, coin hoppers, bill validators, ticket readers, card readers, key pads, button panels, display screens, speakers, information panels, motors, mass storage devices and solenoids.

In particular embodiments, the method may include one or more of the following: a) receiving a request to play a particular game of chance, loading from a memory storage device a game flow software module that generates the game flow for the particular game of chance; and loading from a memory storage device a gaming presentation software module a game presentation software module that presents the game of chance on a display screen on the gaming machine, b) sending a command, via an application program interface, to start a bonus game to a bonus game flow software module that generates the bonus game flow for the bonus game, c) communicating game information via the one or more application program interfaces, d) receiving a game outcome from the game flow software module via at least one of the one or more application program interfaces, e) sending a command to process an award to the game flow software module via the game flow application program interface, f) receiving presentation state information from a game presentation software module via the one or more application program interfaces, g) sending a command to the game flow software module via the game flow application interface to end the game of chance, h) storing a game history for the game of chance to a non-volatile memory device and i) communicating game information to remote gaming devices where the remote gaming device is a player tracking server.

Another aspect of the invention pertains to computer program products including a machine-readable medium on which is stored program instructions for implementing any of the methods described above. Any of the methods of this invention may be represented as program instructions and/or data structures, databases, etc. that can be provided on such computer readable media.

These and other features of the present invention will be presented in more detail in the following detailed description of the invention and the associated figures.

DESCRIPTION OF THE PREFERRED EMBODIMENTS

Figure 1:
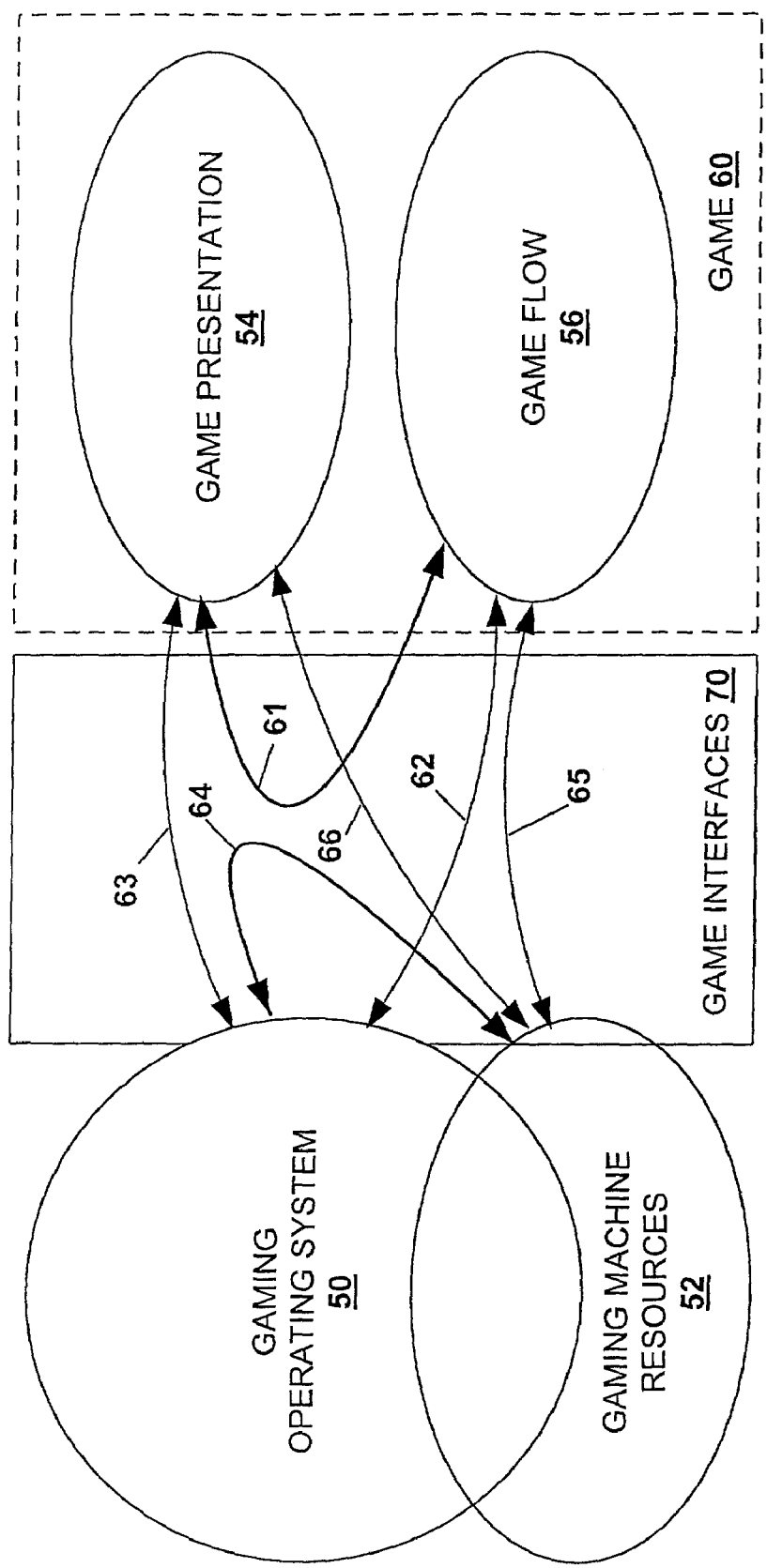
FIG. 1 is a block diagram of a gaming machine software architecture for one embodiment of the present invention.

FIG. 1 is a block diagram of a gaming machine software architecture for one embodiment of the present invention. In the present invention, the gaming machine software architecture allows the gaming software to be divided into a plurality of gaming software modules that communicate with one another via application program interfaces. The logical functions performed in each gaming software module and the application program interfaces used to communicate with each gaming software module may be defined in many different ways. Thus, the examples of gaming software modules and the examples of application program interfaces in the present invention are presented for illustrative purposes only and the present invention is not limited to the gaming software modules and application program interfaces described herein.

In FIG. 1, four types of gaming software modules, a gaming Operating System (OS) software module 50, gaming machine resource software modules 52, a game presentation software module 54 and a game flow software module 56 are shown. The game presentation software module 54 and the game flow software module are part of game software 60 used to present a game of chance on a gaming machine. The gaming operating system software module 50, the gaming machine resource software modules 52, the game presentation software module and the game flow software module may communicate with one another via a number of application program interfaces 70. Details of some of the logic components and functions of gaming software modules and the application program interfaces for embodiments of the presentation invention are described with respect to FIGS. 1, 2A, 2B, and 3. Examples of interactions between different gaming software modules are described with respect to FIGS. 4, 5, 6, 7A, 7B and 8. Methods of using the gaming software architecture and gaming software of the present invention are described with respect to FIGS. 10, 11 and 12. Examples of gaming machine hardware that may be used to implement the gaming machine software architecture of the present invention are described with respect to FIGS. 13, 14 and 15.

The Gaming OS software module 50 comprises logic for core machine-wide functionality. It controls the mainline flow as well as critical information such as meters, money, device status, tilts and configuration used to play a game of chance on a gaming machine. All of the gaming OS software module functions may reside inside of a single software module 50. However, logical units inside of the gaming OS software module 50 may also be moved outside of the gaming OS software module for increased configurability of the gaming machine software. The logical units that may be separated from the gaming OS software module are referred to as gaming machine resource software modules. The gaming machine resource software modules 52 are shown overlapping with the gaming operating system software modules 50 because the gaming machine resource software modules may be packaged with the gaming OS software modules 50 or separate from the gaming OS software modules 50 in different embodiments of the present invention. Many logical units in the gaming operating system module 50 may be designed so that they can be removed from the Gaming OS. Configuration of the gaming OS software system modules 50 and other gaming software modules may be achieved through configuration files, dynamic link libraries, logic executed on the gaming machine and run-time decision mechanisms.

The game flow software module 56 comprises the logic and the state machine to drive the game. In one embodiment, the game core does not contain logic for handling: meters, money, cash-in devices, cash-out devices, tilts, I/O from input devices such as buttons or communications. Game information provided by the meters, cash-in devices, cash-out devices, tilts and other I/O devices that is needed by the game flow software module 56 to generate one or more states in a game flow may be communicated to the game flow software module 56 via one or more application program interfaces (APIs) supported by the game flow software module 56.

In general, API's let application programmers use functions of a software module without having to directly keep track of all the logic details within the software module used to perform the functions. Thus, the inner working of a software module with a well-defined API may be opaque or a "black box" to the application programmer. However, with knowledge of the APL the application programmer knows that a particular output or set of outputs of the software module, which are defined by the API, may be obtained by specifying an input or set of inputs specified by the API.

Typically, API's describe all of key transactions and associated processing necessary to perform a particular function. For example, game flow software module functions, such as generating a game outcome or controlling a game presentation, may be described as part of one or more APIs for the game flow software module 56. An API may be considered analogous to a device driver in that it provides a way for an application to use a hardware subsystem without having to know every detail of the hardware's operation. Using a well-defined APIs, the logic functions of various software modules may be decoupled.

In one embodiment, the game flow software module 56 comprises logic for generating a game flow, understanding configuration parameters on the gaming machine, storing critical information to a non-volatile memory and the game state. In particular, after game play has been initiated on the gaming machine, the game flow software module logic may determine a game outcome and generate a number of game states used in presenting the game outcome and any possible award as a result of the game outcome to the player. Configuration parameters on the gaming machine used by the game flow software module may include but are not limited to a maximum bet amount, a number of paylines and a game denomination.

In general, gaming machines include hardware and methods for recovering from operational abnormalities such as power failures, device failures and tilts. Thus, the gaming machine software logic and in particular the gaming flow software module 56 are designed to generate a series of game states where critical game data generated during each game state is stored in a non-volatile memory device. Since a series of game states are generated in the gaming software modules as part of a game flow, the gaming machine is often referred to as a state machine.

The gaming machine does not advance to the next game state in the flow of game states until it is confirmed that the critical game data for the current game state has been stored in the non-volatile memory device. As an example, when the gaming flow software module 56 generates an outcome of a game of chance in a game state, the gaming flow software module 56 does not advance to the next logical game state in the game flow until game information regarding the game outcome has been stored to the non-volatile memory device. As another example, when money is deposited into the gaming machine, the gaming OS system software module 50 does not advance to another state until the amount deposited to the machine has been stored to a non-volatile memory device. The gaming software modules may read critical data from a non-volatile memory device and may store critical data to a non-volatile storage device using an API. The API for the non-volatile memory device and hardware for the non-volatile memory storage device are described in co-pending U.S. application Ser. No. 09/690,931, filed on Oct. 17, 2000 by LeMay, et al., entitled "High Performance Battery Backed Ram Interface," which is incorporated herein in its entirety and for all purposes.

The game flow software module 56 does not contain logic for generating audio or visual output for a particular game state. The game flow software module 56 maintains the state of the game and communicates information about the current game state to other gaming software modules via APIs 70 which generate the audio and visual output. In one embodiment of the present invention, the logic for generating audio or visual output for a particular game state is located in the game presentation software module 54. Thus, the game presentation software module 54 generates a presentation state corresponding to the current game state determined by the game flow software module 56. The game flow software module 56 may communicate gaming information necessary for the game presentation module 54 to generate a presentation state via for a particular game state via one or more APIs 70.

The game presentation software module 54 may produce all of the player display and feedback for a given game 60. However, when the game presentation module 54 is decoupled, via APIs, from the game flow software module 56, the game presentation software module 54 makes no assumptions about game flow. Therefore, the game presentation software module 54 knows it's current presentation state and previous presentation state and what to draw or which sounds to play for each presentation state. However, the game presentation software module 54 does not have knowledge of the next presentation state in the game flow. Knowledge of the next presentation state in the game flow would require the game presentation software module 54 to incorporate game flow logic and would prevent the decoupling of the game flow logic from the game presentation logic.

The presentation state generated by the game presentation software module 54, corresponding to gaming information received by the module for a particular game state, may comprise graphical, audio output and other outputs from gaming devices located on the gaming machine. For instance, the game presentation software module 54 may receive from the gaming OS software module 50 or another gaming software module gaming information indicating a credit has been deposited in the gaming machine. After receiving the information indicating the credit has been deposited, the game presentation software module 54 may update a meter display on the display screen to reflect the additional credit. In general, a gaming machine may provide any type of sensory input to a game player playing a game on a gaming machine. Thus, gaming devices that provide tactile sensations, olfactory sensations and even taste sensations, may be used in conjunction with gaming devices that provide visual and audio output as part of a game presentation on the gaming machine.

In another example, the game flow software module may send game information, using one or more APIs, to the game presentation software module 54 regarding a game state in the game flow, such as a game outcome, generated by the game flow software module 56. After receiving the game information regarding the game outcome, the game presentation software module 56 may generate a game outcome presentation for the game outcome comprising a series of video frames displayed on one or more display screens and sounds projected from one or more audio devices. Part of the game outcome presentation could be a simple console application using printf( ) for output and scanf( ) for player input.

As part of the game outcome presentation, the game presentation software module 54 may generate commands used to activate other peripheral devices on the gaming machine such as lights, bonus wheels, mechanical reels, etc. In general, the game presentation software module 54 does not directly control peripheral devices. Direct control of peripheral devices is usually handled by the gaming OS 50. The game presentation software module 54 may communicate with the peripheral devices via one or more APIs supported by the gaming presentation software module.

As described above, when decoupled from the game flow, the game presentation software module makes no assumptions about game flow which means it does not assume the order of states or the logic that will be needed to determine the next state. The presentation can, however, control flow by making the game flow software module 56 wait for the current presentation state (animation) to complete. Thus, for some game states, the game flow software module 56 may not advance to the next game state in the game flow until, it receives an acknowledgement from the game presentation software module 54 that a current presentation state has been completed.

Video frames generated by the game presentation software module 54 may be used to record the game's essential record for game state information. The record of game state information is often called a "game history" record. The essential record of a game state is the structure in a non-volatile memory storage device, such as NV-RAM, that completely describes the current state of the game. The game state record in NV-RAM may be read by the game presentation software module 54. In addition, video frames containing game state information may be stored to a non-volatile memory device. Details of frame capture in a gaming machine are described in co-pending U.S. application Ser. No. 09/689,498, filed Oct. 11, 2000, by LeMay, et al., title "Frame Buffer Capture of Actual Game Play," which is incorporated herein in its entirety and for all purposes.

In general, gaming software logical units, such as a game flow software module 56 and game presentation software module 54 are both required in order to generate a game of chance on the gaming machine. However, a division of logical functions into gaming software modules is not limited to a gaming OS 50, gaming machine resources 52, a game presentation 54 and a game flow 56 as described in FIG. 1. In other embodiments of the present invention, the logical functions may be divided into more or less gaming software modules than the four gaming software modules shown in FIG. 1. For instance, in one embodiment of the presentation invention, the gaming presentation software module 54 and the game flow software module 56 may be integrated as a single game software module 60 that is decoupled from the gaming OS 50 and communicates with the gaming OS 50 and the gaming machine resources 52 via one or more APIs. In this embodiment, the game presentation 54 and game flow are not decoupled. In another example, the game flow software module 56 may comprise a plurality of game flow software modules that may communicate with other gaming software modules using a set of common APIs and are decoupled from one another and the other gaming software modules. In yet another example, the game presentation software module 54 or gaming OS software module 50 may be divided into smaller logic units with different APIs for communication that are decoupled from one another and the other gaming software modules.

The APIs supported by the different gaming software modules, such as gaming operating system 50, the gaming machine resources 52, the game presentation 54 and the game flow, provide many possible game interfaces 70 for communicating game information that may or may not be supported by a particular embodiment of the present invention. For instance, in one embodiment of the present invention, an API 61 supported by the game presentation 54 and the game flow 56 may allow the game flow 56 and the game presentation 54 to directly communicate gaming information to one another. In another embodiment of the presentation, the game flow 56 may communicate gaming information via API 62 to the gaming OS 50. The gaming OS 50 may then communicate gaming information received from the game flow 56 to gaming machine resources 52 via API 64 and to the game presentation 54 via API 63. Further, the game presentation 54 may send gaming information to the gaming OS via API 63. The gaming OS 50 may then communicate gaming information received from the game presentation 54 to gaming machine resources 52 via API 64 and to the game flow 56 via API 62.

A particular gaming software module may support many different APIs. For instance, the gaming operating system 50, gaming machine resources, the game presentation 54 and game flow each support 3 APIs. However, a particular gaming software module may support a varying number of APIs depending on the software design. Further, the information carried in each API may vary and is not limited to the examples described herein.

When the gaming software architecture is divided into a plurality of gaming software modules that communicate via well-defined application program interfaces 70, gaming software developers may independently develop gaming software modules that are compatible with the defined application program interface without a direct knowledge of the logic used in related gaming software modules. For instance, a single game flow software module 56 may be used to support many different types of game presentation software modules 54 to generate different game themes and styles. Each game presentation software module may be required to support a specific set of APIs. However, with the gaming software architecture of the present invention, the developer can develop a game without knowledge of the game flow logic, gaming OS logic and gaming machine resource logic.

An advantage of decoupling the gaming software modules using APIs may be a faster software development and approval process. For instance, when a developer can develop a new game by generating only a new game presentation software module, the game development process is faster because much less code has to be written. Further, if the APIs can be shown to be very fault tolerant (e.g., a particular software module will not produce undetectable erroneous results when given incorrect data via an API), then only new or modified gaming software modules installed on a gaming machine, such as a new game presentation software module for a new game, may have to be submitted for approval to a gaming jurisdiction prior to installation on the gaming machine. Previously approved gaming software that may be used in conjunction with new or modified gaming software module to present a game of chance, such as a previously approved game flow software module or a previously approved gaming OS software module, may not have to be resubmitted for approval. Since the amount of code submitted for approval may be less, the approval process may be streamlined. Currently, since most games installed on gaming machines are monolithic in nature with a single executable, any changes to a game for any reason requires all of the gaming software to be submitted for approval which is usually very time consuming.

Figure 2A:
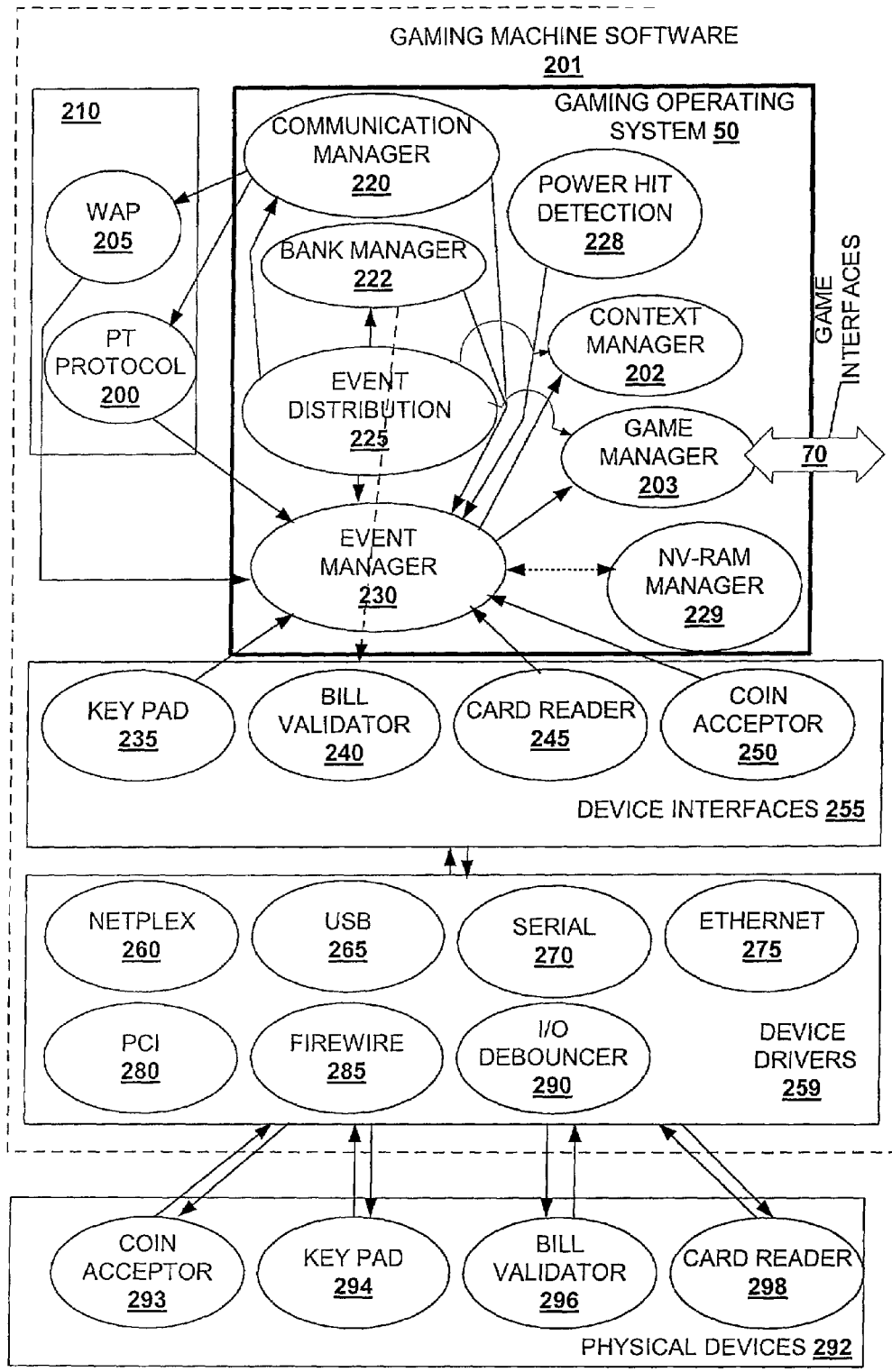
FIG. 2A is a block diagram depicting gaming machine software modules for one embodiment of the gaming system software architecture.
Figure 2B:
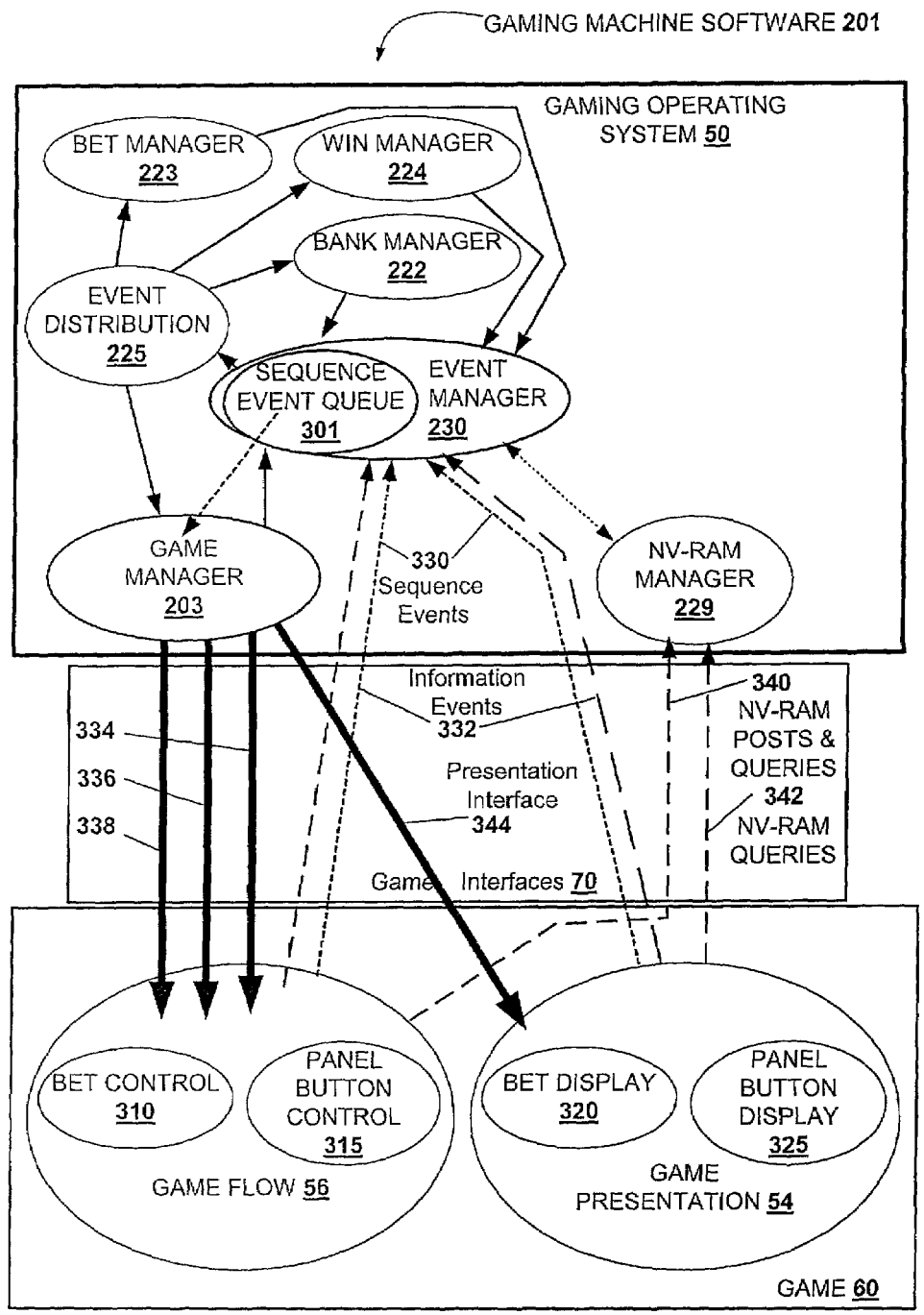
FIG. 2B is a block diagram depicting gaming machine software modules and application program interfaces for one embodiment of the present invention.

FIG. 2A is a block diagram depicting gaming machine software modules for one embodiment of the gaming system software architecture. In FIG. 2A, the gaming operating system 50 and the gaming machine resources 52, as described with respect to FIG. 1, and the hardware-software are described in more detail for one embodiment of the present invention. In FIG. 2B, the gaming presentation software module 54, the game flow software module 56 and the game interfaces 70, as described with respect to FIG. 1, are described in more detail for one embodiment of the present invention.

Various hardware and software architectures may be used to implement this invention. FIG. 2A is a block diagram depicting one suitable example of gaming machine software elements in a gaming machine with a software architecture 201 employing a NV-RAM manager 229 to access a physical non-volatile memory storage device 234 as described with reference to FIG. 14. The NV-RAM manager 229 controls access to the non-volatile memory on the gaming machine. The NV-RAM manager is a "process" executed by an operating system 50 residing on the gaming machine. A "process" is a separate software execution module that is protected by the operating system executed by the microprocessor on the master gaming controller 224 (See FIG. 14). When a process, including the NV-RAM manger 229, is protected, other software processes or software units executed by the master gaming controller can not access the memory of the protected process. Other processes that may be considered part of the operating system include but are not limited to a communication manager 230, a bank manager 222, an event manager 230, a game manager 203, a power hit detection 228 and a context manger 202.

The game OS 50 may be used to load and unload gaming software modules, such as the communication manager 230, a bank manager 222, an event manager 230, a game manager 203, a power hit detection 228 and a context manger 202, from a mass storage device on the gaming machine into RAM for execution as processes on the gaming machine. The gaming OS 50 may also maintain a directory structure, monitor the status of processes and schedule the processes for execution. During game play on the gaming machine, the gaming OS 50 may load and unload processes from RAM in a dynamic manner.

The NV-RAM manager 229 is a protected process on the gaming machine to maintain the integrity of the non-volatile memory space on the gaming machine. All access to the non-volatile memory is through the NV-RAM manager 229 via defined API supported by the NV-RAM manager. During execution of the gaming machine software 201, the non-volatile manager 229 may receive access requests via the event manager 230 from other processes, including a bank manager 222, a game manager 203 and one or more device interfaces 255 to store or retrieve data in the physical non-volatile memory space. Other software units that request to read, write or query blocks of memory in the non-volatile memory are referred to clients.

The NV-RAM manager 229 processes the access requests from the clients including allocating and de-allocating memory in the NV-RAM and checking for various errors. The space allocated by the NV-RAM manager 229 in the NV-RAM may be temporary or permanent. Temporary space may be used to process important commands regarding the "state" of the gaming machine. After the commands are processed, the temporary space may be allocated for other purposes. Permanent space may be used to store important data on the gaming machine including accounting information and a game history containing a record of previous game outcomes that may be utilized for dispute resolution on the gaming machine. The layout of the temporary space and the permanent space in the NV-RAM may be represented in the software as a file system. Examples of client access to the NV-RAM including the allocation and de-allocation of memory and details of a non-volatile memory allocation system and non-volatile memory file system are described in co-pending U.S. application Ser. No. 09/690,931, filed on Oct. 17, 2000 by LeMay, et al., entitled "High Performance Battery Backed Ram Interface," previously incorporated herein For error checking, the NV-RAM manager, uses access protocols and a distinct file system to check the client's NV-RAM access request to ensure the request does not corrupt the data stored in the non-volatile memory space or the request does not return corrupted data. For example, the NV-RAM manager 229 checks read and write requests to insure the client does not read or write data beyond a requested block size. In the past, software errors from numerous software units may have resulted in the corruption of the non-volatile memory space because clients were able to directly access the NV-RAM. When the non-volatile memory space is corrupted (e.g. critical data is accidentally overwritten), often the entire physical NV-RAM memory is reinitialized and all the critical stored on the gaming machine is lost. Using the NV-RAM manager 229 to check all accesses to the physical non-volatile memory, many of types of data corruption scenarios may be avoided.

With the non-volatile memory protected from invalid reads and writes by the NV-RAM manager 229, a critical data layer can be built using the client access protocols to the non-volatile memory storage device 234. Critical data is a specific term used in the gaming industry to describe information that is stored in the non-volatile memory storage device 234 and is critical to the operation and record keeping in the gaming machine. Critical data is stored in non-volatile memory using strict error checking to catch errors due to software problems, hardware failures, electrostatic discharge and tampering. An operational requirement for gaming machines is that critical data is never left in an invalid state. Therefore, the gaming software is designed to always know the state of the critical data such that the critical data is not left in an invalid state with an unknown status. For instance, when data caching is used to store data to another location, the gaming machine software may not be able to determine during certain periods whether the data remains in the cache or whether it has been copied to another location. While the state of the data in cache remains unknown, the data is in an invalid state. When critical data is stored, the requirement of avoiding invalid states includes the scenario where critical data is being modified and the power to the gaming machine is lost. To handle these requirements, the NV-RAM manager 229 may be used with a state-based software transaction system.

In one embodiment of a state-based software transaction system, the gaming machine software 201 defines a state. A state is critical data that contains a state value, critical data modifiers and substates. The state value is an integer value that has meaning to the user of the state. The critical data modifiers are types of critical data that store information about how to modify critical data. Substates are states themselves, but are linked to the state.

The critical data modifiers may be stored and associated with the state using a list. Typically, the critical data modifiers may be grouped to form a list of critical data transactions. A critical data transaction is usually comprised of one or more critical data modifiers. For instance, a critical data transaction to print an award ticket might comprise the operations of 1) start using printer, 2) disable hopper and 3) decrement the credits on the gaming machine by the amount printed to the award ticket where each operation is comprised of one or more critical data modifiers. The list is maintained as critical data to ensure that the items on the list are always valid i.e. the list may not be lost in the event of a power failure or some other gaming machine malfunction. All the transactions in a list for a state are completed or all the transactions are not completed which is a standard transaction technique.

The critical data transactions are a description of how to change critical data. The transactions are executed by the NV-RAM manager 229 after requests by clients. The list is built until the gaming machine software 201 executes the list by changing the state value which is the mechanism for initiating a transaction. If power is lost to the gaming machine during a transaction, the transaction can be completed due to the design of the state. On power recovery, the gaming machine can determine what state it was in prior to the power failure and then execute the critical data transactions listed in the state until the transactions are completed. For a given state, once the critical data transactions listed in the state are complete, the information describing the critical data transactions comprising the state may be discarded from the non-volatile memory and the gaming machine software may begin execution of the next state.

One feature of the state based transaction system using the non-volatile memory is that the gaming OS 50 may determine when a rollback is required. Once a list of critical data transactions is built as part of state, the transactions may be executed or rolled back. A rollback occurs when the entire list of critical data transactions is discarded and operations specified in the transactions are not executed. The state-based transaction based system is designed such that it is not possible for only a portion of the list of transactions in a state to be performed i.e. the entire list of transactions in the state may either be rolled back or executed. This feature of the state-based system tends to improve the software reliability and capability because errors due to the partial execution of states do not have to be considered in the software design. It also allows for faster software development.

Returning to FIG. 2, many game states involving critical data transactions involving the NV-RAM manager 229 and the physical NV-RAM 234 are generated in the context of the operation of the gaming machine software 201. Details of the gaming machine software 201 and examples of critical data transactions are described in the following paragraphs. The main parts of the gaming machine software 201 are communication protocols 210, the gaming OS 50 with an event manager 230 and event distribution 225, device interfaces 255, device drivers 259 and a game 60 (see FIGS. 1 and 3). These software modules comprising the gaming machine software 201 are loaded into memory of the master gaming controller 224 (see FIGS. 14 and 15) of the gaming machine at the time of initialization of the gaming machine.

The device drivers 259 communicate directly with the physical devices including a coin acceptor 293, a key pad 294, a bill validator 296, a card reader 298 or any other physical devices that may be connected to the gaming machine. The device drivers 259 utilize a communication protocol of some type that enables communication with a particular physical device. The device driver abstracts the hardware implementation of a device. For example, a device drive may be written for each type of card reader that may be potentially connected to the gaming machine. Examples of communication protocols used to implement the device drivers 259 include Netplex 260, USB 265, Serial 270, Ethernet 275, Firewire 285, I/O debouncer 290, direct memory map, serial, PCI 280 or parallel. Netplex is a proprietary IGT standard while the others are open standards. For example, USB is a standard serial communication methodology used in the personal computer industry. USB Communication protocol standards are maintained by the USB-IF, Portland, Oreg., http://www.usb.org.

The device drivers may vary depending on the manufacturer of a particular physical device. For example, a card reader 298 from a first manufacturer may utilize Nelplex 260 as a device driver while a card reader 298 from a second manufacturer may utilize a serial protocol 270. Typically, only one physical device of a given type is installed into the gaming machine at a particular time (e.g. one card reader). However, device drivers for different card readers or other physical devices of the same type, which vary from manufacturer to manufacturer, may be stored in memory on the gaming machine. When a physical device is replaced, an appropriate device driver for the device is loaded from a memory location on the gaming machine allowing the gaming machine to communicate with the device uniformly.

The device interfaces 255, including a key pad 235, a bill validator 240, a card reader 245, and a coin acceptor 250, are software modules/units that provide an interface between the device drivers and the gaming system 215. The device interfaces 255 may receive commands from the game manager unit 203 or software units requesting an operation for one of the physical devices. The commands may be methods implemented by the software units as part of the API supported by the software unit. For example, the bank manager 222 may send a command to the card reader 245 requesting a read of information of a card inserted into the card reader 298. The dashed arrow from the bank manager 222 to the device interfaces 255 indicates a command being sent from the bank manager 222 to the device interfaces 255. The card reader device interface 245 may sends the message to the device driver for the card reader 298. The device driver for the physical card reader 298 communicates the command and message to the card reader 298 allowing the card reader 298 to read information from a magnetic striped card or smart card inserted into the card reader.

The information read from the card inserted into to the card reader may be posted to the event manager 230 via an appropriate device driver 259 and the card reader device interface 245. The event manager 230 is typically a shared resource that is utilized by all of the software applications in the gaming OS 50 including the game manager 203 and the bank manager 222. The event manager 230 evaluates each game event to determine whether the event contains critical data or modifications of critical data that are protected from power hits on the gaming machine i.e. the game event is a "critical game event."

As previously described in regards to the gaming machine's transaction based software system, critical data modifications defined in a critical game event may be added to a list of critical game transactions defining a state in the gaming machine by the event manager 230 where the list of critical game transactions may be sent to the NV-RAM via the NV-RAM manager 229. For example, the operations of reading the information from a card inserted into the gaming machine and data read from a card may generate a number of critical data transactions. When the magnetic striped card in the card reader 298 is a debit card and credits are being added to the gaming machine via the card, a few of the critical transactions may include 1) querying the non-volatile memory for the current credit available on the gaming machine, 2) reading the credit information from the debit card, 3) adding an amount of credits to the gaming machine, 4) writing to the debit card via the card reader 245 and the device drivers 259 to deduct the amount added to gaming machine from the debit card and 5) copying the new credit information to the non-volatile memory. As another example, a game outcome generated by the game flow software module 56 may be stored to the NV-RAM via the NV-RAM manager 229.

The operations, described above, that are performed in transferring credits from the debit card to the gaming machine may be stored temporarily in the physical non-volatile memory storage device 234 as part of a list of critical data transactions executed in one or more states. The critical data regarding the funds transferred to the gaming machine may be stored permanently in the non-volatile memory space as gaming machine accounting information. After the list of critical data transactions are executed in a current state, the list is cleared from the temporary non-volatile memory space allocated by the NV-RAM manager 229 and the non-volatile memory space may be utilized for other purposes.

In general, a game event may be received by the device interfaces 255 by polling or direct communication. The solid black arrows indicate event message paths between the various software units. Using polling, the device interfaces 255 regularly send messages to the physical devices 292 via the device drivers 259 requesting whether an event has occurred or not. Typically, the device drivers 259 do not perform any high level event handling. For example, using polling, the card reader 245 device interface may regularly send a message to the card reader physical device 298 asking whether a card has been inserted into the card reader. Using direct communication, an interrupt or signal indicating a game event has occurred is sent to the device interfaces 255 via the device drivers 259 when a game event has occurred. For example, when a card is inserted into the card reader, the card reader 298 may send a "card-in message" to the device interface for the card reader 245 indicating a card has been inserted which may be posted to the event manager 230. The card-in message is a game event. Other examples of game events which may be received from one of the physical devices 292 by a device interface, include 1) Main door/Drop door/Cash door openings and closings, 2) Bill insert message with the denomination of the bill, 3) Hopper tilt, 4) Bill jam, 5) Reel tilt, 6) Coin in and Coin out tilts, 7) Power loss, 8) Card insert, 9) Card removal, 10) Promotional card insert, 11) Promotional card removal, 12) Jackpot and 13) Abandoned card.

Typically, the game event is an encapsulated information packet of some type posted by the device interface. The game event has a "source" and one or more "destinations." As an example, the source of the card-in game event may be the card reader 298. The destinations for the card-in game event may be the bank manager 222 and the communication manager 220. The communication manager may communicate information on read from the card to one or more devices located outside the gaming machine. When the magnetic striped card is used to deposit credits into the gaming machine, the bank manager 222 may prompt the card reader 298 via the card reader device interface 255 to perform additional operations. Each game event contains a standard header with additional information attached to the header. The additional information is typically used in some manner at the destination for the event.

In one embodiment, communications are decoupled from the game flow 56 and the game presentation 54 (see FIGS. 1 and 2B). The only game-side information that may be available to the communication manager 220 may be posted by the game flow 56 or game presentation 54 as gaming events distributed through the event manager 230. The gaming information may be posted by the game flow 54 in response to information requests from other process. The communication manager 220 may also provide game control information to the game flow 56 and game presentation 54 through information events and gaming system requests that are routed through the game manager 203 via game interfaces 70. The game control information may be used by a remote gaming device to control aspects of the game play on the gaming machine. For example, a remote gaming device may be trigger a bonus game play on a gaming machine by sending control information via the communications manager 220 which is routed through the game OS 50 to the game flow 56.

As described above, game events are created when an input is detected by one of the device interfaces 255. The game events are distributed to their one or more destinations via a queued delivery system using the event distribution software process 225. However, since the game events may be distributed to more than one destinations, the game events differ from a device command or a device signal which is typically a point to point communication such as a function call within a program or interprocess communication between processes.

Since the source of the game event, which may be a device interface or a server outside of the gaming machine, is not usually directly connected to destination of the game event, the event manager 230 acts as an interface between the source and the one or more event destinations. After the source posts the event, the source returns back to performing its intended function. For example, the source may be a device interface polling a hardware device. The event manager 230 processes the game event posted by the source and places the game event in one or more queues for delivery. The event manager 230 may prioritize each event and place it in a different queue depending on the priority assigned to the event. For example, critical game events may be placed in a list with a number of critical game transactions stored in the NV-RAM as part of a state in the state-based transaction system executed on the gaming machine.

After a game event is received by the event manager 230, the game event is sent to event distribution 225 in the gaming OS 50. Event distribution 225 broadcasts the game event to the destination software units that may operate on the game event. The operations on the game events may trigger one or more access requests to the NV-RAM via the NV-RAM manager 229. For instance, when a player enters a bill into the gaming machine using the bill validator 296, this event may arrive at the bank manager 222 and the game manager 203 after the event has passed through the device drivers 259, the bill validator device interface 245, the event manager 230, and the event distribution 225 where information regarding the game event such as the bill denomination may be sent to the NV-RAM manager 229 by the event manager 230. After receiving the "bill entered" game event, the game manager 203 evaluates the game event and determines whether a response is required to the game event. When a credit meter is generated on the display screen of the gaming machine by a game presentation software module 54 (see FIGS. 1 and 3), the game manager may send a message via one of the APIs in the game interfaces 70 to the game presentation software module 54. The game presentation software module 54 may then update the credit meter to reflect the change in state of the meter.

On the other hand, the bank manager 222, after receiving the "bill entered" game event, evaluates the game event and determines whether a response is required to the game event. For example, the bank manager 222 may decide to increment the amount of credits on the machine according to the bill denomination entered into the bill validator 296. Thus, one function of the bank manager software 222 and other software units is as a game event evaluator. More generally, in response to the game event, the bank manager 222 may 1) generate a new event and post it to the event manager 230, 2) send a command to the device interfaces 255, 3) send a command or information to the wide area progressive communication protocol 205 or the player tracking protocol 200 so that the information may be sent outside of the gaming machine, 4) do nothing or 5) perform combinations of 1), 2) and 3).

Non-volatile memory may be accessed via the NV-RAM manager 229 via commands sent to the gaming machine from devices located outside of the gaming machine. For instance, an accounting server or a wide area progressive server may poll the non-volatile memory to obtain information on the cash flow of a particular gaming machine. The cash flow polling may be carried out via continual queries to the non-volatile memory via game events sent to the event manager 230 and then to the NV-RAM manager 229. The polling may require translation of messages from the accounting server or the wide area progressive server using communication protocol translators 210 residing on the gaming machine.

The communication protocols typically translate information from one communication format to another communication format. For example, a gaming machine may utilize one communication format while a server providing accounting services may utilize a second communication format. The player tracking protocol translates the information from one communication format to another allowing information to be sent and received from the server. Two examples of communication protocols are wide area progressive 205 and player tracking protocol 200. The wide are progressive protocol 205 may be used to send information over a wide area progressive network and the player tracking protocol 200 may be used to send information over a casino area network. The server may provide a number of gaming services including accounting and player tracking services that require access to the non-volatile memory on the gaming machine.

The power hit detection software 228 monitors the gaming machine for power fluctuations. The power hit detection software 228 may be stored in a memory different from the memory storing the rest of the software in the gaming system 215 or it may stored in the same memory. When the power hit detection software 228 detects that a power failure of some type may be eminent, an event may be sent to the event manger 230 indicating a power failure has occurred. This event is posted to the event distribution software 225 which broadcasts the message to all of the software units and devices within the gaming machine that may be affected by a power failure. The power hit detection is used by the NV-RAM controller to determine whether data may be read or written from the NV-RAM 234.

Device interfaces 255 are utilized in the gaming OS 50 so that changes in the device driver software do not affect the gaming OS 50 or even the device interface software 255. For example, player tracking events and commands that each physical device 292 sends and receives may be standardized so that all the physical devices 292 send and receive the same commands and the same player tracking events. Thus, when a physical device is replaced 292, a new device driver 259 may be required to communicate with the physical device. However, device interfaces 255 and gaming machine system OS remain unchanged. As described above, isolating software units in this manner may hasten game development and approval process. The various software elements described herein (e.g., the device drivers, device interfaces, communication protocols, etc.) may be implemented as software objects or other executable blocks of code or script. In one embodiment, the elements are implemented as C++ objects. The event manager 230, event distribution 225, game manager 203 and other gaming OS software units may also by implemented as C++ objects. Each are compiled as individual processes and communicate via events and/or interprocess communication (IPC). Event formats and IPC formats may be defined as part of an API.

The context manager 202 arbitrates requests from the different display components within the gaming operating system and determines which entity is given access to the screen, based on priority settings. At any given time, multiple entities may try to obtain control of the screen display. For example, a game may require screen access to show display meters in response to an operator turning a jackpot reset key. This creates a need for one entity to determine to whom and under what circumstances screen control is granted i.e. the context manager 202.

The context manager listens to and responds to game events passed through the event manager 230 and event distribution specifically those that are requests for any of its known contexts to enter or exit. There are two circumstances under which the context manager 202 grants control of the screen: a) the current context is finished displaying information or 2) a higher priority context requires access to the screen. Contexts that may request access to the display screen include but are not limited to a menu context that displays machine menu, a tilt context that displays tilts including hand pays, a game context that displays regular game play, bonus games and cash outs, an attract context that displays attract menus and a main menu context that displays a game selection menu and other game service menus available on the gaming machine. In descending order from highest to lowest, the priority of the contexts is the machine menu context, the tilt context, the game context, bonus game context, the attract context and the main menu context.

FIG. 2B is a block diagram depicting gaming software modules and application program interfaces for one embodiment of the present invention. In particular, the game flow software module 56, the game presentation software module, their interactions with each other and the gaming operating system 50 and the game interfaces allowing the interactions are described. In FIG. 2B, the game flow presentation module 56, the game presentation software module 54 and the game operating system 50 are decoupled logical units. The game flow module 56, the game presentation software module 54 and the game operating system 50 communicate by a number of APIs that allow the software units to be decoupled. Again, the interfaces and logical units described in FIG. 2 are for illustrative purposes only and the present invention is not limited to the embodiment in FIG. 2.

In one embodiment of the present invention, the game manager 203 is the software module that manages all games installed on the gaming machine. Typically, the game manager 203 is loaded as a process by the gaming OS 50. As described above, a "process" is a separate software execution module that is protected by the operating system and executed by the microprocessor on the master gaming controller. When a process is protected, other software processes or software units executed by the master gaming controller can not access the memory of the protected process. The game manager 203 may determine which games are to run and then drive the current game. In some embodiments, the game manager 203 may be the only process that can communicate directly with the game 60. In this case, all other processes use the game manager 203 as a gateway to game communication. In the following paragraphs, configuration files used by the game manager to initialize and drive games installed on the gaming machine are described and then interactions between the game manager 203, game flow software module 56 and game presentation software module are illustrated.

The gaming OS 50 supports a file system that may be used to organize the gaming software stored on the gaming machine. The collection of files that comprises all of the games installed on the machine is called the game package. These files may include the software, configuration files, scripts and multi-media files. The game manager 203 uses information in these files to control the play of a game on the gaming machine.

A game list registry file (e.g., "gamelist.registry") may be used to list all of the games installed on the gaming machine that can be played. Additional games may be installed on the gaming machine, such as on a mass storage device, but these games may not have been installed in a manner allowing them to be used for game play. Each game installed on the gaming machine has an entry in this file. The game manager 203 reads this file at power up to determine the games on the gaming machine that can be played. The game list registry file may be located in "/Games" directory in gaming file system. The game manager 203 will use the first registry found in the directory. This registry file lists all games that can be played on the machine. When the installation of games on the gaming machine is changed, the game list registry file is also changed. When the game OS 50 detects a change in the game list registry file, the non-volatile memory on the gaming machine may be cleared The game list registry file contains information about the games installed on the gaming machine that may be driven by the game manger 203. For instance, the game list registry file may specify a number of games which is the number of games installed on the gaming machine. Each of these games has reference in the file. A game may be defined as a paytable that is in use. For example, two games listed in the game list registry file may be based on the theme called the "Lifestyles of the Rich and Famous." The games may use the same game code and the same game resources but different paytables. Since the games use different paytables, they may be considered different games.

The game list registry file may specify the number of game themes or game families and a maximum number of games that may be enabled at one time (e.g., one or more games may be enabled at any one time). A theme is a collection of games all sharing a same name and a same graphical presentation. As an example, two game themes may be the "Lifestyles of the Rich and Famous" and "Little Green Men." When these themes are installed on the gaming machine, the total number of themes is 2.

The collection of games listed in the game list registry file may be assigned a unique identification code consisting of numbers and letter. The identification code is unique to the list of games installed on the gaming machine. Communication protocols installed on the gaming machine (e.g., 210 in FIG. 2A) may be used to report the identification code to host systems in communication with the gaming machine. Using the unique identification code, the host systems may be able to determine some information about the game installed on the gaming machine.

Each theme installed on the gaming machine may have its own unique section in the game list registry file, which provides additional information to the game manager 203. The theme sections may be listed according to a theme number. The theme numbers for each section may start with 0 and go up to "total number of themes—1". For instance, when the number of themes is three, the theme numbers heading each theme section in the registry file may be "theme 0", "theme 1" and "theme 3."

Under each theme section, a number of games for each theme is specified. Under each theme section, a game registry file to use for each game is listed up to the number of games specified for the theme. The game registry file is a file located in the file system supported by the game operating system. Like the game list registry, each game registry file lists all of the necessary information for loading and running each game. Each game listed in the theme sections is given a unique game index. The first game is game 0. All subsequent games must increment the game index by 1 and continue through the game list registry file.

An example of some of the information in a game list registry, as described above, is given in the following paragraph. In the example, the number of games is 4. The number of themes is 2. The number of enabled games is 1. The unique ID for the set of games is PA000001. Two games are registered in each theme section where the game index for the four games is game0, game1, game2 and game3. A file location in the file system containing the information for loading and running each game is specified.

---

[GameList]
NumberOfGames=4
NumberOfThemes=2
MaximumNumberOfEnabledGames=1
uniqueID=PA000001
[Theme0]
Lifestyles of the Rich and Famous
NumberOfRegistries=2
Game0="/IGT/Games/LifestylesRichFamous/Generic/Registries/GameFlow/GamePreliminary.registry"

-continued

```
Game1="/IGT/Games/LifestylesRichFamous/Generic/Reg
istries/GameFlow/GameGaffed.registry"
[Theme1]
Little Green Men
NumberOfRegistries=2
Game2="/IGT/Games/LittleGreenMen/Generic/Registrie
s/GameFlow/game.registry"
Game3="/IGT/Games/LittleGreenMen/Generic/Registrie
s/GameFlow/game2.registry"
```

At initialization, the game manager 203 stores information for each game listed in the game list registry file. For instance, in the example above, the game manager 203 stores information for four games such as a game index (e.g., game 0, game 1, game 2) and game registry file locations. In addition, the game manager 203 stores information regarding the number of stages, a game flow software module 54, game presentation software module 56, a paytable name, a paytable percentage and other items. The additional information may be contained in the game registry files, such as "/IGT/Games/LittleGreenMen/Generic/Registries/GameFlow/game2.registry," and other files in the game package. Within the gaming OS 50, the game manager 203 may function as a game information server by allowing other processes to query the information stored by the game manager 203 about the various games via an IPC (Inter Process Communication, see FIG. 2A).

In the present invention, games 60 may comprise one or more stages. In each game 60, at least one stage is a game stage. The game stage provides the logic for the player to play a game of chance such as a poker hand, slot game or other game of chance. To customize a particular game of chance, additional stages may be added to game of chance by a game developer. Possible stages that may be added include double-ups and bonus rounds. The game manager 203 initializes each stage in a game at start-up or as required during game play as necessary. The stages may be preloaded or loaded on demand by the gaming OS 50.

In one embodiment of the present invention, the game 60 and the logical units within the game 60 do not determine which stage to launch. The game package provides a list of information for the game manager 203 to determine which stage should be active at any time. With this design, stages can be added on to game without the game's knowledge and the game manager 203 can determine when one stage has ended and another stage needs to be started. When all stages have ended for a game, the game is considered complete. Additional details of staging within a game are described with respect to FIGS. 3, 4, 7A and 7B.

Now, details of the interfaces between the game manager 203 and the game 60 are described. Four interfaces, a game flow interface 334, a bank interface 336, a configuration interface 338 and a presentation interface 344 are shown in the game interface 70. The interfaces allow communications between the game flow 65 and game presentation 54 defined by APIs supported by the game flow software module 56 and the game presentation software module 54. IPCs may also be included in the game interface 70 and are not shown. As previously noted, the interfaces and APIs are for illustrative purposes only and the present invention is not limited to the examples described herein.

In one embodiment of the present invention, the interfaces 334, 336, 338 may be implemented with QNX IPC methods that are translated into C++ virtual functions in the game 60. QNX is a Unix-based operating system provided by QNX Software Systems, LTD (Kanata, Ontario, Canada). Since QNX IPC methods are being used to communicate from the gaming OS 50 to the game 60, the game can not talk back to the gaming OS 50. Thus, the interfaces, 334, 336, 338 and 344 provide only one way communication between the game manager 203 and the game flow 56 and the game manager 203 and the game presentation 54. Other operating systems, such as windows based operating system, may allow for bi-directional interfaces.

Each game 60 installed on the gaming machine is configured to support a standard game flow interface 334, presentation interface 344, a bank interface 336 and configuration interface 338. Each interface may be considered an API. In one embodiment of the present invention, the game flow logic and the game presentation logic are decoupled. In this case, the game flow presentation software module 56 supports the game flow interface 334, the bank interface 336 and the configuration interface while the game presentation software module 54 supports the presentation interface.

The game flow interface 334 is configured to transmit queries requesting game information and game events containing game information. The queries may include requests for game information, such as a game name, a game state, a game type, etc. The game flow 56 maintains a state variable. There may be any number of defined states and substates of the state variable depending on the logic in the game flow 56. The game defines each state value and corresponding virtual method to call to enter that state. The game base class defines the most basic (and essential) game states with their corresponding virtual methods. Some examples of game states include the idle, start, and win states (see FIG. 6). Once the game state has been "entered" and the corresponding virtual method called, the game flow 56 is considered to be in that state and the method will not be called again. Thus, during execution of the game flow module, the game manager 203 may request information about the current game state in the game flow 56 via the game flow interface 56.

Game events, as described above, are messages including game information of some type. The game information received by game flow 54 via the game flow interface 334 is used to generate the game flow. The game information may include but is not limited to game state information, presentation state information, configuration information, betting information, game outcome information, critical event data, I/O information and metering information. For instance, the game information may indicate that a player has requested to start a game, credits have been added to the gaming machine via one or more gaming devices located on the gaming machine or a presentation state generated by the game presentation 54 has been completed.

As the game flow 56 changes game states it posts information events for the system to know about the status of game play. When a game of chance is complete, for example, it will post events indicating the end of the game and the outcome of the game. The bank manager 222 will listen to these events and increment the appropriate game meters. If the game flow 56 includes logic for game-specific meters, it will maintain them itself. The bank interface 336 may be used to transmit gaming information and queries for gaming information regarding money handling. The game 60 may receive a button request to bet, which it forwards to a betting component 310. The betting component 310 then checks its logic and asks the bank manager 222 if there is enough money for the bet. The reply from bank manager 222 is received by the game manager 203 which may forwards it to the game flow 56 via the bank interface 336.

A game 60 may manage specific configuration items. For example, some configuration parameters managed by the game 60 may include but are not limited to a maximum bet amount, a number of paylines and a denomination. The configuration interface 338 may be used by the game manager 203 to request gaming information from the game flow 56 regarding how the game 60 is configured. Each game can also contain game specific operator pages. These are pages that allow the operator to configure the game. By installing one of the games, the necessary operator page may be inserted into the operator setup pages.

The bank interface 336 and the configuration interface have been separated from the game flow interfaces in one embodiment. However, in other embodiments, the bank interface 336 may be combined with the configuration interface 338, the bank interface 336 may be combined with the game flow interface 334, the configuration interface 338 may be combined with the game flow interface 334 or the bank interface 336 and the configuration interface 334 may be combined with the game flow interface 334. Further, each of the interfaces 334, 336 and 338 may be divided to create additional interfaces.

The presentation interface 334 is configured to transmit queries requesting game information and game events containing game information from the game manager 203 to the game presentation 54. The queries may include requests for game information such as a presentation name, a presentation state, a presentation type, etc. The game presentation 54 maintains a state variable. The game presentation states can be implemented in many different manners. In one embodiment, each presentation state is a C++ class with an enter( ), exit( ), and onIdle( ) methods. The presentation states may differ from the game state in that they are active states possibly requiring onIdle( ) logic. Also, after a power hit, the enter( ) method will be called again to set up the presentation state again.

In one embodiment of the present invention, the game flow 56 and the game presentation 54 may communicate with the game OS 50 and each other by posting game events with game information to the event manager 230, which are distributed by event distribution 225 to one or more processes in the gaming OS 50, such as the bank manger 222, game manager 203 and NV-RAM manager 229. As described with respect to FIG. 2A, the event manager 230 evaluates each game event to determine whether the event contains critical data or modifications of critical data that are protected from power hits on the gaming machine i.e. the game event is a "critical game event." Information from critical game events are sent to a non-volatile storage device via the NV-RAM manager 229.

As an example of event routing, the game flow 56 may determine an award for a game and send a game event with information regarding the award for a game to the event manager 230. The award information may be sent by the event manager 230 to the NV-RAM manager 229. Then, the NV-RAM manager 229 may store the award information to non-volatile memory. Further, the award information may be sent via event distribution to the bank manager 222 which may increment meters managed by the bank manager 222 and to the game manager 203. The bank manager 222 may send the new metering information to the game flow 56 via the bank interface 336. In response to the award information, the game manager 203 may generate new gaming information or a query for gaming information which may be sent to the game flow 56 via the game flow interface 332.

The game events posted by game flow 56 and game presentation 54 may be divided into two categories: 1) information events 332 and 2) sequence events 330. Many of the sequence events may be messages containing gaming information used by the game presentation software module 54 to generate a presentation state corresponding to a game state generated by the game flow. The information events contain gaming information not just specific to the presentation such as award information or game outcome information generated by the game flow 56.

The sequence events are generally useful only to the game flow 56 and the game presentation 54 and are primarily generated by the game flow 56 and the game presentation 54. Further, some processes in the gaming OS 50 may post sequence events. For instance, in the case of a tilt, a tilt process in the gaming OS may post a sequence event to stop the presentation and animation of a game on the display screen of the gaming machine. Information events may be useful to many different processes in the gaming OS 50 and may be generated by many different processes such as the device drivers 259 in FIG. 2A and the various processes in the gaming OS 50 such as the bank manager 222, game manager 203, power hit detection 228 and context manager 202. When information about the game state or presentation state is needed by other processes in the gaming OS 50, the game flow 56 or the game presentation 54 may post an information event.

The event manager 230 in the gaming OS 50 manages a sequence event queue 301. When sequence events are posted to the event manager 230, the event manager 230 places the sequence events into the queue 301 in the event manager 230. The game manager 203 polls the sequence event queue 301 and distributes the sequence events in the queue to the game flow 56 and game presentation 54 via the game flow interface 334 and the presentation interface 344.

The game flow 56 and the game presentation 54 may communicate sequence events to themselves and each other via the sequence event queue 301 as well as to other processes such as the game manager 203. In this one embodiment of the present invention, the game manager 203 routes all of sequence events to the game flow 56 and game presentation 54. As an example of routing, the game flow 56 may communicate a game state change to the game flow by posting a sequence event to the event manager 230 which places the sequence event in the sequence event queue 301. When the game manager 203 detects the sequence event in the queue 301, it routes the sequence event to the game presentation 54 via the presentation interface 344. The game presentation 54 may use the gaming information contained into the sequence event to change the game presentation displayed on the display screen of the gaming machine.

There are many types of sequence events that may be generated by the game flow 56, game presentation 54 and game OS 50. A number of these sequence events are described in the following paragraphs. However, the present invention is not limited to only these types of sequence events listed below and additional sequence events may be defined in the gaming system.

A number of generic sequence events are defined to control the play of game. SYNCHRONIZE_STATE is used to synchronize the presentation state to the game state of the flow. START_GAME is used to request the flow to start the game. If the game is already in progress, this sequence event will be ignored. STATE_COMPLETE is a notification that a specific state is completed. CHECK_STATUS is used to check the status of a specified item. UPDATE_DISPLAY is sent from the game flow 56 to the game presentation 54. It is used to indicate new data is available to be incorporated in the presentation. The SYNCHRONIZE_PRESENTATION is used to synchronize the presentation state to flow state. MONEY is a money related sequence event that is to indicate money has been deposited into the gaming machine or dispensed from the gaming machine. The MONEY event may include information about an amount of money and a denomination of money involved in the event. STATE_CHANGE is used to indicate a state has changed. ROLLUP_STATUS is a rollup status event used to indicate the status of a meter has changed. A roll-up event occurs when an award has been made on the gaming machine. In the roll-up, the meters on the gaming machine are incremented upwards by an amount specified by the award. BET_CHANGED notification that the bet per line, hand, card, etc has changed. ITEMS_SELECTED is a notification that the number of lines, hands, etc selected has changed. STAGE_START is sequence event posted by the game manager 203 to notify listeners (e.g., other processes) that the stage has started. STAGE_END is a sequence event posted by the game manager 203 to notify listeners that the stage has completed. CONTEXT_STATUS_EVENT is sequence event posted by the context manager to inform the game presentation 54 of the context status. PRESENTATION_SUBSTATE_COMPLETE is notification posted by the game presentation 54 that a presentation substate is complete. SYSTEM_METERS_CHANGED is posted by the game manager 203 to notify the game presentation 54 that the meters have been modified.

The game presentation 54 may include logic 325 that may allow a number of buttons to be displayed on one or more of the display screens on the gaming machine. Inputs to the displayed buttons may be detected by a touch screen sensor mounted over the display screen. The game flow 56 may include logic 315 to control the game flow in regards to input from the panel button display as well as from input from hardware button panels and other gaming devices located on the gaming machine. The game flow 56 does not know about the user interface being displayed by the game presentation 54 i.e. the graphical components of the display. Further, it does not know about how the hardware on the gaming machine is configured and therefore which panel buttons and other gaming inputs are available. For this reason, the game flow 56 will not (normally) receive I/O events. The game presentation 54 displays the appropriate buttons and controls and then listen for I/O events. When it determines that a button has been pressed (e.g., panel button or on the screen) it will signal the game flow 56 through a sequence event.

Next, betting, paytables and the award processing and the relationship to the gaming software modules are described. The bet, paytable and win may be all abstracted in the game flow software 56 such that these functions may be decoupled from the game flow logic. The game 60 may use a bet object including betting logic that defines the current bet. The game 60 may also use a paytable file that defines all of the possible game outcomes. When the game flow 56 needs to determine an game outcome, it consults the appropriate pay table. The game outcome is then posted as an information event and passed to the win manager 224 for processing. For multi-line or multi-bet games there may be a paytable associated with each bet.

In one embodiment, an evaluator module may be used to perform the paytable evaluation. The evaluator module may be a shared object used by the game flow 56. The game flow 56 provides the gaming information to the evaluator module that it needs to determine a game outcome. Then, the evaluator module evaluates the paytable to determine the game outcome which is returned to the game flow.

The bet items together with the paytable outcome are presented to the win manager 224 which decides the amount won and where the win goes (credit, EFT, hopper, etc.). The win manager 224 may also determine the types of the wins (credit, non-cashable coupons, etc.) and whether there is a progressive win and the amount of that win. The win manager may package up this information and present the result to the game flow 56 to display the information (win amount) and perform any necessary win processing. The win manager 224 resides in the Gaming OS 50 and is closely related to the bank manager 222.

Game paytables may be stored in readable text files. Storing the files in this manner allows for a variety of people to modify the games (other than engineers). The files may be CRCed. The paytable may be stored in RAM with another CRC. The CRC(s) can be verified before every game start and before every game outcome evaluation. For security, other processes besides the game flow software module 56 generally do not access paytable file.

A game of chance can have many bet states. Games may have an initial bet state to allow the player to start the game, but the game may need additional bet states like Blackjack double down. More complicated bonusing may also require the player to wager additional credits. Betting schemes require basic logic to manage. One example is a 5-line game. As the player bets up, each consecutive bet can go to the next payline bet which is cycled through paylines 1 to 5. In another jurisdiction, the player can specifically bet on a particular line. This may be complicated further by a requirement that the total bet cannot exceed 10, while each payline bet cannot exceed 5.

Betting is heavily dependent upon the jurisdiction in which the gaming machine is played. Thus, in one embodiment of the present invention, the betting code does not reside within the game flow 54 or game presentation 56. In fact, the game flow 56 may not include logic for the concept of a bet—it may simply know how to play the game of chance. The game package may provide a betting shared object that will perform the betting needs. A shared object is a logical unit that may perform a number of functions and may be shared by a number of other logic units in the gaming system software 201 and may be loaded and unloaded from memory in a dynamic manner. Shared object is the equivalent of a dynamic link library (DLL) used in a Windows operating system. Both shared objects and DLLs are libraries that contain code that is linked into a process at run time. Shared objects and DLLs differ from statically linked libraries which are linked into a process at link time i.e. when the process is compiled.

As an example, a betting shared object may evaluate betting rules. These shared objects will most likely be re-used frequently for games in a jurisdiction. In the gaming system software 201, shared objects are given a ".so" extension. An example of a betting shared object may be SlotLotteryBetting.so which may handle betting for a n-reel slot game with individual betting up and down for each line (as is typical in lottery jurisdictions). In some embodiment, the betting shared may be loaded into RAM as needed by the game flow 56 and may be unloaded when not needed by the game flow.

In one embodiment of the present invention, the bet information files, such as the betting shared objects, may be used to explain the betting relationships and requirements for each gaming jurisdiction so that a bet manager process 223 in the game OS 50 can handle the betting. The bet manager 223 may be integrated into the bank manager 222. Using the bet manager 223, the betting logic specific to each gaming jurisdiction may be separated from the game flow 56. Thus, a game flow 56 may be developed for a particular gaming jurisdiction, such as Nevada. Then, betting information files particular to a gaming jurisdiction may be used by the bet manager 233 to adapt the game of chance generated by the game flow software module 56 for the betting requirements of a particular jurisdiction.

Within the game package are several configuration files. These are both .config and .registry files listing the information that uniquely describe the game 60. The following is an example of the betting information that may be included with a game package:

[PrimaryBet]
Library=SlotLotteryBetting.so
Options=MyGameBetting.config
[BonusBet]
Library=StandardBonusBetting.so
Options=StandardBonusBetting.config This example shows that the game 60 has two betting shared objects. One is the primary betting used for normal game play. The other is used for a betting feature in the bonus game. The entries list the shared object and a config file. The config file contains information that the shared object needs to further configure the bet. An example would be the maximum bet per line for the SlotLotteryBetting.so. The betting shared objects may be customized to allow game play in a particular gaming jurisdiction.

The betting process involves determining the flow of control and information in the game OS 50 and the game 60. In one embodiment, the game manager 203 is controlling the game flow 56 and listening to the bet events received from event distribution 225. The betting shared objects may be used to evaluate the rules for betting. The bet manager 223, which may be part of the bank manager 222, increments and decrements the appropriate meters (e.g. available credits). As the betting shared object changes values, it posts bet information events via the event manager 230 to inform the processes in gaming system of the changes. The game presentation 54 can see a game event indicating the change in bet and instruct its copy of the betting shared object to refresh( ) from non-volatile memory and determine the new values for the bets to be displayed. The game manager 203 listens to the bet information events to determine when the game may start. When start conditions are satisfied, a start command is sent to the game flow 56 by the game manager 203.

The following are examples of betting gaming events generated by the bet manager 223 or bank manager 222 or by the another process in the gaming OS 50: a) BET_START, b) EVENT_MONEY_BET, c) BET_OPEN (allow cash-in devices), d) BET_COMMITTED, e) BET_CLOSED (disallow cash-in devices) and f) BET_END. Each betting event may include a unique bet ID. The game flow software module 56 may use gaming information contained in the betting event to determine an appropriate game state in the game flow. The betting events may be routed to the game flow 56 from the bank manager 222 via the event manager 230, the game manager 203, the bank interface 336 or the game flow interface 334 to the game flow 56.

For the game flow software module 56, the betting process may be initiated when the game flow 56 is in an idle state waiting for a game to start or when the game flow is in a game state in a game flow sequence where a bet may be used to alter the game flow sequence. The game manager 203 knows when a game flow 56 is in its idle state, e.g. the game flow 56 is in a game state which is waiting for game play to begin. When the game manager 203 sees that the game flow 56 is in idle, it reads the game configuration file(s) that may be included in the game package and retrieves the betting shared object information. This information is passed along to the bank manager 222 in the form of a request to begin betting. Once the betting is complete (determined by the game manager 203 from the information from the betting shared object), the game manager 203 issues a start( ) command to the game flow 56 passing along the unique identifier for the bet and some other basic game information. The game flow 56 leaves its idle state and generates a series of game states that allow for the play of the game. In this embodiment, the game flow logic does not require knowledge of how the betting was achieved it only knows that it has received a command to start the game flow. Thus, the betting logic is decoupled from the game flow logic.

When the game flow 56 is not in the idle game state, it does not require the game manager 203 to negotiate the bet. In this case the game manager 223 can simply issue a command to the bet the manager 223 or the bank manager 223 to begin the betting process. After the betting process has been completed, the game manager 203 may generate a command that alters the sequences of game states in the game flow. For instance, depending on the betting information, the game manager 203 may issue a command to the game flow 56 to start another stage.

The game presentation 54 may include logic 320 for a bet display and the game flow 56 may include logic 310 for control of the flow of the bet display in the game presentation 54. In any style of betting, the game presentation 54 may have controls that require the knowledge of a valid bet and a valid amount to start a game. As an example, many slot games have "play 25 coins" buttons that bet 25 coins and start the game. This button should only be lit when the player has at least 25 coins. The game presentation 54 may determine if the button should be lit by calling a betting method supported by a betting shared object. The betting shared object may incorporate the betting rules for the gaming jurisdiction where the gaming machine is played. The betting method will return true if the amount is valid to start a game with the provided credits.

As the player changes the bet, the game presentation 54 may need to disable (and enable) bet items. The disable process may be based on rules like max bet, max bet per payline, etc. that are described in the initial bet information structure given to the betting shared object. As an example, where there is a single bet item (standard poker) the "Bet one" control is enabled at first. When max bet is reached, the control is disabled. If betting down is allowed, the control is re-enabled when the player bets down from max bet.

Details of some interactions involved in generating a game of chance in the gaming system are now described for one embodiment of the present invention. These examples are provided for illustrative purposes and the invention is not limited to these examples. The game flow 56 may initially start in an idle state. When the game 555 is in its idle state it may not bet (or do anything) until the game manager 203 in the game OS 50 sends the permissionToStart( ) IPC message to the game flow 56. The IPC message contains the game's index and the game session id. The game session id is a unique number that is incremented for each game played. The session id is the game's permission to play. When posting events, the game flow 54 uses its game index and the provided session id.

Once the permission to start has been granted, the game flow 56 may remain in its idle state. The game flow 56 may wait for the IPC start( ) message from the game manager 203. After receiving the start message, the game flow 56 instructs the game presentation 56 that it has permission to begin. The game presentation 56 can be in any state at this point. The game presentation 56 allows the player to interact with the game 60 and bet. The game presentation 56 may directly manipulate a bet object obtained from its betting shared object.

The betting shared object requires the game presentation 56 to provide a game index and session id. As the game presentation 56 manipulates the bet object, the bet object posts events using the game index and session id. The events will signal the other logic units in the gaming system about the changes occurring within the game 60. For instance, when the bet has changed and information event indicating the bet has changed is posted (e.g., BET_CHANGED). If the game manager 203 did not give permission to the game flow 56 to start a game, it may generate a system error when it sees these events. The bet object records the bet information into non-volatile memory using the NV-RAM manager 229 on the gaming machine and the presentation displays the bet information to the player to represent the betting style.

When the player presses the "start" button on the gaming machine, the game presentation 54 posts a GAME_START_REQUEST event. The event contains the game index and session id. The game manager 203 receives this event and takes the bet in non-volatile memory and asks the bank manager 222 for permission to play a game with the provided bet with the IPC message gameStartRequest( ). If the game is configured to auto-start on maximum bet, the game manager 203 will trigger off the BET_CHANGE (max bet reached flag). The bank manager 222 returns true or false from the gameStartRequest( ) message. On success, the bank will remove the bet amount from the credit meter and return true. In this case, the game manager 203 may send the IPC start( ) message to the game flow 56.

The game 60 may be configured for committal or non-committal betting styles. There are many other variations of betting which may be supported by the present invention, but for this example, only these two betting styles are described. Committal is the betting style where the player is committed to playing the game once a minimum bet is reached (usually one credit) and may only change the bet to a valid amount according the player's credit meter. Non-committal betting allows the player to adjust the bet in any way that is valid for the game, but is not required to have the corresponding number of credits and does not have to play the game.

The game 60 may be configured for either committal betting or non-committal betting style. Additional bet configuration items also exist including the number of paylines, maximum bet, etc. The betting shared object reads this basic information for the game.

When the betting shared object is configured for committal style, the bet object may communicate with the bank manager 222 to determine the validity of the current bet. The game presentation 54 may take the player's request to "bet up" and calls the bet object's betUp( ) method. The betUp( ) method may determine that committal style is configured. The bet object may ask the bank manager 222 if the result of the "bet up" is a valid amount to play a game of chance. The bank manager 222 simply responds if the amount is less than or equal to the credit meter. The betUp( ) method returns the number of credits bet and posts the BET_CHANGE event (if necessary). The game presentation 54 sees the BET_CHANGE event and synchronizes its display to the values in the bet object.

When in the non-committal style, the credits being removed from the credit meter are simulated. The actual credits aren't removed until the gameStartRequest( ) message goes to the bank manager 222. However, the game presentation 56 can configure it's credit meter display to show the value of the credit meter less the current bet. To the player this will look like the credits coming off the credit meter.

In non-committal style, the game presentation makes the same calls to the bet object. However, the bet object knows that it is not configured to be committal so it doesn't ask the bank manager 222 about the validity of the amounts and simply changes the bet amounts and posts the appropriate BET_CHANGE events as the value changes. With this design, the game presentation 56 is free from understanding the betting style.

In any style of betting, the game presentation 56 may have controls 320 that require the knowledge of a valid bet and a valid amount to start a game. As an example, many slot games have "play 25 coins" buttons that bet 25 coins and start the game. This button should only be lit when the player has at least 25 coins. The presentation can ask the bet object if the button should be lit by calling the validAmountToStartGame method. This method will return true if the amount would be valid to start a game with the provided credits.

The operating system used to implement the gaming software architecture of the present invention may be one of a number of commercially available operating systems, such as QNX (described above), Windows NT and MS Windows 2000 by Microsoft Corporation of Redmond, Wash. or Linux by Redhat, Durham, N.C., which is an open source Unix based operating system. The operating system may provide information about the software programs currently being executed by the operating system and the memory locations of these software units during execution as well as APIs allowing IPCs. Windows utilizes a RAM image on the hard drive to create a virtual paging system to manage executable code. The present invention may be applied to operating system managed by a virtual paging system. Further, the executable formats and dynamic link libraries between operating systems may vary. The present invention may be applied to different executable formats and link libraries used by a particular operating system and is not limited to the format and libraries of a particular operating system. In addition, IPC formats and types of IPCs available with a particular operating system are variable and the present invention is not limited to the IPC formats and IPC types of a particular operating system.

Figure 3:
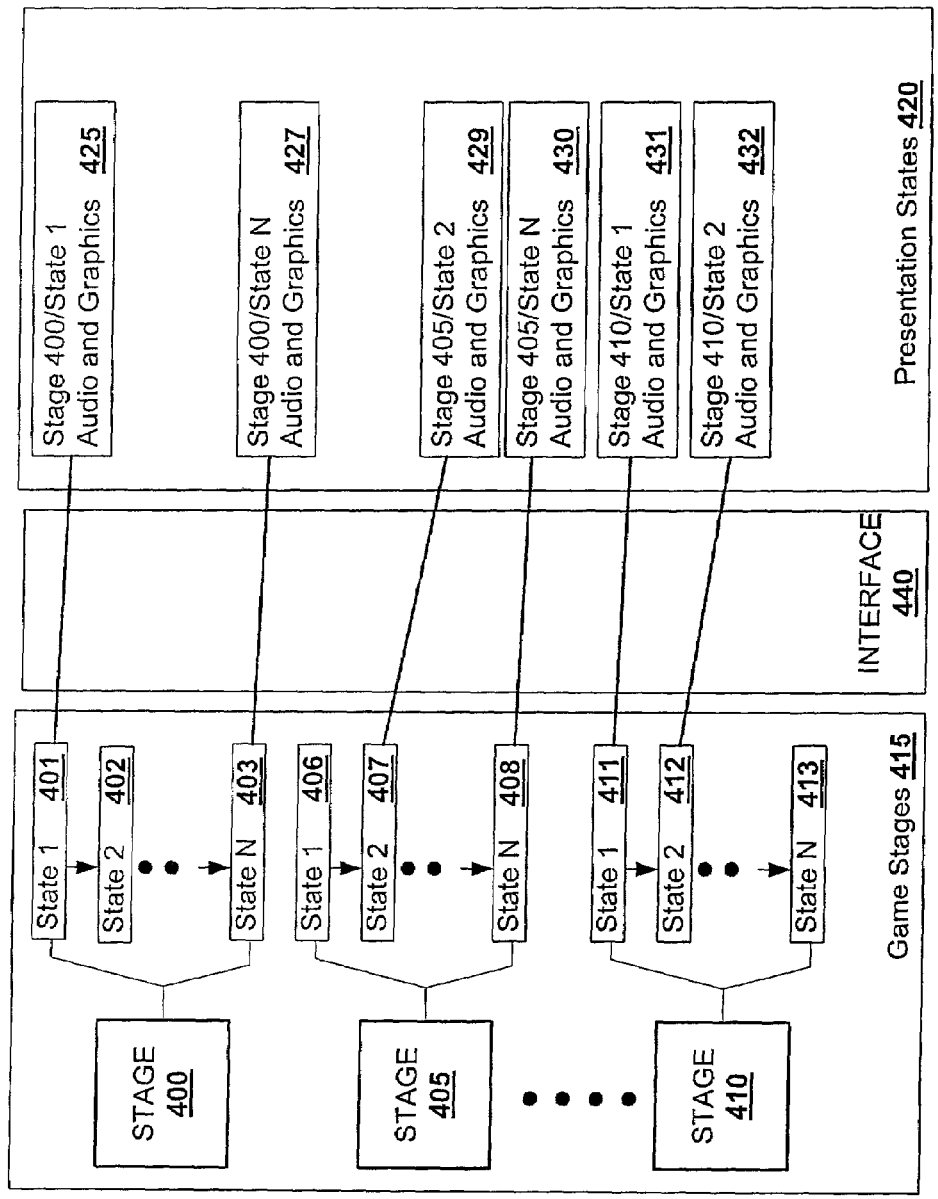
FIG. 3 is a block diagram of depicting game stages and states with corresponding presentation states.

FIG. 3 is a block diagram depicting game stages, states and corresponding presentation states. As described above with respect to FIG. 2B, a game of chance may be divided into a sequence of stages that are controlled by the gaming operating system. The sequence of stages includes at least one stage used to play the game of chance. Other stages in the sequence of stages may be used to present a bonus game, another game of chance or other provide other game play enhancements.

Stages 400, 405 and 410 include game flow logic used to play a game of chance on a gaming machine such as a card game or slot game or game flow logic to play a bonus game. A plurality of game stages 415, such as stage 400, 405 and 410 may be installed on the gaming machine as part of a game package. A plurality of stages may be installed on a gaming machine at a particular time. In addition, in some embodiments, stages may be downloaded from a game server.

As an example of game staging, a first game of chance may played on a gaming machine using a sequence of 3 stages. A first stage, in the sequence of 3 stages, may be stage 400, which is used to play a slot game. A second stage in the sequence of 3 stages is stage 405, which may be used to play a first bonus game and a third stage 410 in the sequence of 3 stages is stage 410 which may be used to play a second bonus game. As another example of game staging, a second game of chance may be played on the gaming machine using a sequence of 4 stages. A first stage in the sequence of 4 stages, may be stage 400, which is used to play a card game. A second stage in the sequence of 4 stages is stage 405, which may be used to play a first bonus game. A third stage 410 in the sequence of 4 stages is stage 410 which may be used to play a slot game and a fourth stage in the sequence of 4 stages is stage 405 which may be used to play a second bonus game. In this example, stage 405 is used twice in the sequence of stages. In general, a stage may be used one or more times in a sequence of stages.

Each stage may comprise logic to generate a plurality of game states. The game states may be used to perform various game functions such as but not limited to controlling displays on a display screen, starting and stopping animations on the display screen and determining a game outcome. Thus, a portion of the game states in a stage may be designed to control a presentation state while other game states may not be designed to control a presentation state. Three game states 401, 402 and 403 out of a plurality of game states are listed for stage 400, three game states, 406, 407 and 408, out of a plurality of game states are listed for stage 405 and three game states, 411, 412 and 413 out of a plurality of game states are listed for stage 410. As examples of states not controlling a presentation state, state 402 may be used to generate an outcome for a game of chance, state 406 may be used to generate an outcome for a bonus game and state 412 may be used to process an award. As example of states that may control a presentation state, states 401, 403, 407, 408, 411 and 412 are game states that may be used to control the corresponding presentation states 425, 427, 429, 430 and 432. For instance, state 401 may be used to control a game outcome presentation generated by the presentation state 425.

A presentation state may comprise graphics, sound and the activation of other gaming devices on the gaming machine such as lights and mechanical devices. The graphics, sounds and gaming device components for a presentation state may be activated sequentially or may be activated simultaneously depending on the configuration of the presentation state logic. However, when the game state logic is decoupled from the presentation state logic, the game state logic will not have knowledge about the presentation content, such as details about what graphics or sounds are generated and in what order, or knowledge about the logic used to generate the presentation state. Thus, many different presentation states can be developed for the same game state allowing the game state logic to be reused. Further, presentation state logic may also be reused to generate presentations for different presentation states in different games. For instance, the presentation logic for presentation state 425 used for game state 401 in stage 400 may also be used for game state 413 in stage 410.

As described with respect to FIG. 2B, a game state may control a presentation state through a series of sequence events. For instance, the SYNCHRONIZE_STATE, sequence event, may be used to direct the game presentation flow logic to synchronize a presentation state to the game state of the flow. The game states send sequence events to control presentation states via the interface 440. IPCs may also be included in interface 440. An example of sequence event interface that routed sequence events through the gaming operating system was described with respect to FIG. 2B. However, the present invention is not limited to this interface design. For instance, in some embodiments, the some sequence events may be sent directly from the game state logic to the presentation state logic bypassing the gaming operating system.

Figure 4:
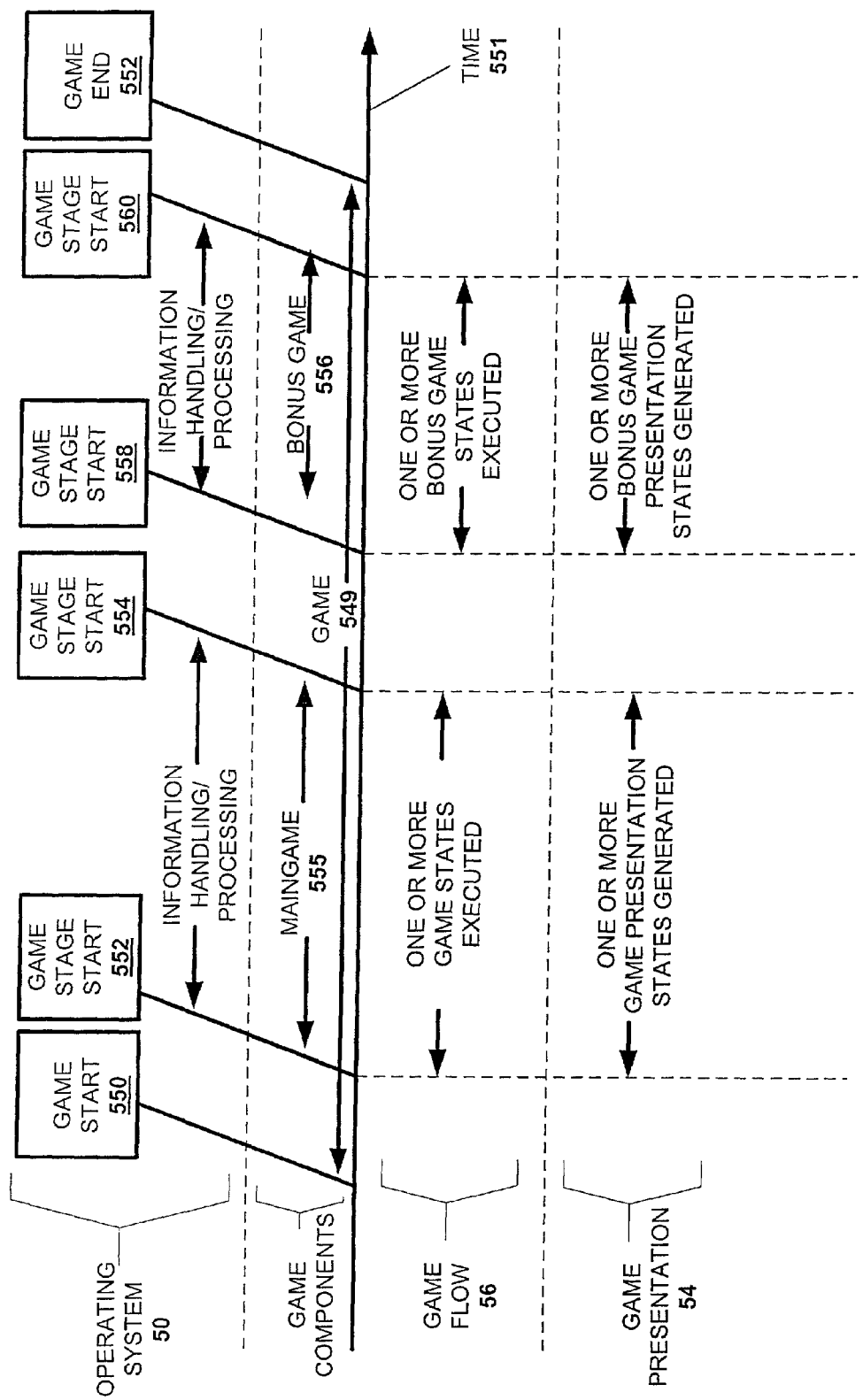
FIG. 4 is a block diagram depicting some functions of a gaming operating system, a game flow software module and a game presentation software module as a function of time.

FIG. 4 is a block diagram depicting some interaction of a gaming operating system 50, a game flow logical unit 56 and a game presentation logic unit 54 as a function of time 551. During the interaction, a main game 555 and a bonus game 556 are presented sequentially on the gaming machine. A game of chance may comprise a sequence of stages where at least one stage is game stage. In FIG. 4, the game of chance comprises two stages including a game stage and a bonus game stage. In the present invention, a game may comprise one or more stages.

A GAME_START event is generated at the beginning of each game of chance. As each stage starts, a GAME_STAGE_START event is generated. When each stage completes, a GAME_STAGE_END event is generated. When all game stages are complete the game manager 203 or another process in the gaming operating system 50 may declare the entire game is complete by posting a GAME_END event. With this design, the GAME_END event is final and all system components can detect this event to know a game is complete.

In FIG. 4, the game 549 starts with GAME_START event 550 and the game ends with GAME_END event 551. The game 549 includes two stages: 1) a main game 555 and 2) a bonus game 556. The main game 555 begins with GAME_STAGE_START event 552 and ends with GAME_STAGE_END event 554. The bonus game 556 begins with GAME_STAGE_START event 558 and ends with GAME_STAGE_END event 560.

As described above, during the main game 570, the game OS 50 may perform information handling and information processing tasks such as processing and routing game events posted from the game flow logic 56 and the game presentation logic 54 as well as game events posted from logical units located in the game OS 50. The game flow logic 56 may execute a series of game states controlling the play of the game 555 and post game events to inform other logic units in the gaming system of its state. The game presentation logic 54 may generate a series of presentation states to allow the presentation of the game 555 generated by the game flow 56. The game presentation logic 54 may also post game events to inform other logic events of its state. The game OS 50, game flow 56 and game presentation 56 may perform similar operations during the generation of the bonus game 556.

Figure 5:
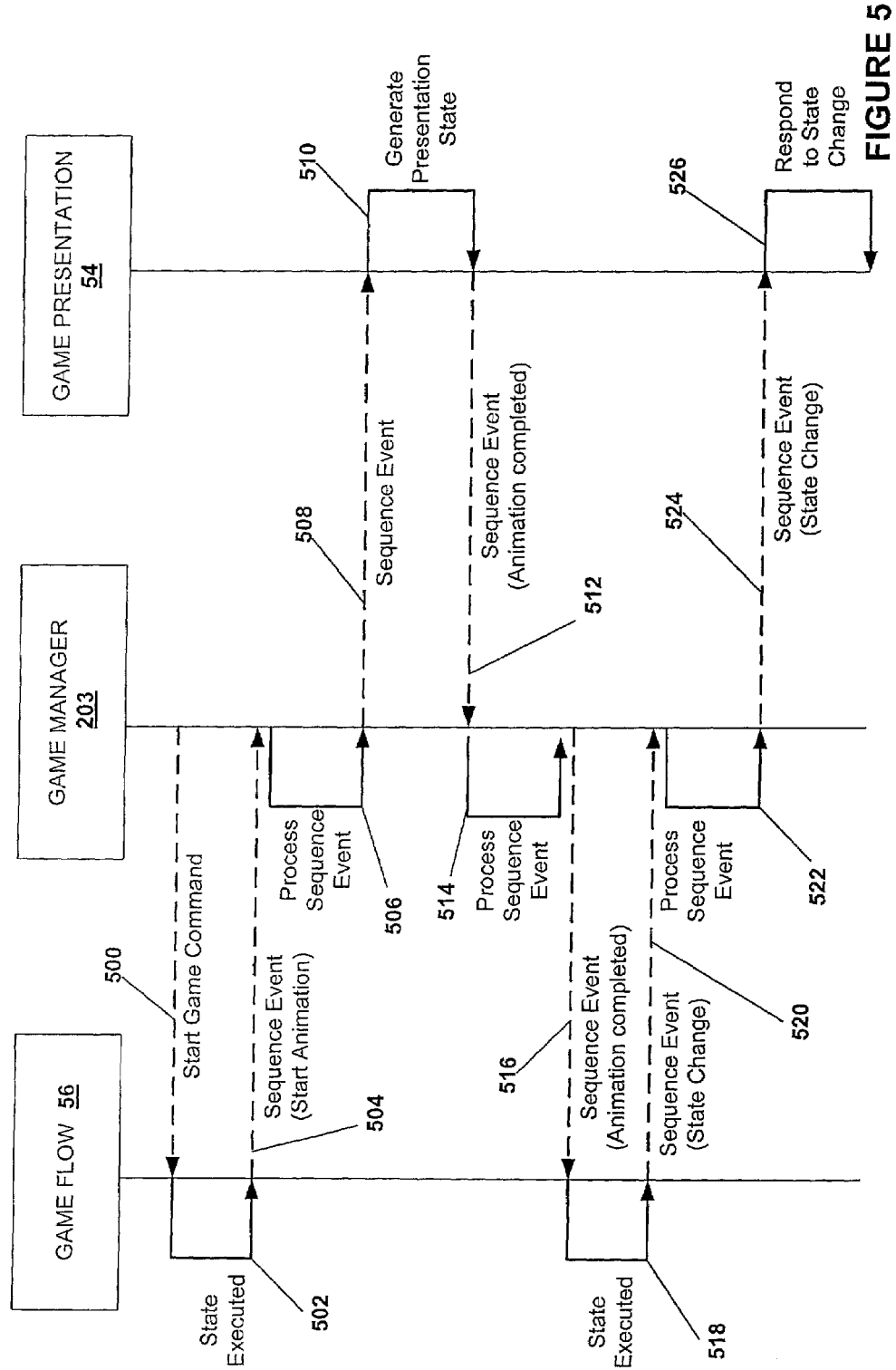
FIG. 5 is an interaction diagram showing interactions between the game flow, the game manager and the game presentation for one embodiment of the present invention.

FIG. 5 is an interaction diagram showing interactions between the game flow 56, the game manager 203 and the game presentation 54 for one embodiment of the present invention. The interaction diagram is provided for illustrative purposes as many such interaction diagrams are possible. In 500, the game manager 203 sends a command to the game flow 56 to start a game. In 502, the game flow 56 receives the start command and generates a game state that requires a presentation. In 504, the game state in the game flow 56 posts a sequence event notifying the presentation 54 of its current state. In 506, the game manager 203 receives the sequence event and processes the event. In 508, the game manager 203 sends the sequence event to the game presentation 54.

In 510, the game presentation 510 receives the sequence event, processes the sequence event and determines what presentation state is required for the game state. In this example, the presentation state uses an animation. Thus, the game presentation generates the animation.

In general, the presentation state may include a combination of visual, audio and other sensory components generated on one or more gaming devices on the gaming machine. The game presentation may generate a plurality of presentation substates as part of a presentation state. For instance, 510, the presentation state determined by the game presentation may include a presentation substate for a first animation, a presentation substate for a second animation and a third presentation substate for output on a gaming device that generates tactile sensations. The game presentation may output each presentation substate as part the presentation state corresponding to the game state generated by the game flow. The game presentation may update the game flow 56 or game manager 203 of its current presentation substate. In some embodiments, the game flow 56 or the game manager 203 may control the advance the presentation substates from one presentation substate to another.

After the animation is complete, in 512, the game presentation 54 posts a sequence event 512 indicating the animation is complete. In 514, the game manager 203 receives the sequence event indicating the animation is complete. After processing the sequence event, in 516, the sequence is sent from the game manager 203 to the game flow 56.

In 518, the game flow 56 receives the sequence event and generates a new game state. The game flow 56 may have been waiting for the acknowledgement from the game presentation before generating the next game state. In 520, the game flow 56 posts a sequence event indicating its state has changed. In 522, the game manager receives the state change sequence event and processes it. In 524, the game manager 203 sends the stage change sequence event to the game presentation 54. In 526, the game presentation 54 receives the state change sequence event. In response to the sequence event, the game presentation may update the display on the gaming machine or perform some other operation.

Figure 6:
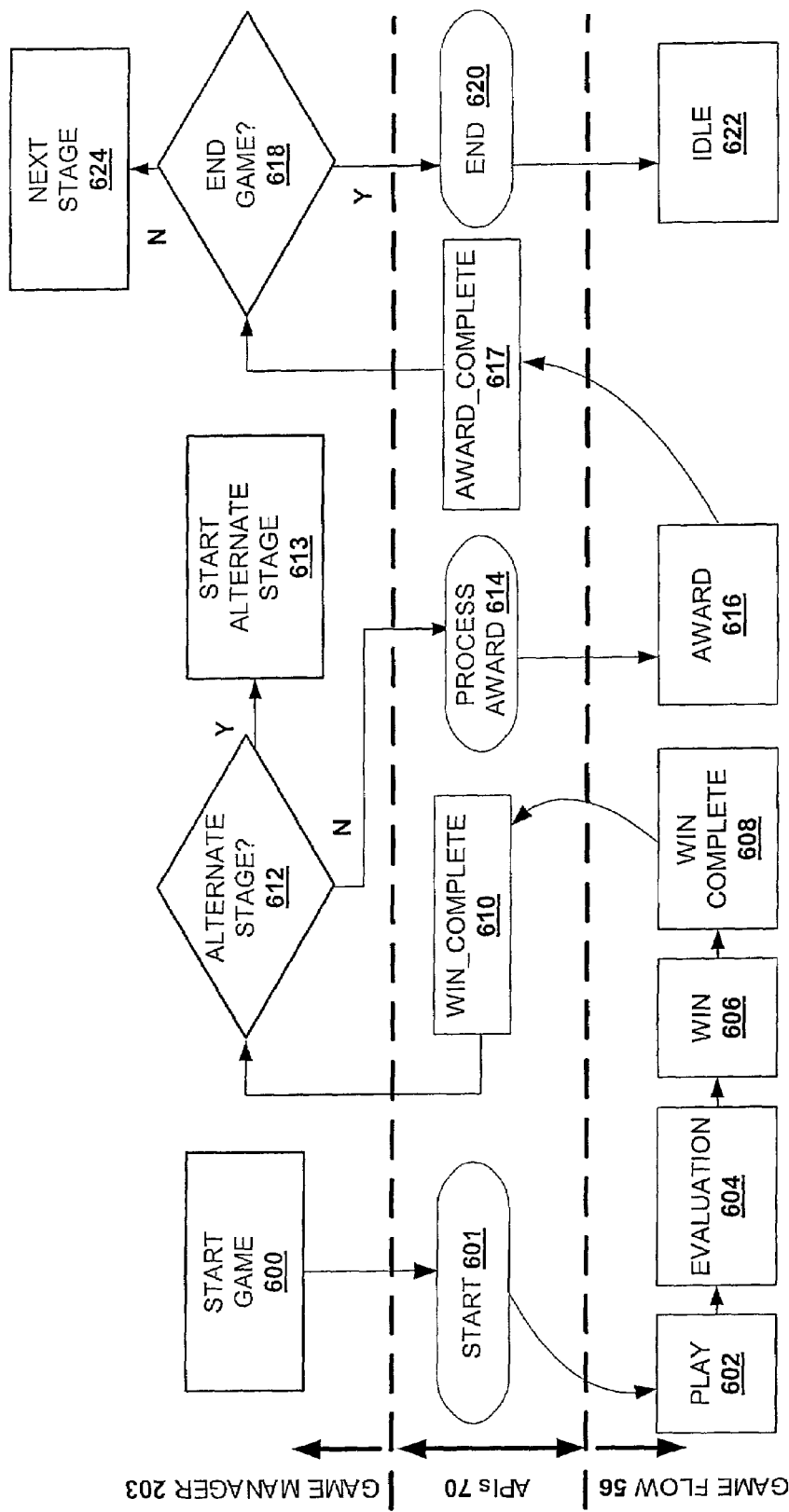
FIG. 6 is an interaction diagram showing interactions between the game flow and the game manager via one or more APIs for one embodiment of the present invention.

FIG. 6 is an interaction diagram showing interactions between the game flow 54 and the game manager 203 via one or more APIs 70 for one embodiment of the present invention. The boxes 602, 604, 606, 608, 616 and 622 are examples of game states generated by the game flow logic 56. The present invention is not limited to these game states. The number and types of game states may vary according to the type of game being played. For instance, the game states required to play a slot game may differ from the game states required to play a card game. The oval boxes 601, 614 and 620 represents commands from the game manager 203 to the game flow 56. These commands are defined by the API s70 supported by the game flow 56. Many such commands are possible and are not limited to the examples in FIG. 6. The rectangular boxes 610, 616 are gaming events including gaming information that are posted by the game flow 56. The gaming events are received by the game manager 203 located in the gaming operating system. As previously described, many different types of gaming events may be defined in the present invention.

In 600, the game manager 203 determines that a game can start and sends a start game command 601 via one of the APIs 70 to the game flow 56. Next, the game flow 56 generates a number of game states in the play of a game such as a play 602, an evaluation 604, a win 606 and a win complete 608 states. In 602 and 604, the game states may direct the game presentation software module (see FIG. 1) to display different animations and request random numbers from the gaming operating system for a paytable evaluation used to generate a game outcome. Once the game flow 56 has determined a game outcome in 604, it stores the award information and then posts the WIN_COMPLETE event 610 notifying the game manager 203 that an outcome has been created. The game outcome may be either a winner or loser, however, in this embodiment, the game flow 56 does not indicate to the player any monetary outcome at this point the sequence of the game flow.

In 612, the game manager 203 receives the WIN_COMPLETE event 610. After processing the gaming information in the WIN_COMPLETE event, the game manager 203 may execute logic to determine if win caps, progressive game play, bonus game play and double ups have been triggered. While executing this logic, the game manager 203 may query the game flow 56 via one of the APIs 70 and request additional game information. For instance, paytable information received from the game flow 56 may be processed by the game manager 203 to determine if a bonus game has been triggered.

Progressive information received from the game flow 56 is routed to a progressive manager. The progressive manager is another logic unit that may be located in the gaming operating system. A communication protocol 205 for a wide area progressive game is described with respect to FIG. 2A. The progressive manger evaluates the progressive award information received from the game flow 56. When the award is a progressive hit, the progressive manger post a gaming event indicating the progressive hit. When the game manger 203 receives the gaming event with the progressive hit information, the game manager 203 may temporarily lock up while awaiting validation of the progressive hit from the progressive manager.

In 612, by examining the game award information received from the game flow 56, the game manager 203 can determine if other stages need to be loaded and played. In 613, for example, when the game manager determines that an alternate stage has been triggered, such as a bonus game stage, the game manager 203 may launch the alternate stage. Further details of launching an alternate stage from a game stage are described with respect to FIGS. 7A and 7B. In 613, when the game manager determines that no alternate stages have been triggered and a progressive hit has not occurred, the award is stored in a non-volatile storage device on the gaming machine and the game manager 203 then sends a process award command 614 via one the APIs 70 to the game flow. Process award command 614 is used to direct the game flow to display the award stored in the non-volatile memory storage device.

In 616, the game flow 56 may direct the game presentation logic to display the award. The award presentation may consist of animations, sounds and activating gaming devices located on the gaming machine. In 617, when the award presentation is complete, the game flow 56 posts a gaming event to the game manager 203 indicating the award presentation is completed. In 618, the game manager 203 receives the award complete message and determines whether the stage is a game stage or an alternate stage such as bonus game. In 624, when the stage is an alternate stage, another stage may be launched. When the stage is the game stage, in 620, the game manager 203 may send a command via one of the APIs 70 to end the game to game flow 56. In 622, when the game flow 56 receives the end game command, the game flow 56 enters an idle state. In the idle state, the game flow 56 requires a start game command 601 before it can begin game play again.

Figure 7A:
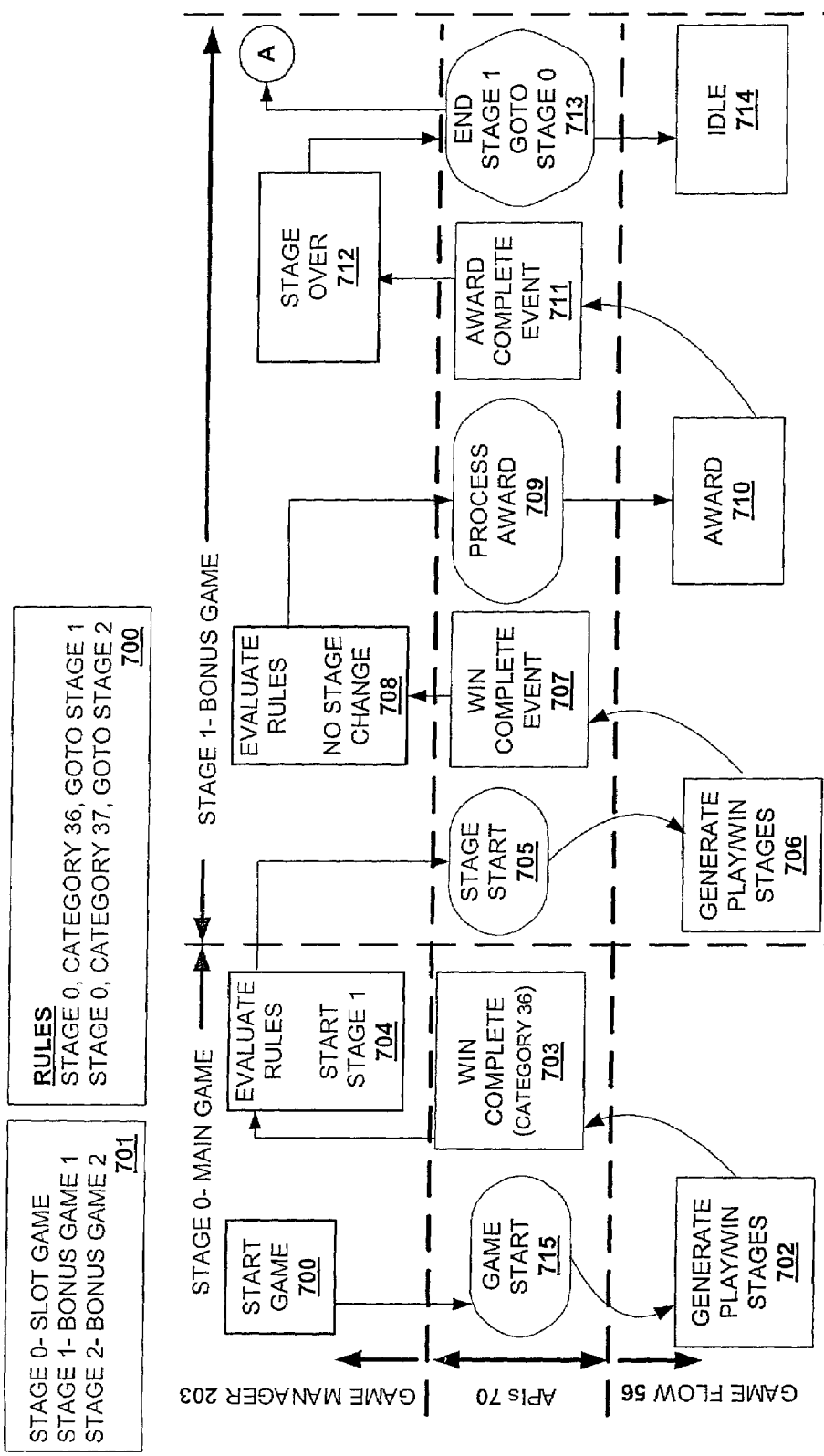
FIGS. 7A and 7B are interaction diagrams showing interactions between the game flow and the game manager via APIs in a multi-stage game for one embodiment of the present invention.
Figure 7B:
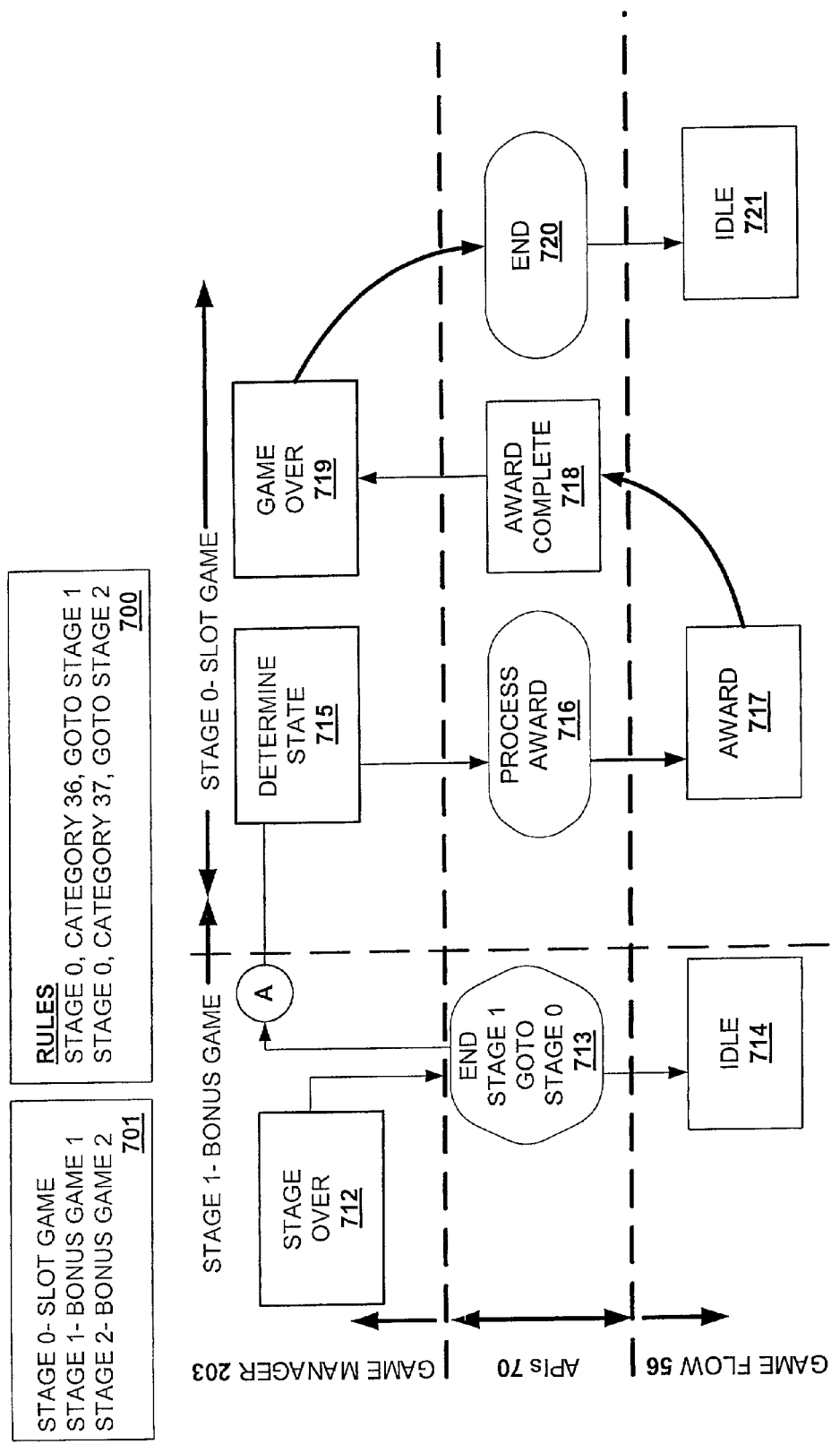

FIGS. 7A and 7B are interaction diagrams showing interactions between the game flow 56 and the game manager 203 via an API 70 in a multi-stage game for one embodiment of the present invention. A game of chance 701 with three possible stages is shown. Stage 0 is a game stage, stage 1 is a bonus stage and stage 2 is a bonus stage. In the FIGS. 7A and 7B, a particular stage sequencing example for the game of chance 701, which may be a slot game or another type of game of chance, is described. In FIG. 7A, the game manager 203 starts the slot game with stage 0, which is the game stage. In stage 0, the game manager 203 starts stage 1, which is a bonus game. Finally, in FIG. 7B, the game manager 203 ends stage 1, returns to stage 0 and ends the game.

In one embodiment of the present invention, rules 700 for staging may be stored in the paytable for a particular game. Thus, by comparing the game outcome generated by the game flow 56 with rules 700 in the paytable, the game manager 203 may generate determine stage sequencing for the game. For instance, the staging rules 700, for the game 701 are start stage 1, which is bonus game 1, when a category 36 outcome is generated by the game flow 56 and start stage 2 when a category 37 outcome is generated by the game flow 56.

The game outcomes used to generate the staging events are variable. For instance, for a slot game, a game outcome used to trigger an alternate stage, such as bonus game, may be one of many possible symbol combinations for the slot game. In addition, the symbol combination used to trigger the alternate stage does not have to be a winning game outcome. As another example, for a card game, an alternate stage may be triggered when certain card combinations are generated. For instance, in a black jack game, a bonus game may be triggered when the player receives a black jack hand where the black jack comprises an ace and a jack of the same suit.

As described above with respect to FIG. 2B, each game has a unique paytable. Thus, by changing the staging rules in the paytable, new games may be created. Further, a plurality of bonus game stages may be on a gaming machine. These stages may be accessed in different types of games such as card games or slot games by adding appropriate staging rules in the pay table for each game. For instance, the same bonus game stage may be used in both a slot game and a card game.

Now, details of the staging sequence in FIGS. 7A and 7B are described. In 700, the game manager 203 determines the game 701 may be started and generates a game start command 701 which is sent via one of the APIs 70 to the game flow 56. In 702, the game flow 56 receives the start command 715 and generates a number of game states in stage 0. The game states include a game outcome and posts the game outcome. The game outcome generated by the game flow 56 in stage 0 is a category 36 game outcome.

In 703, the WIN_COMPLETE gaming event, which includes information about the game outcome, is sent to the game manager 203 via one of the APIs 70. In 704, the game manager 203 receives the WIN_COMPLETE gaming event and compares the game outcome with the rules 700 in the paytable to determine that stage. The game manager 203 determines a staging event has occurred and sends a start stage 705 command to the game flow 56 via one of the APIs 70. The start stage command 705 tells the game flow which stage to start which is stage 1 in this example.

In 706, the game flow receives the start stage command 705 and executes a plurality of game states to generate a bonus game outcome and a bonus game play. After determining the game outcome, the game flow 56 posts a WIN_COMPLETE event 707 to the game manager 203. The WIN_COMPLETE event contains the bonus game outcome generated by the game flow 56. In 708, the game manager 203 checks for staging events and determines no staging events have occurred. Thus, the game manager 203 sends a process award command 709 to the game flow 56. In 710, the game flow 56 presents the bonus game award and sends an award complete event 711 to the game manager.

In FIG. 7B, in 712, the game manager determines the bonus game stage is over but the game 701 has not ended. Thus, in 713, the game manager 203 sends an end command which directs the game flow 56 to place the bonus game into an idle state in 714 and return to the game 701 to stage 0. In 715, the game manager 715 determines the game state of stage 0. The award for the main game has not bee processed in stage 0. Therefore, the game manager 203 sends a process award command 716 via one of the APIs 70 to game flow 56.

In 717, the game flow 56 controls the award outcome presentation. In 718, the game flow 56 post an award complete event when award outcome presentation is finished. In 719, the game manager 203 determines the game 701 is over and sends an end command 720 to the game flow 56. In 721, the game flow 56 receives the end command and enters an idle state.

In one embodiment of the present invention, the game manager 203 may store and manage all game history information. As each stage completes, the game manager 203 may store the history information into separate history directories in the non-volatile memory storage device. The game history information may be stored in response to the AWARD_COMPLETE event as in 711 and 718. In FIGS. 7A and 7B, stage 1 finishes first and therefore has its history record stored followed by stage 0. The configuration item "MAXIMUM NUMBER OF GAME HISTORIES" determines the number of stages that game manager 203 may store.

The game manager 203 may be used to drive the game history display on the gaming machine which may be used in a dispute resolution. For instance, a player may claim the gaming machine has malfunctioned and cheated them out of an award. The game history attendant page communicates with the game manager 203 using two information events: REQUEST_SHOW_HISTORY and REQUEST_EXIT_HISTORY. The REQUEST_SHOW_HISTORY event contains the number of stages back to show. The game manager 203 loads the appropriate game, such as 701, and then communicate with it, similar to normal game play, via one of the APIs 70 to generate the game history. The game manager 203 send the enterHistory( ) command to the game presentation 54 and game flow 56 to direct the game to generate history information. When the game is initialized in 715, the game manager 203 provides the game flow 56 with all the normal initialization information with exception of the essential record directory. For history, the game manager 203 provides the game flow 56 with an essential record directory that contains the historical information to be displayed.

The game presentation 54 may generate a game history presentation using gaming information stored to the NV-RAM by the game flow 56 in a manner similar to normal game play on the gaming machine. Thus, the format of the gaming information stored to the NV-RAM to generate a history playback is in the same format as the gaming information saved to the NV-RAM during normal game play. When the same information format used, the history playback process may be simplified.

Figure 8:
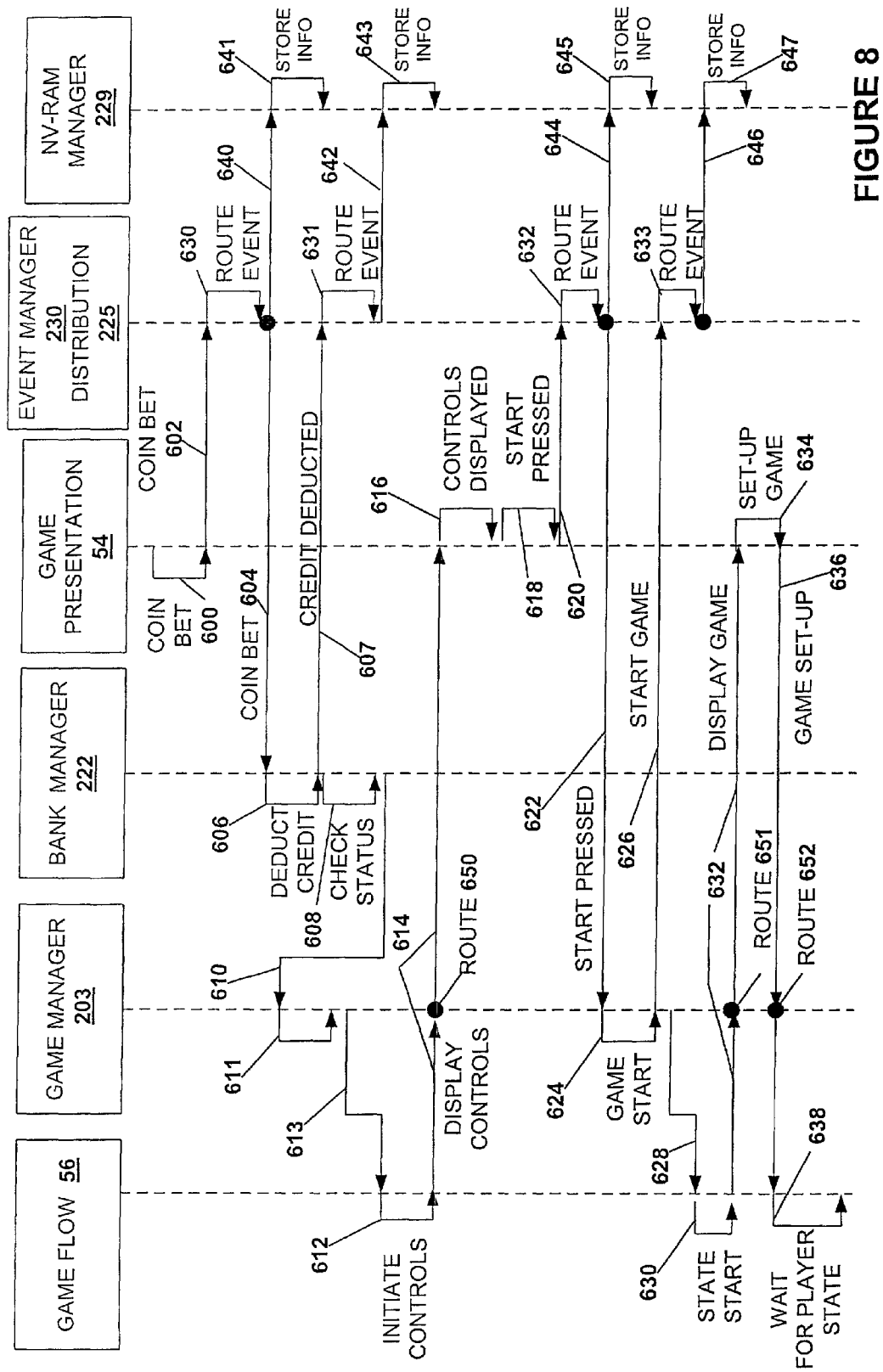
FIG. 8 is an interaction diagram showing interactions between the game flow, the game manager, bank manager, the game presentation, the event management/distribution and the NV-RAM manager for one embodiment of the present invention.

FIG. 8 is an interaction diagram showing interactions between the game flow 56, the game manager 203, bank manager 222, the game presentation 54, the event management/distributions 230/225 and the NV-RAM manager 229 for one embodiment of the present invention. The information flow in the interaction diagram is based upon the implementation of one set of interfaces. In other embodiments of the present invention, different interfaces may produce a different information flow.

In 600, the game presentation software unit 54 detects a coin has been bet from a touch button controlled by the game presentation 54. In 602, the game presentation posts a game event indicating a coin has been bet. In 630, the event manager 230 receives, evaluates and routes the coin bet game event. In 640, the event manager 230 sends the coin bet game event to the NV-RAM manager 229 which stores information in the game event to a non-volatile storage device.

In 604, the event manager sends the coin bet game event to the bank manager 222. In 606, the bank manager 222 deducts a credit from the credit meter. In 607, the bank manager 222 sends a credit deducted to the event manager 230. In 631, the event manager 230 evaluates and processes the credit deducted game event. In 642, the event manager 230 sends the credit deducted game event to the NV-RAM manager 229 which stores information from the event to the non-volatile storage device in 643.

In 608, the bank manager 222 checks the meter status and determines if a game may be started i.e. there are enough credits available to make the bet. In 610, when a game may be started, the bank manager 222 notifies the game manager that a game can start. Although not shown, this message is routed through the event manager 230. In 613, the game manager 203 send a message to the game flow 56 to notify it that a game may start. In 612, the game flow initializes the controls for the game. In 614, the game flow sends a message to the game presentation 54 to directing it to display and activate the input controls. The message is routed through the event manger 230 (not shown) and is received by the game manager 203. In 650, the game manager routes the message to the game presentation 54. In 616, the game presentation 54, displays and activates the game input controls.

In 618, the game presentation receives and input message that a start button has been pressed. The game presentation 54 posts a start pressed game event to the event manager 230. In 632, the event manager evaluates and routes the event. In 644, the start pressed game event is routed to the NV-RAM manager 229. In 645, the NV-RAM manager stores event information to the non-volatile storage device.

In 622, the event manager 230 sends the start pressed event to the game manager 203. In 624, the game manager 203 sends a game start event to the event manager 230. In 633, the event manager 230 processes and evaluates the game start event and in 646 routes the event to the NV-RAM manager 229. In 647, stores the game start event information to the non-volatile storage device.

In 628, the game manager 203 sends a start game command to the game flow 56. In 630, the game flow 56 generates one or more game states to start the game. In 632, the game flow 56 may send one or more sequence events to the game presentation 54 directing it to set-up the game on the display screen. The sequence events may be routed to the game presentation 54 through the event manager 230 to the game manager 203 (not shown). In 651, the game manager 203 routes the one or more sequence events to the display. In 634, the game presentation receives the sequence events and sets up the display.

In 636, the game presentation 54 sends a sequence event to the game flow 54 acknowledging the game presentation has been set-up. The sequence event may be routed to the game flow 56 through the event manager 230 and to the game manager 203 (not shown). In 652, the game manager 203 routes the sequence event from the game presentation 54 to the game flow 56. In 638, the game flow 56 receives the sequence event acknowledging the presentation is set-up and enters a game state where it is waiting for input from the player.

Figure 9:
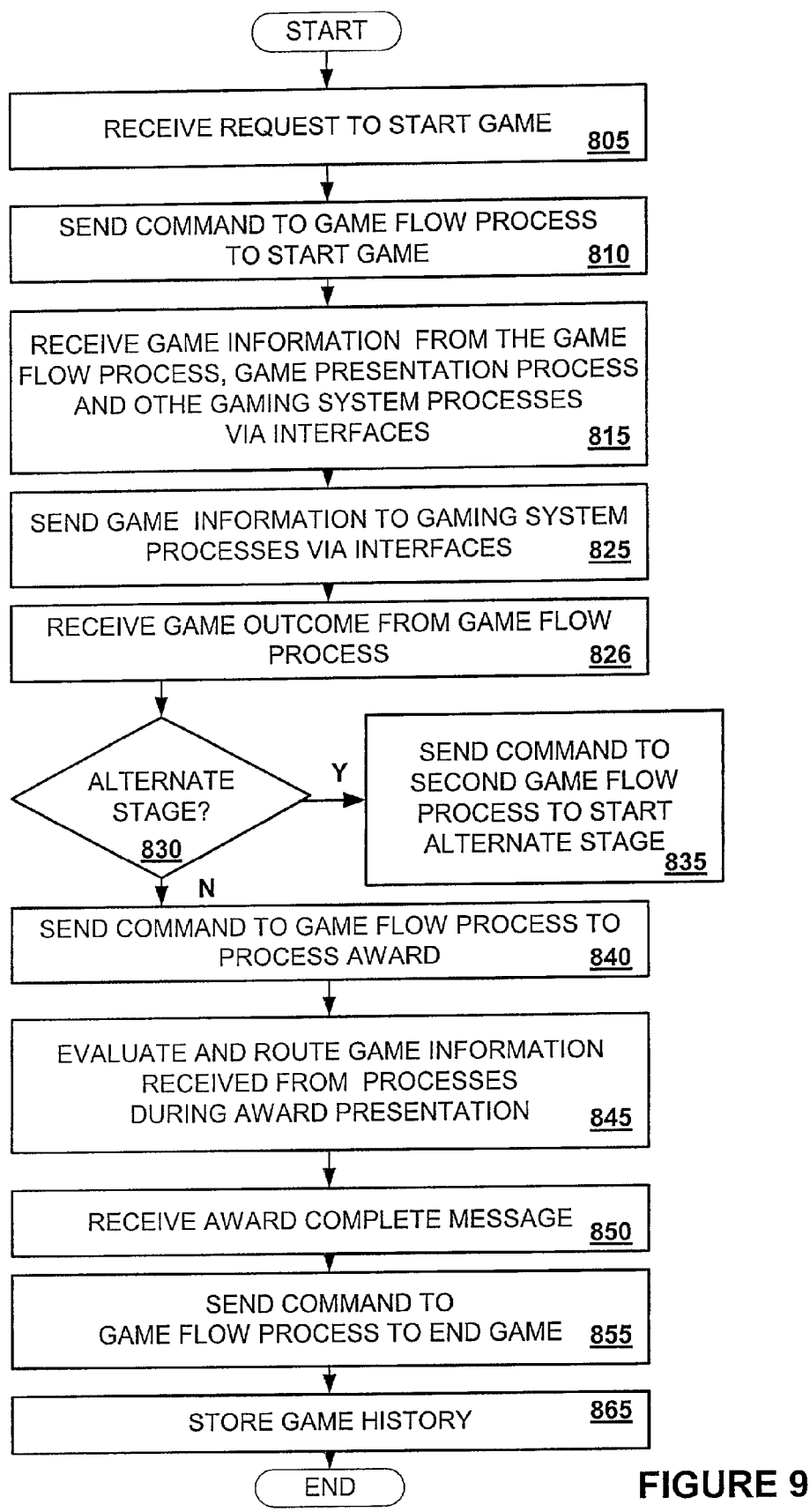
FIG. 9 is a flow chart depicting a method in a gaming operating system software module of playing a game on a gaming machine.

FIG. 9 is a flow chart depicting a method in a gaming operating system of playing a game on a gaming machine. The gaming operating system and other gaming system software modules, such as the game flow software module and the game presentation software module, may be loaded into RAM and executed as processes. The gaming operating system may be loaded when the gaming machine is powered-up. Other gaming system software modules may be loaded and unloaded from RAM while the gaming machine is operating.

In 805, the gaming operating system 805 receives a request to start a game from one of the input mechanisms located on the gaming machine. The request may be initiated when a player deposits credits into the gaming machine via a gaming device such as bill validator or a coin acceptor. In 810, the gaming OS sends a command to a game flow process via an interface to start a game. In one embodiment, the command is sent from a game manager process in the operating system. In 815, during game play the gaming OS receives game information from the game flow process, game presentation process and other gaming system process via one or more interfaces. In 825, game information is sent to various game system processes. For instance, as described above, the game OS may route sequence events to the game flow process and may route sequence events to the game presentation process to generate the game play on the gaming machine. In 826, the game OS may receive a game outcome determined by the game flow process.

In 830, the game OS may evaluate the game outcome to determine if staging event has occurred. In 835, when a staging event has occurred, the game flow may send a command to a second game flow process such as a bonus game flow process (see FIGS. 7A and 7B) to start the alternate stage. In a single game, the game OS may start and end a plurality of stages. In 840, when a staging event has not occurred, the game OS sends a command to the game flow process to process the award indicated by the game outcome. The award process may involve a presentation on the display screen of the gaming machine showing the award to the game player.

In 845, during the award presentation, the game OS may evaluate and route game information received from various game processes, such as the game flow process and game presentation process, during the award presentation via one or more interfaces. In 850, the gaming OS receives an award complete message from the game flow process. In 855, the game OS sends a command to the game flow process to end the game. In 865, the game OS may store the game history for the game to a non-volatile memory storage device.

Figure 10:
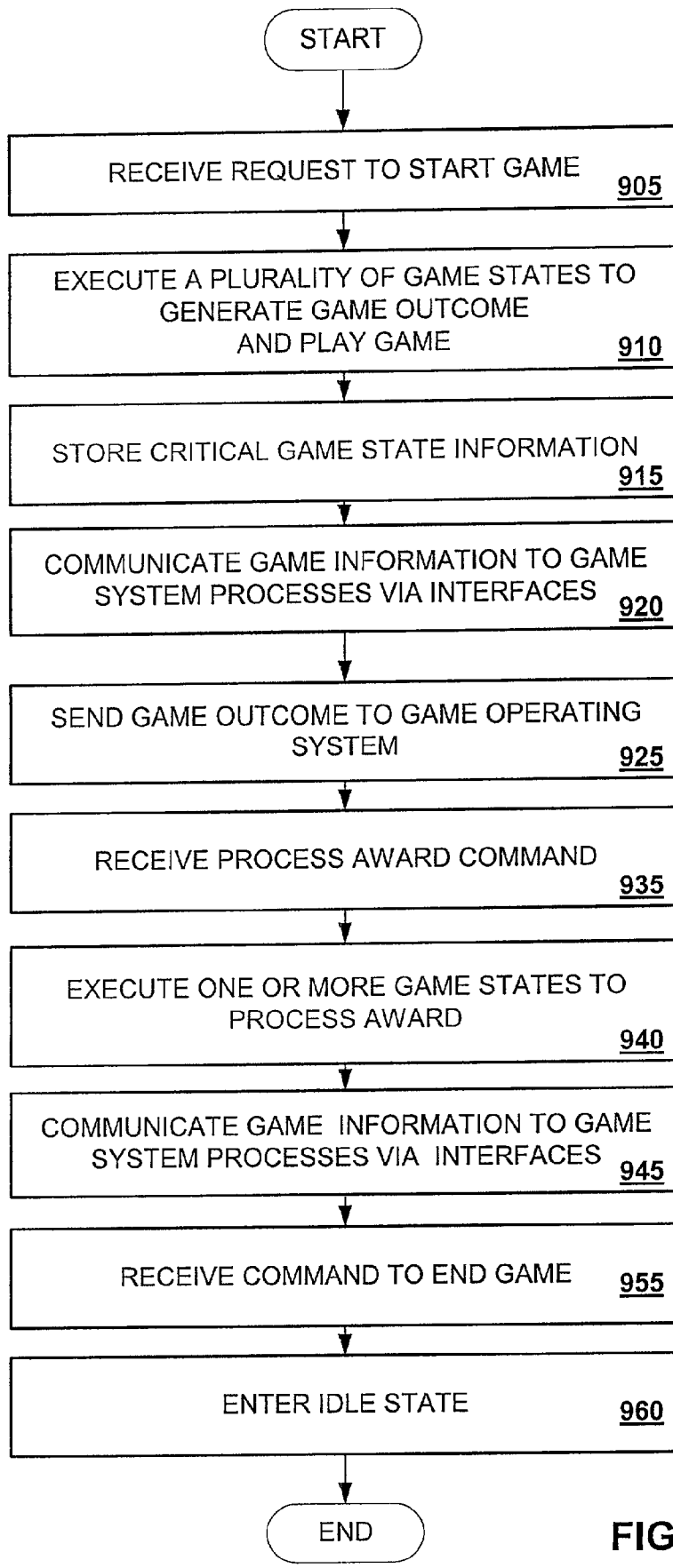
FIG. 10 is a flow chart depicting a method in a game flow software module of playing a game on a gaming machine.

FIG. 10 is a flow chart depicting a method in a game flow software module of playing a game on a gaming machine. In 905, the game flow software module, which may be loaded into RAM on a gaming machine, receives a request to start a game. When the game flow software module and other game software modules are loaded into RAM, the gaming operating system may treat the modules as processes executing on the gaming machine. In 910, the game flow software module executes a plurality of game states to generate the play of a game of chance on the gaming machine including determining the game outcome and controlling the presentation of the game. In 915, the game flow software module may store critical game state information such as the game outcome to a non-volatile storage device on the gaming machine. In 920, the game flow software module may communicate game information to other gaming system processes via one or more interfaces. In 925, the game flow software module sends the game outcome it has determined to the gaming operating system. In one embodiment, the game outcome may be processed by a game manager software module included in the gaming operating system.

In 935, the game flow software module receives a command to process an award for the game outcome. In 940, the game flow software module executes one or more game states to process the award which may involve a presentation on one or more displays on the gaming machine. In 945, the game flow software module may communicate game information to other gaming system processes via one or more interfaces. For instance, the game flow process may communicate gaming information to the presentation software to control the presentation. As another example, the game flow process may communicate gaming information to the gaming operating system indicating the award presentation has been completed. In 955, after completing the award presentation, the game flow process may receive a command from the operating system to end the game. In 960, the game flow process may enter an idle state.

Figure 11:
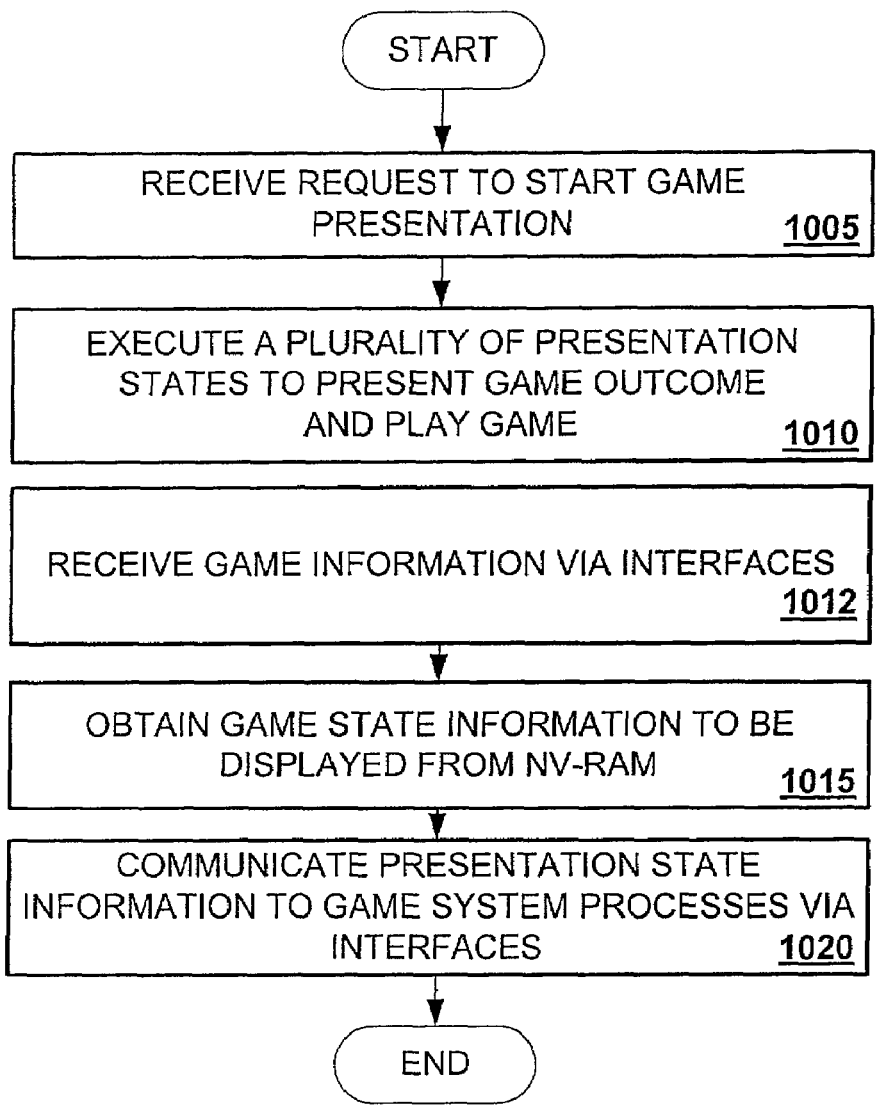
FIG. 11 is a flow chart depicting a method in a game presentation software module of playing a game on a gaming machine.

FIG. 11 is a flow chart depicting a method in a game presentation software object of playing a game on a gaming machine. In 1005, the game presentation software module which may be loaded into RAM on a gaming machine as a process, receives a command to start a game presentation. In 1010, the game presentation process executes a plurality of presentation game states corresponding to one or more games states generated by the game flow processes. To generate a presentation state, the game presentation process may execute logic enabling graphics to be displayed on one or more display screens on the gaming machine and sounds to be output from audio devices on the gaming machine. Details of the graphical presentation that may be presented as part of the game play on the gaming machine are described in co-pending U.S. application Ser. No. 09/927,901, filed on Aug. 9, 2001, by LeMay, et al., titled "Virtual Cameras and 3-D Gaming Environments in a Gaming Machine," which is incorporated herein in its entirety and for all purposes.

Besides enabling graphics and sounds, the game presentation process may execute logic to enable other gaming devices such as lights, lighted displays and bonus wheels to be activated on the gaming machine as part of the presentation. The game presentation process may also be used enable the display of various meters, game status information and input buttons on one or more display screens on the gaming machine. The input buttons may be used for betting, starting the game and playing the game. The game presentation process may also receive information regarding touch screen events for input buttons it has generated on the display screen.

In 1012, the game presentation process may receive gaming information via gaming events, such as sequence events, from other game processes via one or more interfaces. In 1015, the game presentation process may obtain game state information to be displayed to the display screen from non-volatile memory on the gaming machine. In 1015, the game presentation process may communicate presentation state information to game system process one or more interfaces. For instance, in one embodiment, the game presentation process may post a sequence event to the game OS.

Figure 12:
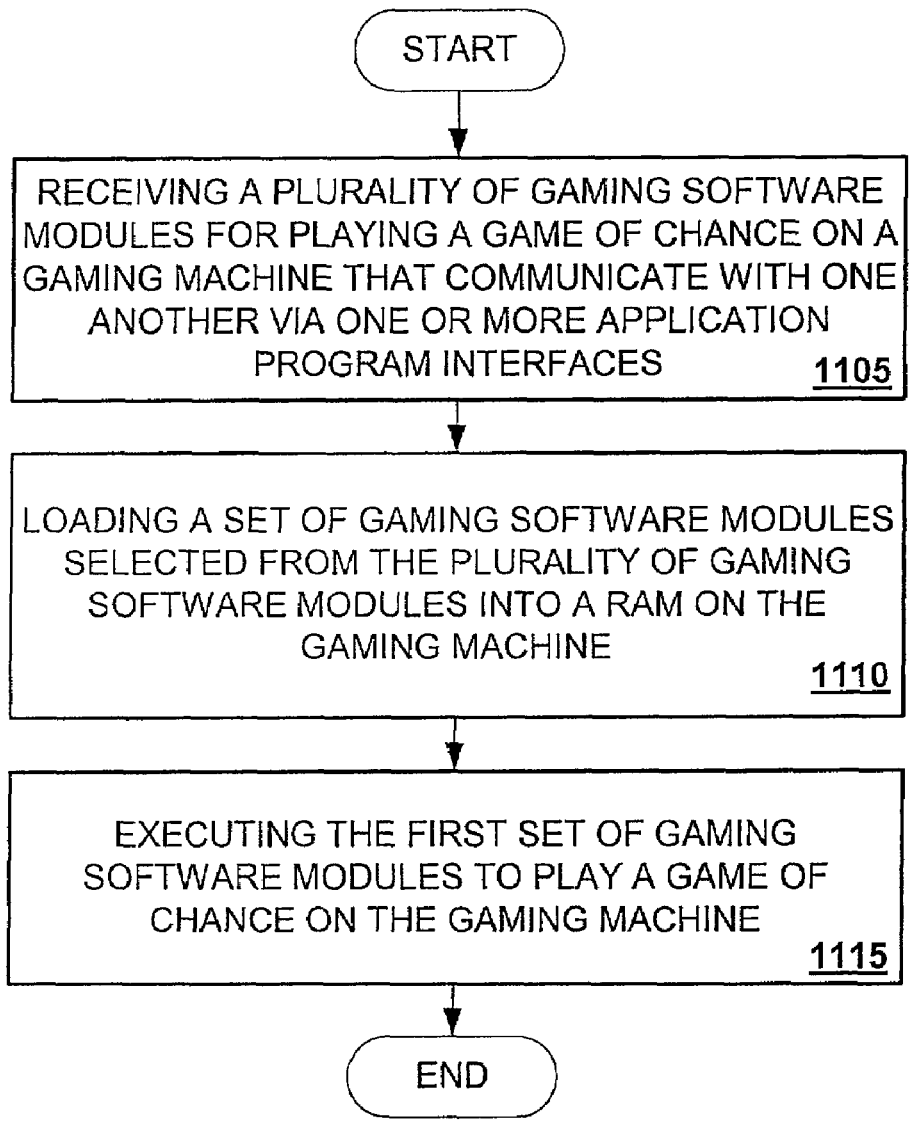
FIG. 12 is a flow chart depicting a playing a game on a gaming machine using a plurality of gaming software modules.

FIG. 12 is a flow chart depicting a playing a game on a gaming machine using a plurality of gaming software modules. In 1105, the gaming machine receives a plurality of gaming machine software modules for playing a game chance. The operating system software modules are generally installed onto the gaming machine prior to shipping. Additional gaming software modules may be loaded onto the gaming machine as part of a game package. In 1110, a set of gaming software modules selected from the plurality of gaming software modules is loaded into RAM on the gaming machine. In general, the set of game software modules loaded into RAM comprise at least a gaming OS, a game flow software module that generates the game flow sequence for the game of chance and a game presentation software module that presents the game of chance on a display screen on the gaming machine. The software modules loaded into RAM may be executed as processes on the gaming machine. Various gaming software modules may be loaded and unloaded from RAM by the gaming OS as the gaming machine is running. In 1115, a first set of gaming software modules are executed to play a game of chance.

In one embodiment of the present invention, the gaming OS may load a different sets of software modules selected from the plurality of gaming software modules to play different types of games of chance such as a slot game or a card game. The plurality of gaming software modules may reside on a memory device on the gaming, on a remote device such as a gaming server or combinations thereof.

Figure 13:
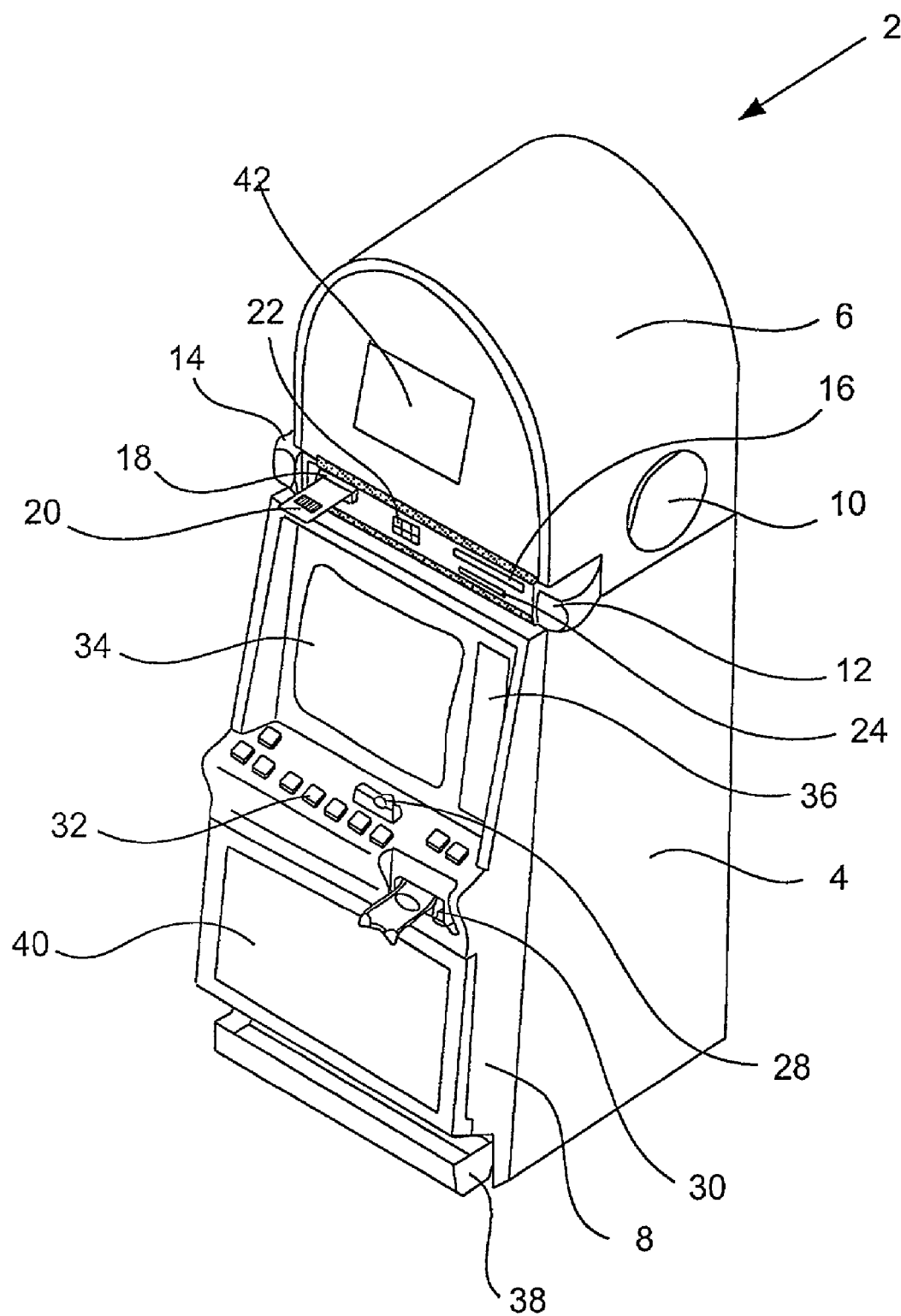
FIG. 13 is a perspective drawing of a gaming machine having a top box and other devices.

In FIG. 13, a perspective drawing of video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the number of coins played. Many possible games, including traditional slot games, video slot games, video poker, and keno, may be provided with gaming machines of this invention.

The bill validator 30, coin acceptor 28, player-input switches 32, video display monitor 34, and information panel are devices used to play a game on the game machine 2. The devices are controlled by circuitry (See FIG. 14) housed inside the main cabinet 4 of the machine 2. In the operation of these devices, critical information may be generated that is stored within a non-volatile memory storage device 355 (See FIG. 3) located within the gaming machine 2. For instance, when cash or credit of indicia is deposited into the gaming machine using the bill validator 30 or the coin acceptor 28, an amount of cash or credit deposited into the gaming machine 2 may be stored within the non-volatile memory storage device 355. As another example, when important game information, such as the final position of the slot reels in a video slot game, is displayed on the video display monitor 34, game history information needed to recreate the visual display of the slot reels may be stored in the non-volatile memory storage device. The type of information stored in the non-volatile memory may be dictated by the requirements of operators of the gaming machine and regulations dictating operational requirements for gaming machines in different gaining jurisdictions. In the description that follows, hardware and methods for storing critical game information in a non-volatile storage device are described within the context of the operational requirements of a gaming machine 2.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information and a card reader 24 for entering a magnetic striped card containing player tracking information. Further, the top box 6 may house different or additional devices than shown in the FIG. 13. For example, the top box may contain a bonus wheel or a back-lit silk screened panel which may be used to add bonus features to the game being played on the gaming machine. During a game, these devices are controlled and powered, in part, by the master gaming controller housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Returning to the example of FIG. 13, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit. During the game, the player typically views game information and game play using the video display 34.

During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 32, the video display screen 34 or using some other device which enables a player to input information into the gaming machine. Certain player choices may be captured by player tracking software loaded in a memory inside of the gaming machine. For example, the rate at which a player plays a game or the amount a player bets on each game may be captured by the player tracking software. The player tracking software may utilize the non-volatile memory storage device to store this information.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive coins or game tokens from the coin tray 38 or the ticket 20 from the printer 18, which may be used for further games or to redeem a prize. Further, the player may receive a ticket 20 for food, merchandise, or games from the printer 18.

Figure 14:
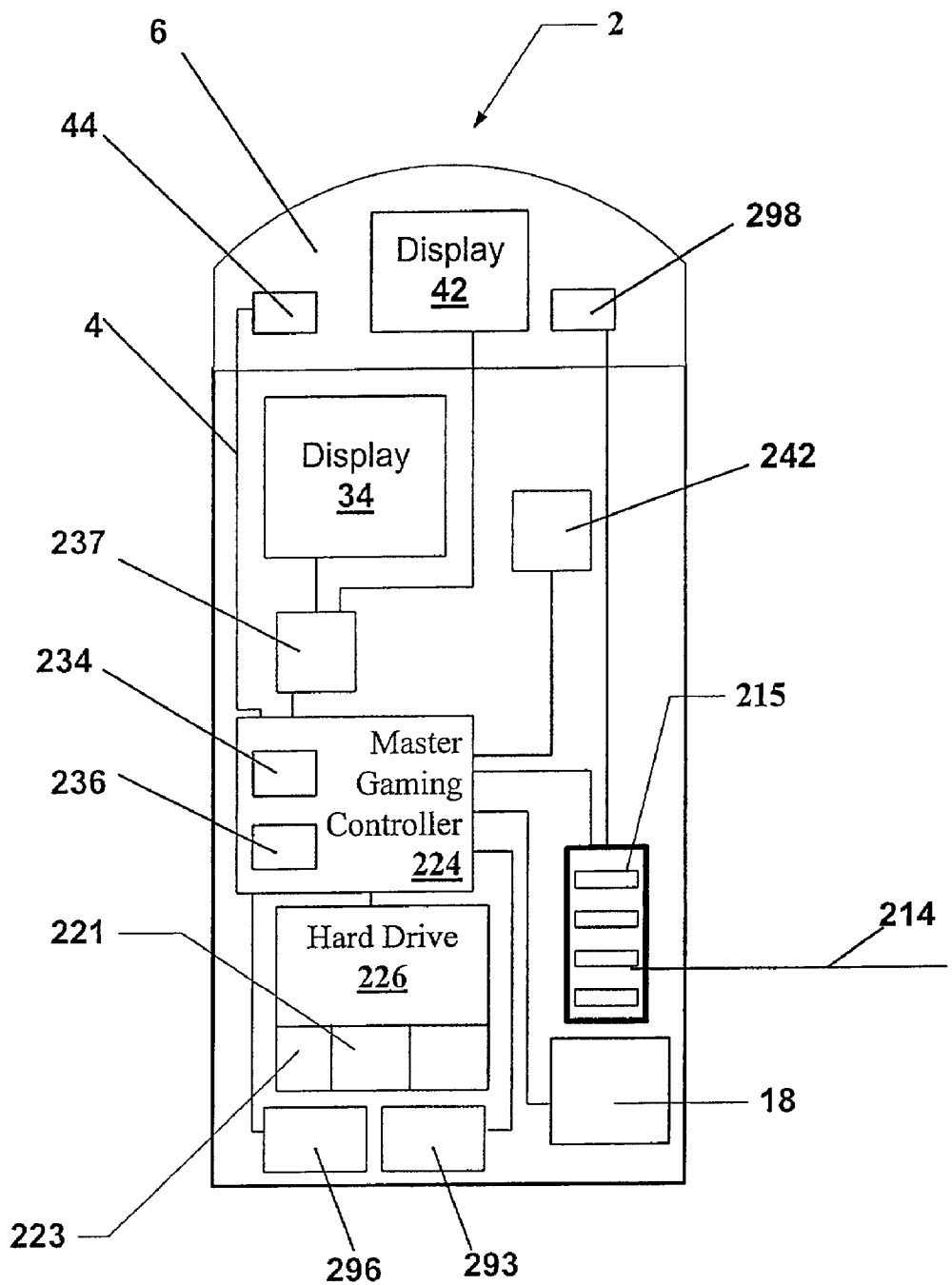
FIG. 14 is a block diagram of a gaming machine of the present invention.

FIG. 14 is a block diagram of a gaming machine 2 of the present invention. Components that appear in FIGS. 2A and 13 are identified by common reference numerals. A master gaming controller 224 controls the operation of the various gaming devices and the game presentation on the gaming machine 2. The master gaming controller 224 may communicate with other remote gaming devices such as remote servers via a main communication board 213 and network connection 214. The master gaming controller 224 may also communicate other gaming devices via a wireless communication link (not shown). The wireless communication link may use a wireless communication standard such as but not limited to IEEE 802.11a, IEEE 802.11b, IEEE 802.11x (e.g. another IEEE 802.11 standard such as 802.11c or 802.11e), hyperlan/2, Bluetooth, and HomeRF.

Using a game code and graphic libraries stored on the gaming machine 2, the master gaming controller 224 generates a game presentation which is presented on the displays 34 and 42. The game presentation is typically a sequence of frames updated at a rate of 75 Hz (75 frames/sec). For instance, for a video slot game, the game presentation may include a sequence of frames of slot reels with a number of symbols in different positions. When the sequence of frames is presented, the slot reels appear to be spinning to a player playing a game on the gaming machine. The final game presentation frames in the sequence of the game presentation frames are the final position of the reels. Based upon the final position of the reels on the video display 34, a player is able to visually determine the outcome of the game.

Each frame in sequence of frames in a game presentation is temporarily stored in a video memory 236 located on the master gaming controller 224 or alternatively on the video controller 237. The gaming machine 2 may also include a video card (not shown) with a separate memory and processor for performing graphic functions on the gaming machine. Typically, the video memory 236 includes 1 or more frame buffers that store frame data that is sent by the video controller 237 to the display 34 or the display 42. The frame buffer is in video memory directly addressable by the video controller. The video memory and video controller may be incorporated into a video card which is connected to the processor board containing the master gaming controller 224. The frame buffer may consist of RAM, VRAM, SRAM, SDRAM, etc.

The frame data stored in the frame buffer provides pixel data (image data) specifying the pixels displayed on the display screen. In one embodiment, the video memory includes 3 frame buffers. The master gaming controller 224, according to the game code, may generate each frame in one of the frame buffers by updating the graphical components of the previous frame stored in the buffer. Thus, when only a minor change is made to the frame compared to a previous frame, only the portion of the frame that has changed from the previous frame stored in the frame buffer is updated. For example, in one position of the screen, a 2 of hearts may be substituted for a king of spades. This minimizes the amount of data that must be transferred for any given frame. The graphical component updates to one frame in the sequence of frames (e.g. a fresh card drawn in a video poker game) in the game presentation may be performed using various graphic libraries stored on the gaming machine. This approach is typically employed for the rendering of 2-D graphics. For 3-D graphics, the entire screen is typically regenerated for each frame.

Pre-recorded frames stored on the gaming machine may be displayed using video "streaming". In video streaming, a sequence of pre-recorded frames stored on the gaming machine is streamed through frame buffer on the video controller 237 to one or more of the displays. For instance, a frame corresponding to a movie stored on the game partition 223 of the hard drive 226, on a CD-ROM or some other storage device may streamed to the displays 34 and 42 as part of game presentation. Thus, the game presentation may include frames graphically rendered in real-time using the graphics libraries stored on the gaming machine as well as pre-rendered frames stored on the gaming machine 2.

For gaming machines, an important function is the ability to store and re-display historical game play information. The game history provided by the game history information assists in settling disputes concerning the results of game play. A dispute may occur, for instance, when a player believes an award for a game outcome has not properly credited to him by the gaming machine. The dispute may arise for a number of reasons including a malfunction of the gaming machine, a power outage causing the gaming machine to reinitialize itself and a misinterpretation of the game outcome by the player. In the case of a dispute, an attendant typically arrives at the gaming machine and places the gaming machine in a game history mode. In the game history mode, important game history information about the game in dispute can be retrieved from a non-volatile storage 234 on the gaming machine and displayed in some manner to a display on the gaming machine. In some embodiments, game history information may also be stored to a history database partition 221 on the hard drive 226. The hard drive 226 is only one example of a mass storage device that may used with the present invention. The game history information is used to reconcile the dispute.

During the game presentation, the master gaming controller 224 may select and capture certain frames to provide a game history. These decisions are made in accordance with particular game code executed by controller 224. The captured frames may be incorporated into game history frames. Typically, one or more frames critical to the game presentation are captured. For instance, in a video slot game presentation, a game presentation frame displaying the final position of the reels is captured. In a video blackjack game, a frame corresponding to the initial cards of the player and dealer, frames corresponding to intermediate hands of the player and dealer and a frame corresponding to the final hands of the player and the dealer may be selected and captured as specified by the master gaming controller 224.

Various gaming software modules used to play different types of games of chance may be stored on the hard drive 226. Each game may be stored in its own directory to facilitate installing new games (and removing older ones) in the field. To install a new game, a utility may be used to create the directory and copy the necessary files to the hard drive 226. To remove a game, a utility may be used remove the directory that contains the game and its files. In each game directory there may be many subdirectories to organize the information. Some of the gaming information in the game directories are: 1) a game process and its associated gaming software modules, 2) graphics/Sound files/Phrase(s), 3) a paytable file and 4) a configuration file. A similar directory structure may also be created in the NV-memory 234. Further, each game may have its own directory in the non-volatile memory file structure to allow the non-volatile memory for each game to be installed and removed as needed.

On boot up, the game manager (see FIG. 2B) or another process in the game OS can iterate through the game directories on the hard drive 226 and detect the games present. The game manager may obtain all of its necessary information to decide on which games can be played and how to allow the user to select one (multi-game). The game manager may verify that there is a one to one relationship between the directories on the NV-memory 234 and the directories on the hard drive 226. Details of the directory structures on the NV-memory and the hard drive 226 and the verification process are described in co-pending U.S. application Ser. No. 09/925,098, filed on Aug. 8, 2001, by Cockerille, et al., titled "Process Verification," which is incorporated herein in its entirety and for all purposes.

Figure 15:
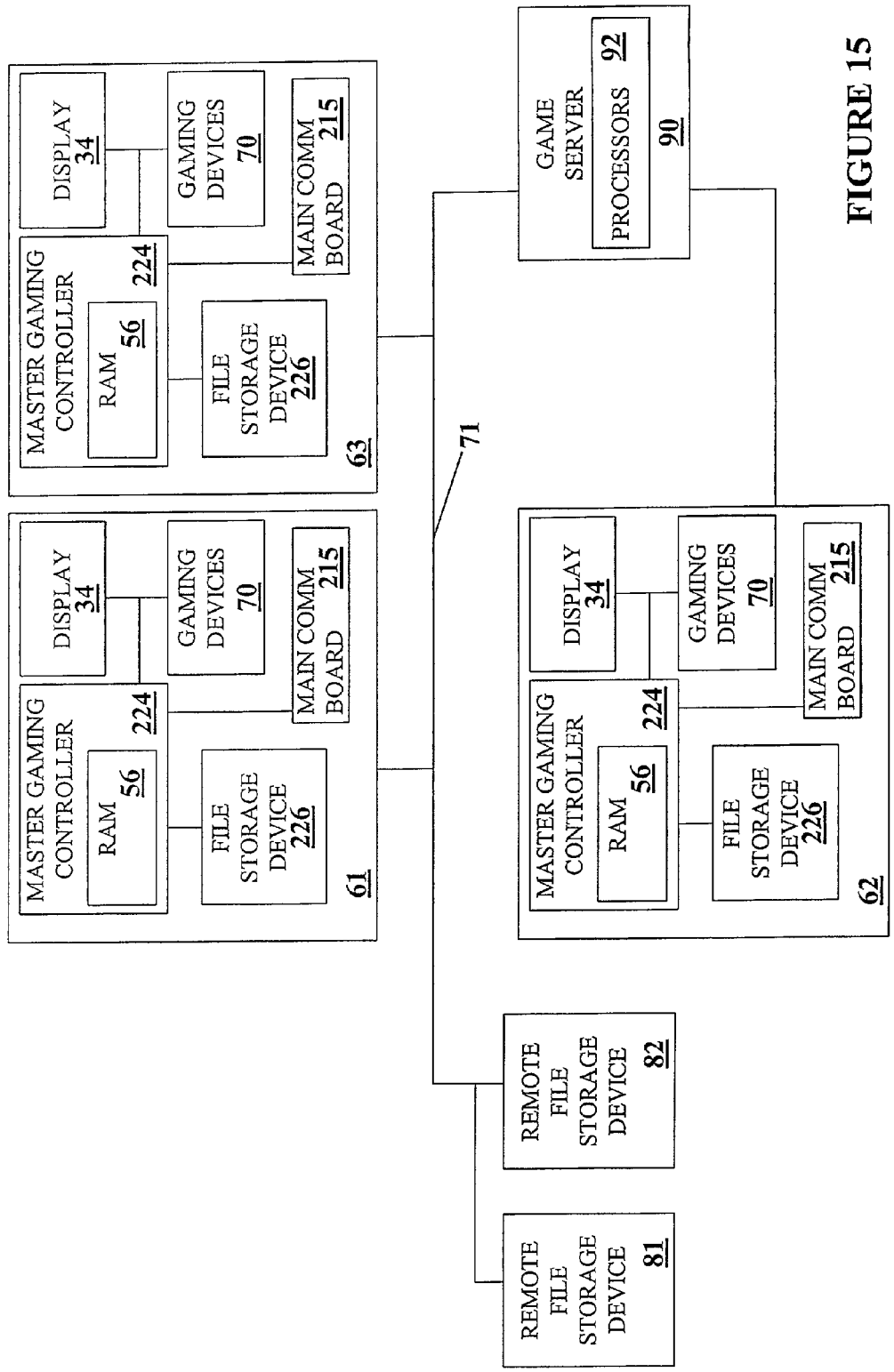
FIG. 15 is a block diagram of gaming machines that utilize distributed gaming software and distributed processors to generate a game of chance for one embodiment of the present invention.

FIG. 15 is a block diagrams of gaming machines that utilize distributed gaming software and distributed processors to generate a game of chance for one embodiment of the present invention. A master gaming controller 224 is used to present one or more games on the gaming machines 61, 62 and 63. The master gaming controller 224 executes a number of gaming software modules to operate gaming devices 70, such as coin hoppers, bill validators, coin acceptors, speakers, printers, lights, displays (e.g. 34) and other input/output mechanisms (see FIGS. 13 and 14). The master gaming controller 224 may also execute gaming software enabling communications with gaming devices located outside of the gaming machines 61, 62 and 63, such as player tracking servers, bonus game servers, game servers and progressive game servers. In some embodiments, communications with devices located outside of the gaming machines may be performed using the main communication board 213 and network connections 71. The network connections 71 may allow communications with remote gaming devices via a local area network, an intranet, the Internet or combinations thereof.

The gaming machines 61, 62 and 63 may use gaming software modules to generate a game of chance that may be distributed between local file storage devices and remote file storage devices. For example, to play a game of chance on gaming machine 61, the master gaming controller may load gaming software modules into RAM 56 that may be may be located in 1) a file storage device 226 on gaming machine 61, 2) a remote file storage device 81, 2) a remote file storage device 82, 3) a game server 90, 4) a file storage device 226 on gaming machine 62, 5) a file storage device 226 on gaming machine 63, or 6) combinations thereof. In one embodiment of the present invention, the gaming operating system may allow files stored on the local file storage devices and remote file storage devices to be used as part of a shared file system where the files on the remote file storage devices are remotely mounted to the local file system. The file storage devices may be a hard-drive, CD-ROM, CD-DVD, static RAM, flash memory, EPROM's, compact flash, smart media, disk-on-chip, removable media (e.g. ZIP drives with ZIP disks, floppies or combinations thereof. For both security and regulatory purposes, gaming software executed on the gaming machines 61, 62 and 63 by the master gaming controllers 224 may be regularly verified by comparing software stored in RAM 56 for execution on the gaming machines with certified copies of the software stored on the gaming machine (e.g. files may be stored on file storage device 226), accessible to the gaming machine via a remote communication connection (e.g., 81, 82 and 90) or combinations thereof.

The game server 90 may be a repository for game software modules and software for other game services provided on the gaming machines 61, 62 and 63. In one embodiment of the present invention, the gaming machines 61, 62 and 63 may download game software modules from the game server 90 to a local file storage device to play a game of chance or the download may be initiated by the game server. One example of a game server that may be used with the present invention is described in co-pending U.S. patent application Ser. No. 09/042,192, filed on Jun. 16, 2000, entitled "Using a Gaming Machine as a Server" which is incorporated herein in its entirety and for all purposes. In another example, the game server might also be a dedicated computer or a service running on a server with other application programs.

In one embodiment of the present invention, the processors used to generate a game of chance may be distributed among different machines. For instance, the game flow logic to play a game of chance may be executed on game server 92 by processor 90 while the game presentation logic may be executed on gaming machines 61, 62 and 63 by the master gaming controller 224. The gaming operating systems on gaming machines 61, 62 and 63 and the game server 90 may allow gaming events to be communicated between different gaming software modules executing on different gaming machines via defined APIs. Thus, a game flow software module executed on game server 92 may send gaining events to a game presentation software module executed on gaming machine 61, 62 or 63 to control the play of a game of chance or to control the play of a bonus game of chance presented on gaming machines 61, 62 and 63. As another example, the gaming machines 61, 62 and 63 may send gaming events to one another via network connection 71 to control the play of a shared bonus game played simultaneously on the different gaming machines.

Although the foregoing invention has been described in some detail for purposes of clarity of understanding, it will be apparent that certain changes and modifications may be practiced within the scope of the appended claims. For instance, while the gaming machines of this invention have been depicted as having top box mounted on top of the main gaming machine cabinet, the use of gaming devices in accordance with this invention is not so limited. For example, gaming machine may be provided without a top box.

What is claimed is:

1. A gaming machine comprising:
    a master gaming controller designed to generate a game of chance played on the gaming machine by executing a plurality of gaming software modules;
    a memory device storing the plurality of gaming software modules;
    a gaming operating system comprising logic to load and unload gaming software modules into a RAM from the memory device and to control the play of the game of chance, including a game manager wherein the game manager is operable to control an invocation of a plurality of stages between a start of the game of chance and an end of the game of chance wherein in each stage one or more game states is generated and for each game state a corresponding presentation state is generated wherein each presentation state specifies operations of output devices on the gaming machine;
    logic for a game stage in the plurality of stages wherein the game stage is invoked at least once between the start of the game of chance and the end of the game of chance;
    a game flow software module comprising logic to generate a game flow including rules for playing the game of chance comprising a first sequence of game states;
    a game presentation software module comprising logic to generate presentation states corresponding to the first sequence of game states wherein at least the gaming operating system, the game flow software module and the game presentation software module communicate via one or more application program interfaces;
    logic for one or more additional stages operable to be executed by the gaming operating system between the start of the game of chance and the end of the game of chance;
    the game manager for determining when to invoke each stage in the plurality of stages wherein the logic for the game manager is separate from the logic for the game stage and the one or more additional stages and wherein the game manager is operable to invoke a variable number of stages in each play of the game of chance; and
    a memory storing a paytable wherein the paytable includes staging information associated with at least one game outcome and wherein the game manager is operable to determine a sequence of stages for use in a particular game of chance using the staging information in the paytable.

2. The gaming machine of claim 1, wherein the one or more application program interfaces are selected from the group consisting of a game flow interface, a presentation interface, a bank interface, a configuration interface and an inter process communication.

3. The gaming machine of claim 1, wherein the one or more application program interfaces are used to communicate game information.

4. The gaming machine of claim 1, wherein the game information is selected from the group consisting of game state information, presentation state information, configuration information, betting information, game outcome information, critical event data, I/O information and metering information.

5. The gaming machine of claim 1, wherein one or more of the application program interfaces is used to communicate sequence events used to control the play of the game of chance.

6. The gaming machine of claim 5, wherein the sequence events are selected from the group consisting game start, game end, stage start, stage end, process award, update display, check status of an item, synchronize presentation, state change, bet change, system meters changes, context status, game flow state, presentation substate, presentation substate complete, previous game flow state, previous presentation substate, synchronize bet, synchronize panel, synchronize play, synchronize player amount, synchronize all, money in, money out, device used to enter money and device used to pay out money.

7. The gaming machine of claim 1, wherein the game software module further comprises a game manager logical unit used to communicate with the game flow software module and the game presentation software module via the one or more application program interfaces and designed to control the play of the game of chance.

8. The gaming machine of claim 1, wherein the game of chance comprises a sequence of stages and wherein at least one stage in the sequence of stages is a game stage.

9. The gaming machine of claim 8, wherein one or more stages in the sequence of stages is a bonus game stage.

10. The gaming machine of claim 8, wherein a number of stages in the sequence of stages varies depending on an outcome of the game of chance.

11. The gaming machine of claim 1, further comprising:
    a plurality of game presentation modules used to present games of chance with different themes.

12. The gaming machine of claim 11, wherein a first game of chance with a first theme is played on the gaming machine using a first game presentation module and a second game of chance with a second theme is played on the gaming machine.

13. The gaming machine of claim 12, wherein the first game of chance and the second game of chance are played using the same gaming operating system, the same game flow software module and one or more of the same application program interfaces.

14. The gaming machine of claim 13, wherein the gaming operating system loads the first game presentation module to play the first game of chance and the gaming operating system loads the second game presentation module to play the second game of chance.

15. The gaming machine of claim 1, further comprising:
    a plurality of game flow software modules and game presentation modules used to present different types of games.

16. The gaming machine of claim 15, wherein the types of games are selected from card games, slot games, keno games, bingo games, dice games and pachinko games.

17. The gaming machine of claim 16, wherein a first type of game of chance is played on the gaming machine and a second type of game of chance is played on the gaming machine using the same gaming operating system.

18. The gaming machine of claim 17, wherein the first type of game of chance is played on the gaming machine and the second type of game of chance is played on the gaming machine using one or more of the same application program interfaces.

19. The gaming machine of claim 16, wherein the gaming operating system software module loads a first game flow software module and a first game presentation module to play the first type of game of chance and the gaming operating system software module loads a second game flow software module and a second game presentation module to play the second type of game of chance.

20. The gaming machine of claim 1, wherein the game of chance is selected from group consisting of slot games, poker games, pachinko games, multiple hand poker games, pai-gow poker games, black jack games, keno games, bingo games, roulette games, craps games and card games.

21. The gaming machine of claim 1, wherein the memory device is selected from a CD-ROM drive, a DVD-ROM drive, a hard drive and other mass storage devices.

22. The gaming machine of claim 1, further comprising:
a non-volatile memory device.

23. The gaming machine of claim 22, wherein the game flow software module further comprises logic for storing game data generated by the game flow software module to the non-volatile memory device.

24. The gaming machine of claim 1, wherein the game flow software module further comprises logic for generating a plurality of game states in the game flow.

25. The gaming machine of claim 24, wherein the game presentation software module comprises logic for displaying graphics and projecting sounds for each game state in the plurality of game states.

26. The gaming machine of claim 25, wherein the graphics and sounds generated by the game presentation software module for each game state are generated with data placed in NV-RAM by game flow software module.

27. The gaming machine of claim 26, wherein the data placed in NV-RAM by game flow software module is used by the game presentation software module to playback a game history.

28. The gaming machine of claim 1, wherein the game flow software module further comprises logic for configuring parameters on the gaming machine used to play the game chance associated with the game flow software module.

29. The gaming machine of claim 1, wherein the gaming operating system downloads a gaming software module from a remote file storage device.

30. The gaming machine of claim 1, wherein the gaming operating system controls the play of the game of chance on a remote gaming device.

31. The gaming machine of claim 1, wherein the gaming operating system receives gaming information used to control the play of the game of chance on the gaming machine from a remote gaming device.

32. The gaming machine of claim 1, wherein one or more of the application program interfaces is used to communicate gaming information used to control the play of the game of chance on a remote gaming device.

* * * * *